United States Patent
Sirpal et al.

(10) Patent No.: US 9,927,879 B2
(45) Date of Patent: Mar. 27, 2018

(54) PANEL USER INTERFACE FOR AN INTELLIGENT TELEVISION

(71) Applicant: Flextronics AP, LLC, San Jose, CA (US)

(72) Inventors: Sanjiv Sirpal, Oakville (CA); Mohammed Selim, Oakville (CA)

(73) Assignee: Flextronics AP, LLC, San Jose, CA (US)

( * ) Notice: Subject to any disclaimer, the term of this patent is extended or adjusted under 35 U.S.C. 154(b) by 0 days.

(21) Appl. No.: 15/358,788

(22) Filed: Nov. 22, 2016

(65) Prior Publication Data

US 2017/0099521 A1    Apr. 6, 2017

Related U.S. Application Data

(63) Continuation of application No. 14/834,316, filed on Aug. 24, 2015, now Pat. No. 9,510,040, which is a (Continued)

(51) Int. Cl.
*H04N 21/61* (2011.01)
*H04N 21/414* (2011.01)
(Continued)

(52) U.S. Cl.
CPC ............ *G06F 3/017* (2013.01); *G06F 3/0481* (2013.01); *G06F 3/04817* (2013.01);
(Continued)

(58) Field of Classification Search
CPC combination set(s) only.
See application file for complete search history.

(56) References Cited

U.S. PATENT DOCUMENTS

| 5,539,479 A | 7/1996 | Bertram |
| 5,933,141 A | 8/1999 | Smith |

(Continued)

FOREIGN PATENT DOCUMENTS

| EP | 2328346 | 6/2011 |
| EP | 2487922 | 8/2012 |
| WO | WO 99/21308 | 4/1999 |

OTHER PUBLICATIONS

Sohail, "Smart TV—A Late Bloomer," Harwarezonw.com, Apr. 1, 2011, 2 pages.

(Continued)

*Primary Examiner* — Kieu Oanh T Bui
(74) *Attorney, Agent, or Firm* — Sheridan Ross P.C.

(57) ABSTRACT

An intelligent television, methods for displaying content, and methods for user interaction between the intelligent television and the user are provided. In general, a user is provided with an application panel allowing for navigation, categories, favorites, and search options that enable one or more functions associated with the intelligent television. The presentation of options is based on input received by the intelligent television. As a user provides input to the intelligent television via a remote control or other input device. The intelligent television is configured to interpret the input and provide interactive functionality in the form of content presented to the display of the intelligent television without obstructing the user from viewing content displayed on the screen of the intelligent television.

20 Claims, 34 Drawing Sheets

Related U.S. Application Data continuation of application No. 13/970,374, filed on Aug. 19, 2013, now abandoned, said application No. 14/834,316 is a continuation of application No. 13/969,588, filed on Aug. 18, 2013, now abandoned, said application No. 14/834,316 is a continuation of application No. 13/970,355, filed on Aug. 19, 2013, now Pat. No. 9,172,896, said application No. 14/834,316 is a continuation of application No. 13/969,179, filed on Aug. 16, 2013, now Pat. No. 9,432,742, said application No. 14/834,316 is a continuation of application No. 13/968,665, filed on Aug. 16, 2013, now Pat. No. 9,247,174, said application No. 14/834,316 is a continuation of application No. 14/418,969, filed as application No. PCT/US2013/036826 on Apr. 16, 2013, now abandoned.

(60) Provisional application No. 61/684,672, filed on Aug. 17, 2012, provisional application No. 61/697,710, filed on Sep. 6, 2012, provisional application No. 61/700,182, filed on Sep. 12, 2012, provisional application No. 61/702,650, filed on Sep. 18, 2012, provisional application No. 61/736,692, filed on Dec. 13, 2012, provisional application No. 61/798,821, filed on Mar. 15, 2013, provisional application No. 61/804,942, filed on Mar. 25, 2013, provisional application No. 61/804,998, filed on Mar. 25, 2013, provisional application No. 61/804,971, filed on Mar. 25, 2013, provisional application No. 61/804,990, filed on Mar. 25, 2013, provisional application No. 61/805,003, filed on Mar. 25, 2013, provisional application No. 61/805,053, filed on Mar. 25, 2013, provisional application No. 61/805,030, filed on Mar. 25, 2013, provisional application No. 61/805,027, filed on Mar. 25, 2013, provisional application No. 61/805,042, filed on Mar. 25, 2013, provisional application No. 61/805,038, filed on Mar. 25, 2013, provisional application No. 61/684,672, filed on Aug. 17, 2012, provisional application No. 61/697,710, filed on Sep. 6, 2012, provisional application No. 61/700,182, filed on Sep. 12, 2012, provisional application No. 61/702,650, filed on Sep. 18, 2012, provisional application No. 61/736,692, filed on Dec. 13, 2012, provisional application No. 61/798,821, filed on Mar. 15, 2013, provisional application No. 61/804,942, filed on Mar. 25, 2013, provisional application No. 61/804,998, filed on Mar. 25, 2013, provisional application No. 61/804,971, filed on Mar. 25, 2013, provisional application No. 61/804,990, filed on Mar. 25, 2013, provisional application No. 61/805,003, filed on Mar. 25, 2013, provisional application No. 61/805,053, filed on Mar. 25, 2013, provisional application No. 61/805,030, filed on Mar. 25, 2013, provisional application No. 61/805,027, filed on Mar. 25, 2013, provisional application No. 61/805,042, filed on Mar. 25, 2013, provisional application No. 61/805,038, filed on Mar. 25, 2013, provisional application No. 61/684,672, filed on Aug. 17, 2012, provisional application No. 61/697,710, filed on Sep. 6, 2012, provisional application No. 61/700,182, filed on Sep. 12, 2012, provisional application No. 61/702,650, filed on Sep. 18, 2012, provisional application No. 61/736,692, filed on Dec. 13, 2012, provisional application No. 61/798,821, filed on Mar. 15, 2013, provisional application No. 61/804,942, filed on Mar. 25, 2013, provisional application No. 61/804,998, filed on Mar. 25, 2013, provisional application No. 61/804,971, filed on Mar. 25, 2013, provisional application No. 61/804,990, filed on Mar. 25, 2013, provisional application No. 61/805,003, filed on Mar. 25, 2013, provisional application No. 61/805,053, filed on Mar. 25, 2013, provisional application No. 61/805,030, filed on Mar. 25, 2013, provisional application No. 61/805,027, filed on Mar. 25, 2013, provisional application No. 61/805,042, filed on Mar. 25, 2013, provisional application No. 61/805,038, filed on Mar. 25, 2013.

(51) Int. Cl.
| | |
|---|---|
| *G06F 3/01* | (2006.01) |
| *H04N 1/00* | (2006.01) |
| *H04N 21/231* | (2011.01) |
| *H04N 21/431* | (2011.01) |
| *H04N 21/4725* | (2011.01) |
| *H04N 21/40* | (2011.01) |
| *H04N 21/43* | (2011.01) |
| *H04N 21/8545* | (2011.01) |
| *H04N 21/85* | (2011.01) |
| *H04N 5/44* | (2011.01) |
| *H04N 21/262* | (2011.01) |
| *H04N 21/81* | (2011.01) |
| *H04N 21/442* | (2011.01) |
| *H04N 21/485* | (2011.01) |
| *H04N 21/84* | (2011.01) |
| *H04N 21/478* | (2011.01) |
| *G06F 3/0481* | (2013.01) |
| *H04L 12/58* | (2006.01) |
| *H04N 21/258* | (2011.01) |
| *G06F 3/0488* | (2013.01) |
| *H04N 21/422* | (2011.01) |
| *H04N 5/445* | (2011.01) |
| *H04N 21/658* | (2011.01) |
| *H04N 21/426* | (2011.01) |
| *G06F 3/0484* | (2013.01) |
| *H04N 21/472* | (2011.01) |

(52) U.S. Cl.
CPC ...... *G06F 3/04842* (2013.01); *G06F 3/04883* (2013.01); *H04L 51/32* (2013.01); *H04N 1/00448* (2013.01); *H04N 5/4403* (2013.01); *H04N 5/44591* (2013.01); *H04N 21/23109* (2013.01); *H04N 21/25808* (2013.01); *H04N 21/26291* (2013.01); *H04N 21/40* (2013.01); *H04N 21/414* (2013.01); *H04N 21/4221* (2013.01); *H04N 21/42684* (2013.01); *H04N 21/43* (2013.01); *H04N 21/431* (2013.01); *H04N 21/4302* (2013.01); *H04N 21/4312* (2013.01); *H04N 21/4314* (2013.01); *H04N 21/4316* (2013.01); *H04N 21/44204* (2013.01); *H04N 21/44222* (2013.01); *H04N 21/478* (2013.01); *H04N 21/4725* (2013.01); *H04N 21/47205* (2013.01); *H04N 21/485* (2013.01); *H04N 21/4858* (2013.01); *H04N 21/6125* (2013.01); *H04N 21/6175* (2013.01); *H04N 21/6582* (2013.01); *H04N 21/8166* (2013.01); *H04N 21/8173* (2013.01); *H04N 21/84* (2013.01); *H04N 21/85* (2013.01); *H04N 21/8545* (2013.01); *G06F 2203/04804* (2013.01); *H04N 2005/4414* (2013.01)

(56) References Cited

U.S. PATENT DOCUMENTS

| | | | |
|---|---|---|---|
| 6,661,468 | B2 | 12/2003 | Alten et al. |
| 6,978,473 | B1 | 12/2005 | Nsonwu et al. |
| 7,152,236 | B1 | 12/2006 | Wugofski et al. |
| 7,487,529 | B1 | 2/2009 | Orlick |
| 7,493,641 | B2 | 2/2009 | Klosterman et al. |
| 7,685,520 | B2 | 3/2010 | Rashkovskiy et al. |
| 7,880,077 | B2 | 2/2011 | Pauws et al. |
| 7,900,228 | B2 | 3/2011 | Stark et al. |
| 7,908,635 | B2 | 3/2011 | Barton et al. |
| 8,166,511 | B2 | 4/2012 | Griggs |
| 8,220,021 | B1 | 7/2012 | Look et al. |
| 8,352,983 | B1 | 1/2013 | Chane et al. |
| 8,776,101 | B2 * | 7/2014 | Donoghue ......... H04N 5/44543 725/11 |
| 9,247,174 | B2 | 1/2016 | Sirpal et al. |
| 9,414,108 | B2 | 8/2016 | Sirpal et al. |
| 9,510,040 | B2 | 11/2016 | Selim et al. |
| 2001/0056577 | A1 | 12/2001 | Gordon et al. |
| 2002/0026637 | A1 | 2/2002 | Markel et al. |
| 2002/0067376 | A1 | 6/2002 | Martin et al. |
| 2002/0188944 | A1 | 12/2002 | Noble |
| 2002/0188958 | A1 | 12/2002 | Miller |
| 2003/0028880 | A1 | 2/2003 | Smith et al. |
| 2003/0069874 | A1 | 4/2003 | Hertzog et al. |
| 2003/0070171 | A1 | 4/2003 | Jeon et al. |
| 2004/0216156 | A1 | 10/2004 | Wagner |
| 2005/0097622 | A1 | 5/2005 | Zigmond et al. |
| 2006/0117343 | A1 | 6/2006 | Novak et al. |
| 2006/0136965 | A1 | 6/2006 | Ellis et al. |
| 2007/0199022 | A1 | 8/2007 | Moshiri et al. |
| 2007/0261090 | A1 | 11/2007 | Miller et al. |
| 2008/0022309 | A1 | 1/2008 | Begeja et al. |
| 2008/0120635 | A1 | 5/2008 | Trimper et al. |
| 2008/0155613 | A1 | 6/2008 | Benya et al. |
| 2009/0158375 | A1 | 6/2009 | Rodriguez et al. |
| 2009/0160764 | A1 | 6/2009 | Myllymäki |
| 2009/0228919 | A1 | 9/2009 | Zott et al. |
| 2009/0271823 | A1 | 10/2009 | Jung et al. |
| 2010/0013997 | A1 | 1/2010 | Whang |
| 2010/0037267 | A1 | 2/2010 | Bennett |
| 2010/0251304 | A1 * | 9/2010 | Donoghue ......... H04N 5/44543 725/46 |
| 2011/0093888 | A1 * | 4/2011 | Araki ................ H04N 5/44543 725/37 |
| 2011/0119626 | A1 | 5/2011 | Faenger et al. |
| 2011/0145860 | A1 | 6/2011 | Wei |
| 2011/0179453 | A1 | 7/2011 | Poniatowski |
| 2011/0289419 | A1 | 11/2011 | Yu et al. |
| 2012/0030317 | A1 | 2/2012 | Smyth et al. |
| 2012/0144416 | A1 | 6/2012 | Wetzer et al. |
| 2012/0144422 | A1 | 6/2012 | Han et al. |
| 2012/0174039 | A1 | 7/2012 | Rhoads et al. |
| 2012/0185902 | A1 | 7/2012 | LaRosa et al. |
| 2012/0200574 | A1 | 8/2012 | Hill et al. |
| 2012/0221972 | A1 | 8/2012 | Dougall et al. |
| 2012/0257108 | A1 | 10/2012 | Friedlander et al. |
| 2012/0260284 | A1 | 10/2012 | Friedlander et al. |
| 2013/0198685 | A1 | 8/2013 | Bernini et al. |
| 2014/0053198 | A1 | 2/2014 | Sirpal et al. |
| 2014/0059606 | A1 | 2/2014 | Selim et al. |
| 2014/0059635 | A1 | 2/2014 | Sirpal et al. |
| 2014/0068674 | A1 | 3/2014 | Sirpal et al. |
| 2016/0050462 | A1 | 2/2016 | Sirpal et al. |
| 2016/0066022 | A1 | 3/2016 | Sirpal et al. |

OTHER PUBLICATIONS

International Search Report and Written Opinion for International (PCT) Patent Application No. PCT/US2013/055294, dated Dec. 2, 2013 10 pages.

International Preliminary Report on Patentability for International (PCT) Patent Application No. PCT/US2013/055294, dated Feb. 26, 2015 10 pages.

International Search Report and Written Opinion for International (PCT) Patent Application No. PCT/US2013/055296, dated Nov. 29, 2013 9 pages.

International Preliminary Report on Patentability for International (PCT) Patent Application No. PCT/US2013/055296, dated Feb. 26, 2015 8 pages.

International Search Report and Written Opinion for International (PCT) Patent Application No. PCT/US13/55493, dated Nov. 7, 2013 9 pages.

International Preliminary Report on Patentability for International (PCT) Patent Application No. PCT/US13/55493, dated Feb. 26, 2015 8 pages.

International Search Report and Written Opinion for International (PCT) Patent Application No. PCT/US13/55509, dated Nov. 8, 2013 9 pages.

International Preliminary Report on Patentability for International (PCT) Patent Application No. PCT/US13/55509, dated Feb. 26, 2015 8 pages.

International Search Report and Written Opinion for International (PCT) Patent Application No. PCT/US2013/055303, dated Dec. 5, 2013 8 pages.

International Preliminary Report on Patentability for International (PCT) Patent Application No. PCT/US2013/055303, dated Feb. 26, 2015 7 pages.

International Search Report and Written Opinion for International (PCT) Patent Application No. PCT/US2013/055280, dated Jan. 10, 2014 10 pages.

International Preliminary Report on Patentability for International (PCT) Patent Application No. PCT/US2013/055280, dated Jun. 11, 2015 9 pages.

Official Action for U.S. Appl. No. 13/968,948 dated May 6, 2014 11 pages.

Official Action for U.S. Appl. No. 13/968,948, dated Nov. 24, 2014 13 pages.

Official Action for U.S. Appl. No. 13/968,948, dated Mar. 11, 2015 13 pages.

Official Action for U.S. Appl. No. 13/968,948, dated Jul. 17, 2015 13 pages.

Notice of Allowance for U.S. Appl. No. 13/968,948, dated Mar. 28, 2016 7 pages.

Official Action for U.S. Appl. No. 13/968,929, dated Apr. 29, 2015 12 pages.

Official Action for U.S. Appl. No. 14/841,199, dated Oct. 6, 2016 10 pages.

Official Action for U.S. Appl. No. 14/841,199, dated Feb. 1, 2017 12 pages.

Notice of Allowance for U.S. Appl. No. 14/841,199, dated Apr. 17, 2017 8 pages.

Official Action for U.S. Appl. No. 13/969,588, dated Nov. 10, 2014 11 pages.

Official Action for U.S. Appl. No. 13/969,588, dated Mar. 11, 2015 12 pages.

Official Action for U.S. Appl. No. 13/969,588, dated Aug. 17, 2015 13 pages.

Official Action for U.S. Appl. No. 13/969,588, dated Jan. 21, 2016 14 pages.

Official Action for U.S. Appl. No. 13/970,374, dated Jun. 6, 2014 7 pages.

Official Action for U.S. Appl. No. 13/970,374, dated Dec. 9, 2014 9 pages.

Official Action for U.S. Appl. No. 13/970,374, dated May 22, 2015 11 pages.

Official Action for U.S. Appl. No. 14/834,316, dated Jan. 14, 2016 11 pages.

Notice of Allowance for U.S. Appl. No. 14/834,316, dated Jul. 20, 2016 7 pages.

Official Action for U.S. Appl. No. 13/968,665, dated Oct. 9, 2014 12 pages.

Official Action for U.S. Appl. No. 13/968,665, dated May 7, 2015) 11 pages.

(56) References Cited

OTHER PUBLICATIONS

Notice of Allowance for U.S. Appl. No. 13/968,665, dated Sep. 4, 2015 8 pages.
Official Action for U.S. Appl. No. 13/968,897, dated Aug. 15, 2014 15 pages.
Official Action for U.S. Appl. No. 13/968,897, dated Jan. 28, 2015 18 pages.
Official Action for U.S. Appl. No. 13/968,897, dated May 8, 2015 21 pages.
Official Action for U.S. Appl. No. 14/822,705, dated Mar. 11, 2016 21 pages.
Official Action for U.S. Appl. No. 14/822,705, dated Sep. 20, 2016 27 pages.
Official Action for U.S. Appl. No. 14/822,705, dated May 17, 2017 34 pages.
Official Action for U.S. Appl. No. 14/822,705, dated Oct. 6, 2017 48 pages.

* cited by examiner

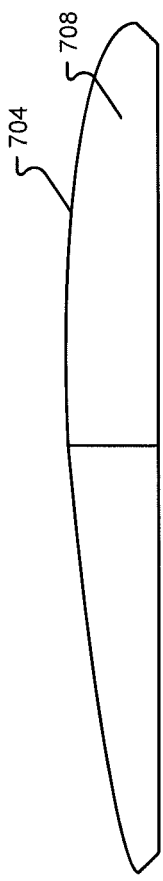
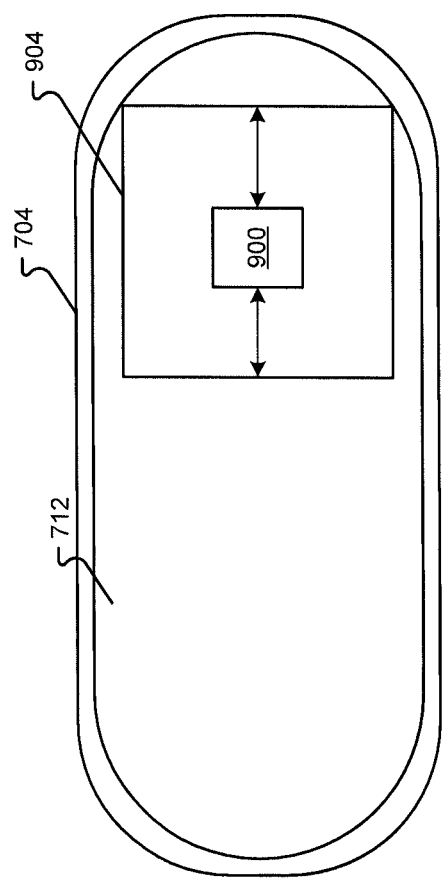
Fig. 8
Fig. 9A

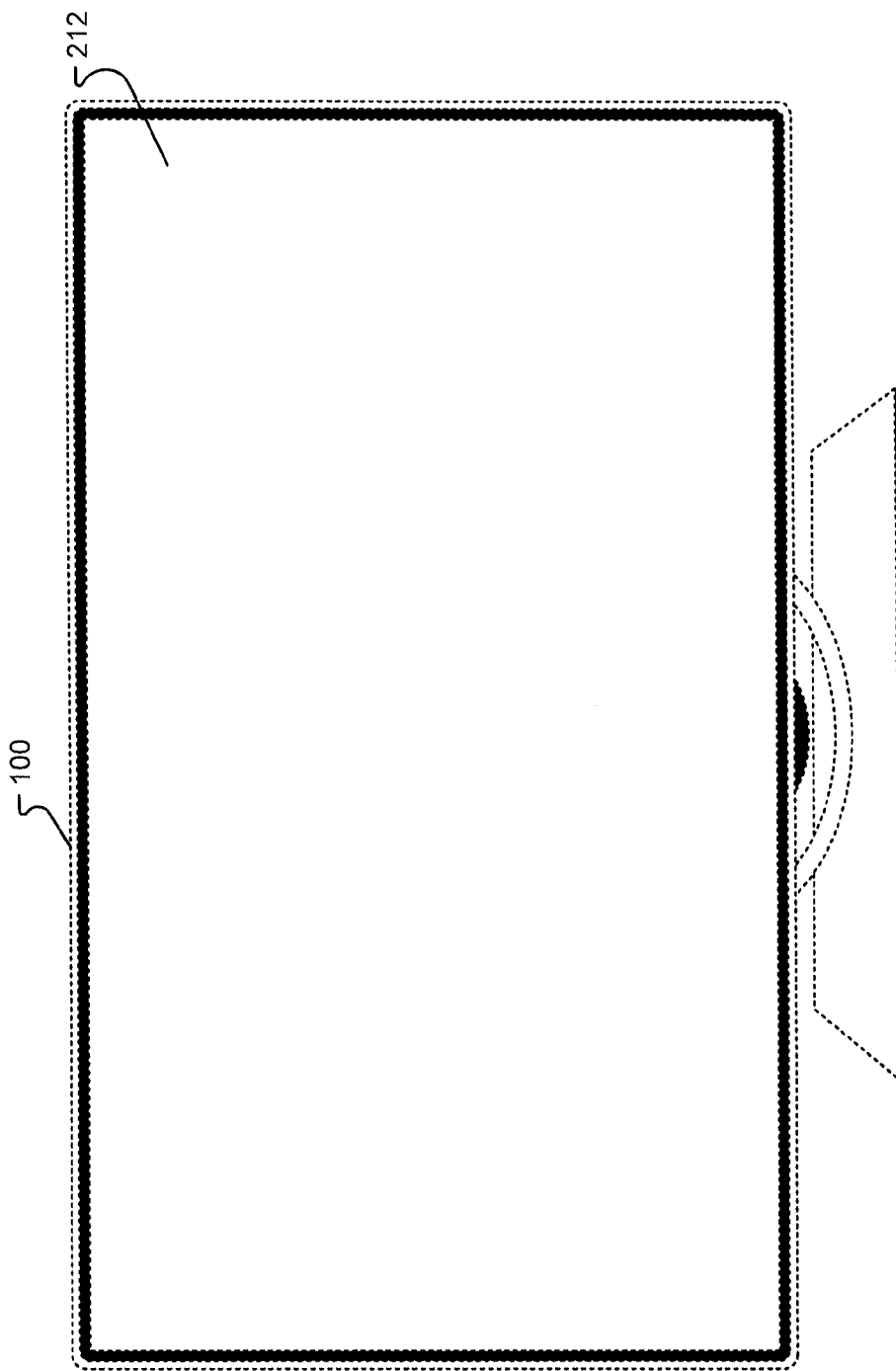

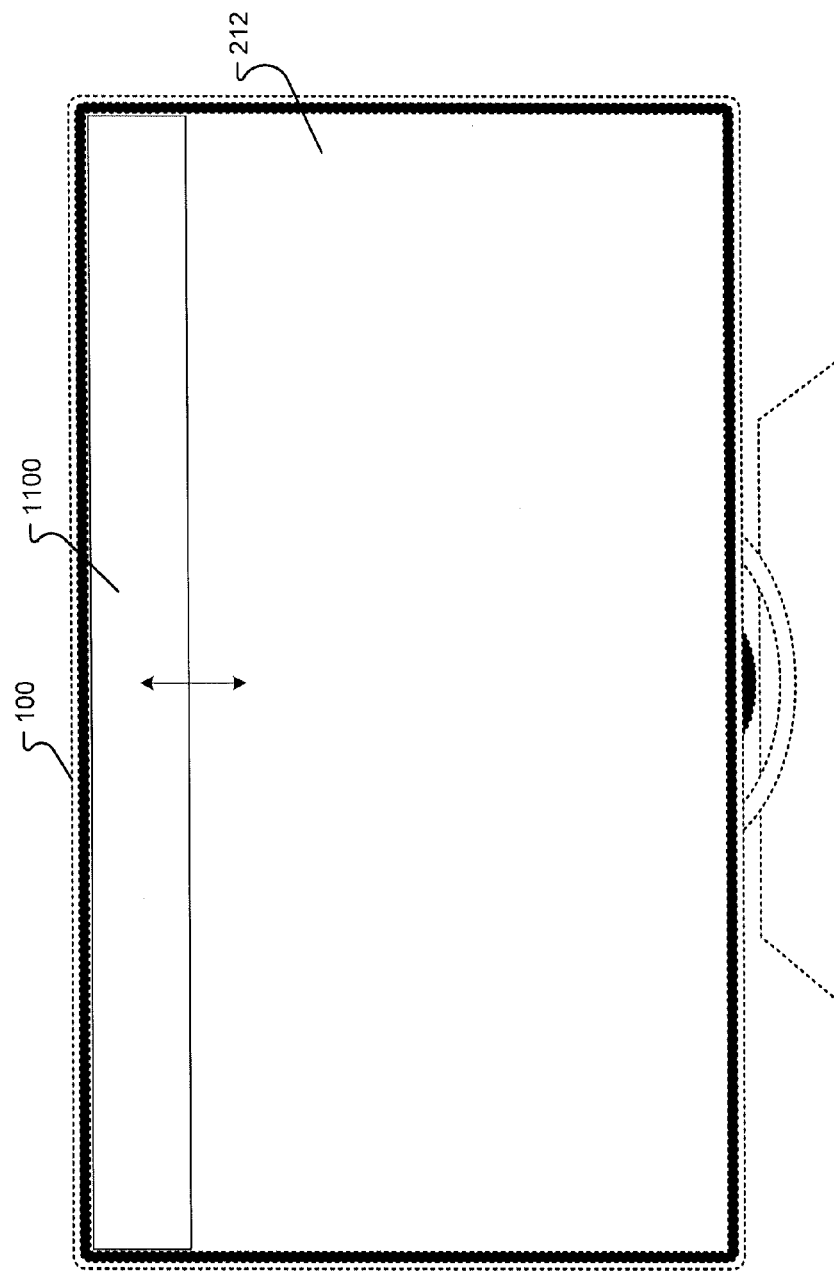

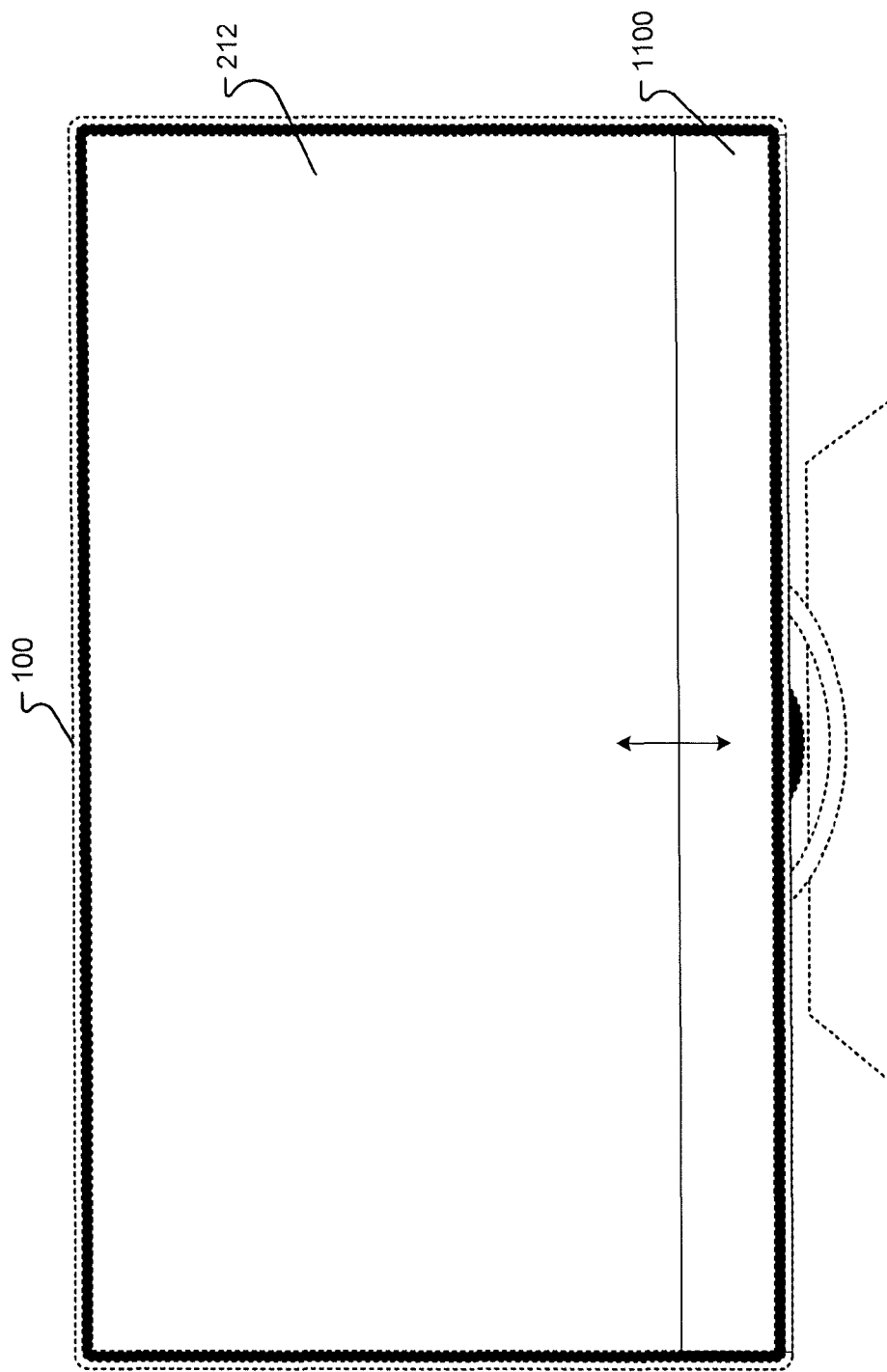

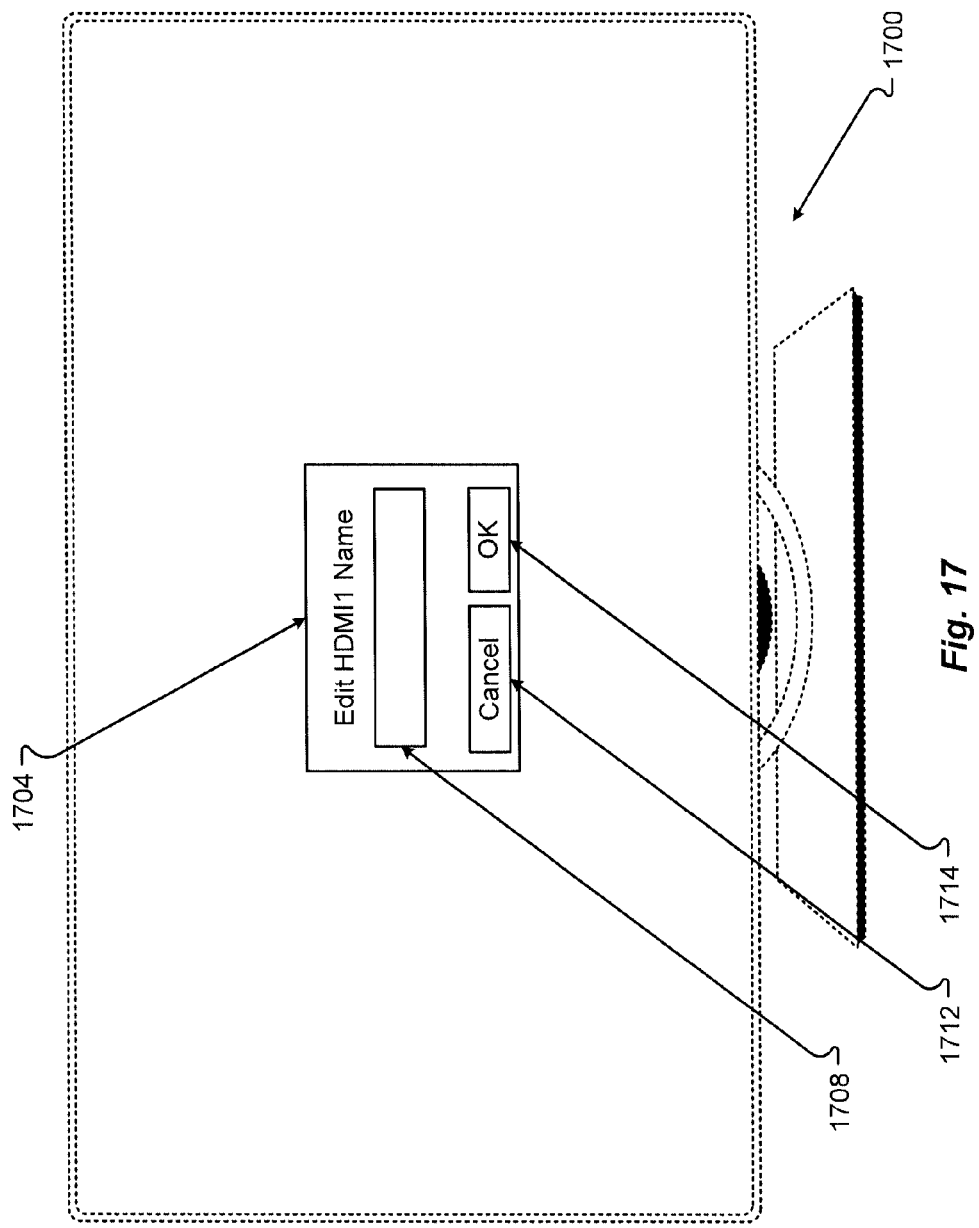

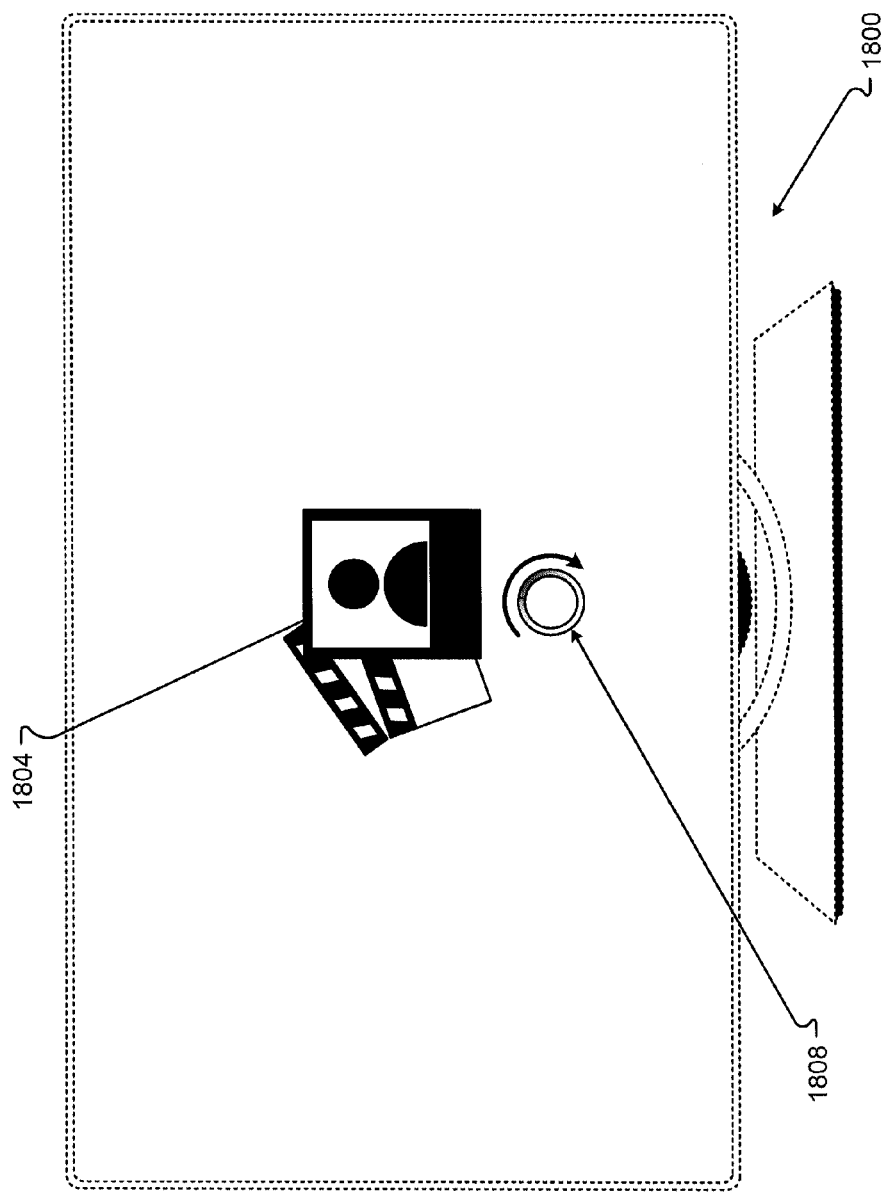

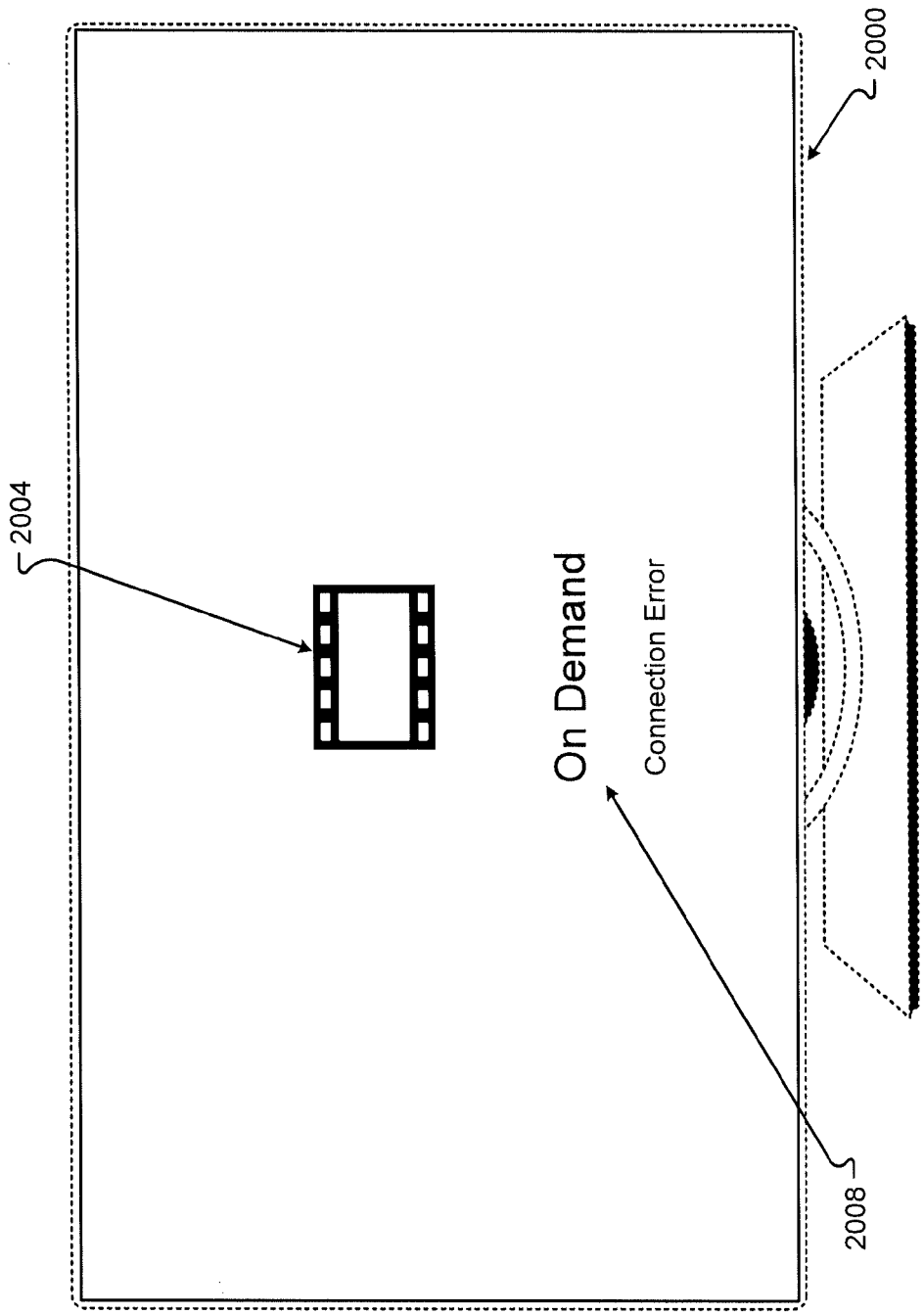

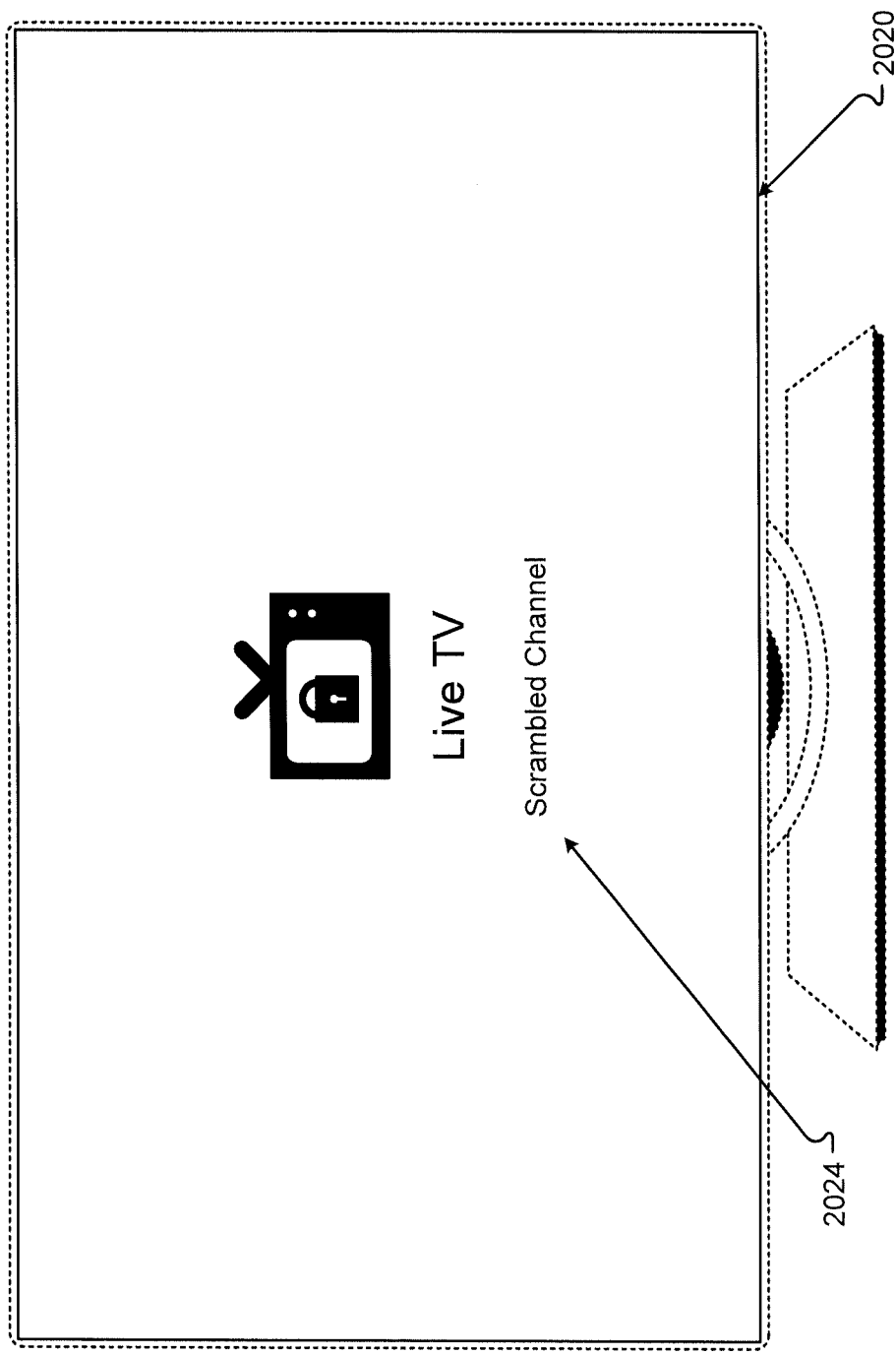

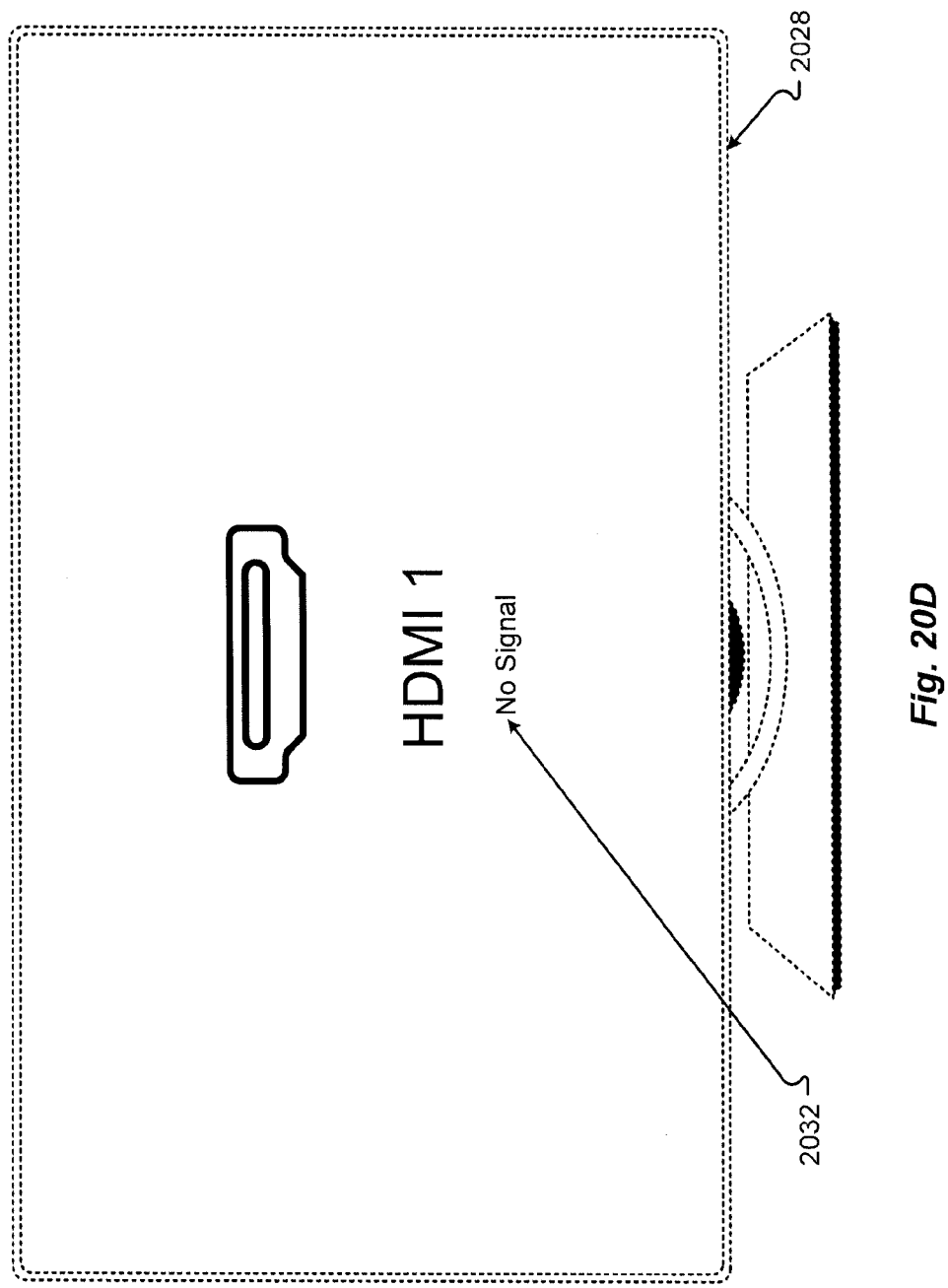

PANEL USER INTERFACE FOR AN INTELLIGENT TELEVISION

CROSS REFERENCE TO RELATED APPLICATION

The present application is a continuation of and claims priority to U.S. patent application Ser. No. 14/834,316, filed Aug. 24, 2015, entitled "Global Panel," which is a continuation of and claims priority to U.S. Patent Application Nos.: (1) Ser. No. 13/970,374 filed Aug. 19, 2013 entitled "Global Panel"; (2) Ser. No. 13/968,665 filed Aug. 16, 2013 entitled "Panel User Interface for an Intelligent Television"; (3) Ser. No. 13/969,179 filed Aug. 16, 2013 entitled "Intelligent Channel Changing"; (4) Ser. No. 13/969,588 filed Aug. 18, 2013 entitled "Panel User Interface for an Intelligent Television"; and (5) Ser. No. 13/970,355 filed Aug. 19, 2013 entitled "Content-Sensitive and Context-Sensitive User Interface for an Intelligent Television"; each of which claims the benefits of and priority, under 35 U.S.C. § 119(e), to U.S. Provisional Application Ser. No. 61/684,672 filed Aug. 17, 2012, "Smart TV"; 61/702,650 filed Sep. 18, 2012, "Smart TV"; 61/697,710 filed Sep. 6, 2012, "Social TV"; 61/700,182 filed Sep. 12, 2012, "Social TV Roadmap"; 61/736,692 filed Dec. 13, 2012, "SmartTV"; 61/798,821 filed Mar. 15, 2013, "SmartTV"; 61/804,942 filed Mar. 25, 2013, "SmartTV"; 61/804,998 filed Mar. 25, 2013, "SmartTV"; 61/804,971 filed Mar. 25, 2013, "SmartTV"; 61/804,990 filed Mar. 25, 2013, "SmartTV"; 61/805,003 filed Mar. 25, 2013, "SmartTV"; 61/805,053 filed Mar. 25, 2013, "SmartTV"; 61/805,030 filed Mar. 25, 2013, "SmartTV"; 61/805,027 filed Mar. 25, 2013, "SmartTV"; 61/805,042 filed Mar. 25, 2013, "SmartTV"; and 61/805,038 filed Mar. 25, 2013, "SmartTV." U.S. patent application Ser. No. 14/834,316 is also a continuation of and claims priority to U.S. patent application Ser. No. 14/418,969 filed Feb. 2, 2015, entitled "Methods and Displays for Providing Intelligent Television Badges," which is a national stage application under 35 U.S.C. 371 of PCT Application No. PCT/US13/36826, having an international filing date of Apr. 16, 2013, which claims the benefits of and priority, under 35 U.S.C. § 119(e), to U.S. Provisional Application Ser. No. 61/684,672 filed Aug. 17, 2012, "Smart TV"; 61/702,650 filed Sep. 18, 2012, "Smart TV"; 61/697,710 filed Sep. 6, 2012, "Social TV"; 61/700,182 filed Sep. 12, 2012, "Social TV Roadmap"; 61/736,692 filed Dec. 13, 2012, "SmartTV"; 61/798,821 filed Mar. 15, 2013, "SmartTV"; 61/804,942 filed Mar. 25, 2013, "SmartTV"; 61/804,998 filed Mar. 25, 2013, "SmartTV"; 61/804,971 filed Mar. 25, 2013, "SmartTV"; 61/804,990 filed Mar. 25, 2013, "SmartTV"; 61/805,003 filed Mar. 25, 2013, "SmartTV"; 61/805,053 filed Mar. 25, 2013, "SmartTV"; 61/805,030 filed Mar. 25, 2013, "SmartTV"; 61/805,027 filed Mar. 25, 2013, "SmartTV"; 61/805,042 filed Mar. 25, 2013, "SmartTV"; and 61/805,038 filed Mar. 25, 2013, "SmartTV." Each of the aforementioned documents is incorporated herein by reference in their entirety for all that they teach and for all purposes.

BACKGROUND

Consolidation of device features or technological convergence is in an increasing trend. Technological convergence describes the tendency for different technological systems to evolve toward performing similar tasks. As people use more devices, the need to carry those devices, charge those devices, update software on those devices, etc. becomes more cumbersome. To compensate for these problems, technology companies have been integrating features from different devices into one or two multi-functional devices. For example, cellular phones are now capable of accessing the Internet, taking photographs, providing calendar functions, etc.

The consolidation trend is now affecting the design and functionality of devices generally used in the home. For example, audio receivers can access the Internet, digital video recorders can store or provide access to digital photographs, etc. The television in home audio/video systems remains a cornerstone device because the display function cannot be integrated into other devices. As such, consolidating home devices leads to integrating features and functionality into the television. The emergence of the Smart Television (Smart TV) is evidence of the trend to consolidate functionality into the television.

A Smart TV is generally conceived as a device that integrates access to the Internet and Web 2.0 features into television sets. The Smart TV represents the trend of technological convergence between computers and television sets. The Smart TV generally focuses on online interactive media, Internet TV, on-demand streaming media, and generally does not focus on traditional broadcast media. Unfortunately, most Smart TVs have yet to provide seamless and intuitive user interfaces for navigating and/or executing the various features of the Smart TV. As such, there are still issues with the consolidation of features and the presentation of these features in Smart TVs.

SUMMARY

There is a need for an Intelligent TV with intuitive user interfaces and with seamless user interaction capability. These and other needs are addressed by the various aspects, embodiments, and/or configurations of the present disclosure. Also, while the disclosure is presented in terms of exemplary embodiments, it should be appreciated that individual aspects of the disclosure can be separately claimed.

In various embodiments, the present disclosure relates to methods of displaying content on a television, comprising: receiving an indication associated with a selection by a user; determining, based on the received indication, a global panel to display via the television; retrieving from memory, a first content information for display in the global panel; and displaying, via the television, the retrieved content information in the specified global panel.

In some embodiments, the present disclosure relates to non-transitory computer readable information storage mediums having stored thereon instructions that cause a computing system to execute a method of displaying content on a television, comprising: receiving an indication associated with a selection by a user; determining, based on the received indication, a global panel to display via the television; retrieving from memory, a first content information for display in the global panel; and displaying, via the television, the retrieved content information in the specified global panel.

In further embodiments, the present disclosure relates to systems for displaying content on a television, comprising: an input device associated with the television; a memory; and a microprocessor operable to: receive an indication associated with a selection by a user; determine, based on the received indication, a global panel to display via the television; retrieve from the memory, a first content information for display in the global panel; and display, via the television, the retrieved content information in the specified global panel.

The present disclosure can provide a number of advantages depending on the particular aspect, embodiment, and/or configuration. For example, the current disclosure provides a panel system that aides in the navigation of an intelligent television. For example, a multi-panel system is provided that satisfies the following: allows a user to watch a primary program while surfing the internet, checking social media, and checking a system error, etc. Moreover, information may be displayed in one content area that specifically depends on or contextually dependent on the primary program or active content area. The panel system allows for a same pattern of navigation—all resulting in a unified experience for a user. In another area, an application panel is provided that allows quick access to core functionality, provides an unobtrusive design which allows for the active media to always be in view, provides a consistent user experience across all applications, and provides focused contextual content.

Another advantage is easy navigation in on-demand programming and allowing for consumers' increased demand for multi-sourced content. Thus, the user interface is flexible, reliable, and consistent across different applications.

The global panel in on demand includes various views. The video on demand interaction framework is flexible so different content providers can populate the content into the views in video on demand by providing a back end data source. Most views in video on demand have multiple components; some components are mandatory and others are optional. Content providers can pick and choose the components that go into each view based on the structure and availability of their media content. Multiple variations allow the user a rich, elegant, and intelligent navigational experience.

The global panel provides customized information. The navigation pattern and content layout remains consistent. Key benefits of the global panel includes: quick access to core functionality, unobtrusive design allowing the active video to always be in view, consistent user experience, and focused contextual content.

As consumers are demanding more access to content, the trend of viewing live and on-demand programming accelerates. The panel system provides quick access to extended functionality while still maintaining visibility into the main content view. The panel system allows the user to continue watching a primary program while surfing, checking social media, checking a system error, etc. The panel system is easy to navigate and contextually relevant, designed to provide quick access to extended functionality while still maintaining visibility into the main content view. These and other advantages will be apparent from the disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

A "blog" (a blend of the term web log) is a type of website or part of a website supposed to be updated with new content from time to time. Blogs are usually maintained by an individual with regular entries of commentary, descriptions of events, or other material such as graphics or video. Entries are commonly displayed in reverse-chronological order.

A "blogging service" is a blog-publishing service that allows private or multi-user blogs with time-stamped entries.

The term "cable TV" refers to a system of distributing television programs to subscribers via radio frequency (RF) signals transmitted through coaxial cables or light pulses through fiber-optic cables. This contrasts with traditional broadcast television (terrestrial television) in which the television signal is transmitted over the air by radio waves and received by a television antenna attached to the television.

The term "channel" or "television channel," as used herein, can be a physical or virtual channel over which a television station or television network is distributed. A physical cannel in analog television can be an amount of bandwidth, typically 6, 7, or 8 MHz, that occupies a predetermine channel frequency. A virtual channel is a representation, in cable or satellite television, of a data stream for a particular television media provider (e.g., CDS, TNT, HBO, etc.).

The term "computer-readable medium," as used herein, refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "enhanced television" (ETV) refers to a collection of specifications developed under the OpenCable project of CableLabs (Cable Television Laboratories, Inc.) that define an ETV Application consisting of resources (files) adhering to the Enhanced TV Binary Interchange Format (EBIF) content format as well as PNG images, JPEG images, and PFR downloadable fonts. An ETV application is normally delivered through an MPEG transport stream and accompanies an MPEG program containing video and audio elementary streams. An "ETV Application" is a collection of resources (files) that include one or more EBIF resources that represent viewable information in the form of pages. Two forms of a given ETV Application may be distinguished: (1) an interchange form and (2) an execution form. The interchange form of an ETV Application consists of the resources (files) that represent the compiled application prior to its actual execution by an ETV User Agent. The execution form of an ETV Application consists of the stored, and possibly mutated forms of these resources while being decoded, presented, and executed by an ETV User Agent. An "ETV User Agent" is a software component that operates on a set-top box, a television, or any other computing environment capable of receiving, decoding, presenting, and processing an ETV Application. This component usually provides, along with its host hardware environment, one or more mechanisms for an end-user to navigate and interact with the multimedia content represented by ETV Applications.

The term "high-definition television" (HDTV) provides a resolution that is substantially higher than that of standard-definition television. HDTV may be transmitted in various formats, namely 1080p-1920×1080p: 2,073,600 pixels (approximately 2.1 megapixels) per frame, 1080i (which is typically either 1920×1080i: 1,036,800 pixels (approximately 1 megapixel) per field or 2,073,600 pixels (approximately 2.1 megapixels) per frame or 1440×1080i:[1] 777,600 pixels (approximately 0.8 megapixels) per field or 1,555,200 pixels (approximately 1.6 megapixels) per frame), or 720p-1280×720p: 921,600 pixels (approximately 0.9 megapixels) per frame. As will be appreciated, "frame size" in pixels is defined as number of horizontal pixels× number of vertical pixels, for example 1280×720 or 1920× 1080. Often the number of horizontal pixels is implied from context and is omitted, as in the case of 720p and 1080p, "scanning system" is identified with the letter "p" for progressive scanning or "i" for interlaced scanning, and "frame rate" is identified as number of video frames per second. For interlaced systems an alternative form of specifying number of fields per second is often used. For purposes of this disclosure, "high-definition television" is deemed to include other high-definition analog or digital video formats, including ultra high definition television.

The term "internet television" (otherwise known as Internet TV, Online Television, or Online TV) is the digital distribution of television content via the Internet. It should not be confused with Web television—short programs or videos created by a wide variety of companies and individuals, or Internet protocol television (IPTV)—an emerging internet technology standard for use by television broadcasters. Internet Television is a general term that covers the delivery of television shows and other video content over the internet by video streaming technology, typically by major traditional television broadcasters. It does not describe a technology used to deliver content (see Internet protocol television). Internet television has become very popular through services such as RTE Player in Ireland; BBC iPlayer, 4oD, ITV Player (also STV Player and UTV Player) and Demand Five in the United Kingdom; Hulu in the United States; Nederland 24 in the Netherlands; ABC iview and Australia Live TV in Australia; Tivibu in Turkey; and iWanTV! in the Philippines.

The term "internet protocol television" (IPTV) refers to a system through which television services are delivered using the Internet protocol suite over a packet-switched network such as the Internet, instead of being delivered through traditional terrestrial, satellite signal, and cable television formats. IPTV services may be classified into three main groups, namely live television, with or without interactivity related to the current TV show; time-shifted television: catch-up TV (replays a TV show that was broadcast hours or days ago), start-over TV (replays the current TV show from its beginning); and video on demand (VOD): browse a catalog of videos, not related to TV programming. IPTV is distinguished from Internet television by its on-going standardization process (e.g., European Telecommunications Standards Institute) and preferential deployment scenarios in subscriber-based telecommunications networks with high-speed access channels into end-user premises via set-top boxes or other customer-premises equipment.

The term "silo," as used herein, can be a logical representation of an input, source, or application. An input can be a device or devices (e.g., DVD, VCR, etc.) electrically connected to the television through a port (e.g., HDMI, video/audio inputs, etc.) or through a network (e.g., LAN WAN, etc.). Rather than a device or devices, the input could be configured as an electrical or physical connection to one or more devices. A source, particularly a content source, can be a data service that provides content (e.g., a media center, a file system, etc.). An application can be a software service that provides a particular type of function (e.g., Live TV, Video on Demand, User Applications, photograph display, etc.). The silo, as a logical representation, can have an associated definition or property, such as a setting, feature, or other characteristic.

The term "panel," as used herein, can mean a user interface displayed in at least a portion of the display. The panel may be interactive (e.g., accepts user input) or informational (e.g., does not accept user input). A panel may be translucent whereby the panel obscures but does not mask the underlying content being displayed in the display. Panels may be provided in response to a user input from a button or remote control interface.

The term "screen," as used herein, refers to a physical structure that includes one or more hardware components that provide the device with the ability to render a user interface and/or receive user input. A screen can encompass any combination of gesture capture region, a touch sensitive display, and/or a configurable area. The device can have one or more physical screens embedded in the hardware. However a screen may also include an external peripheral device that may be attached and detached from the device. In embodiments, multiple external devices may be attached to the device. For example, another screen may be included with a remote control unit that interfaces with the Intelligent TV.

The term "media" of "multimedia," as used herein, refers to content that may assume one of a combination of different content forms. Multimedia can include one or more of, but is not limited to, text, audio, still images, animation, video, or interactivity content forms.

The term "Intelligent TV," as used herein, refers to a television configured to provide one or more intuitive user interfaces and interactions based on a unique application platform and architecture. The Intelligent TV utilizes processing resources associated with the television to integrate Internet connectivity with parallel application functionality. This integration allows a user the ability to intuitively access various sources of media and content (e.g., Internet, over-the-top content, on-demand streaming media, over-the-air broadcast media, and/or other forms of information) via the Intelligent TV in a quick and efficient manner. Although the Intelligent TV disclosed herein may comprise one or more components of a "smart TV," it is an aspect of the Intelligent TV to provide expanded intuitive user interaction capability for navigating and executing the various features of the television. A "smart TV," sometimes referred to as a connected TV, or hybrid TV (not to be confused with IPTV, Internet TV, or with Web TV), describes a trend of integration of the Internet and Web 2.0 features into television sets and set-top boxes, as well as the technological convergence between computers and these television sets/set-top boxes. The smart TV devices have a higher focus on online interactive media, Internet TV, over-the-top content, as well as on-demand streaming media, and less focus on traditional broadcast media than traditional television sets and set-top boxes. As can be appreciated, the Intelligent TV encompasses a broader range of technology than that of the smart TV defined above.

The term "television" is a telecommunication medium, device (or set) or set of associated devices, programming, and/or transmission for transmitting and receiving moving images that can be monochrome (black-and-white) or colored, with or without accompanying sound. Different countries use one of the three main video standards for TVs, namely PAL, NTSC or SECAM. Television is most commonly used for displaying broadcast television signals. The broadcast television system is typically disseminated via radio transmissions on designated channels in the 54-890 MHz frequency band. A common television set comprises multiple internal electronic circuits, including those for receiving and decoding broadcast signals. A visual display device which lacks a tuner is properly called a video monitor, rather than a television. A television may be different from other monitors or displays based on the distance maintained between the user and the television when the user watches the media and based on the inclusion of a tuner or other electronic circuit to receive the broadcast television signal.

The term "Live TV," as used herein, refers to a television production broadcast in real-time, as events happen, in the present.

The term "standard-definition television" (SDTV) is a television system that uses a resolution that is not considered to be either high-definition television (HDTV 720p and 1080p) or enhanced-definition television (EDTV 480p). The two common SDTV signal types are 576i, with 576 interlaced lines of resolution, derived from the European-developed PAL and SECAM systems; and 480i based on the American National Television System Committee NTSC system. In the US, digital SDTV is broadcast in the same 4:3 aspect ratio as NTSC signals. However, in other parts of the world that used the PAL or SECAM analog standards, standard-definition television is now usually shown with a 16:9 aspect ratio. Standards that support digital SDTV broadcast include DVB, ATSC and ISDB. Television signals are transmitted in digital form, and their pixels have a rectangular shape, as opposed to square pixels that are used in modern computer monitors and modern implementations of HDTV. The table below summarizes pixel aspect ratios for various kinds of SDTV video signal. Note that the actual image (be it 4:3 or 16:9) is always contained in the center 704 horizontal pixels of the digital frame, regardless of how many horizontal pixels (704 or 720) are used. In case of digital video signal having 720 horizontal pixels, only the center 704 pixels contain actual 4:3 or 16:9 image, and the 8 pixel wide stripes from either side are called nominal analogue blanking and should be discarded before displaying the image. Nominal analogue blanking should not be confused with overscan, as overscan areas are part of the actual 4:3 or 16:9 image.

The term "video on demand (VOD)," as used herein, refers to systems and processes which allow users to select and watch/listen to video or audio content on demand. VOD systems may stream content, to view the content in real time, or download the content to a storage medium for viewing at a later time.

The term "satellite positioning system receiver" refers to a wireless receiver or transceiver to receive and/or send location signals from and/or to a satellite positioning system, such as the Global Positioning System ("GPS") (US), GLONASS (Russia), Galileo positioning system (EU), Compass navigation system (China), and Regional Navigational Satellite System (India).

The term "display," as used herein, refers to at least a portion of a screen used to display the output of the television to a user. A display may be a single-screen display or a multi-screen display, referred to as a composite display. A composite display can encompass the touch sensitive display of one or more screens. A single physical screen can include multiple displays that are managed as separate logical displays. Thus, different content can be displayed on the separate displays although part of the same physical screen.

The term "displayed image," as used herein, refers to an image produced on the display. A typical displayed image is a television broadcast or menu. The displayed image may occupy all or a portion of the display.

The term "display orientation," as used herein, refers to the way in which a rectangular display is oriented by a user for viewing. The two most common types of display orientation are portrait and landscape. In landscape mode, the display is oriented such that the width of the display is greater than the height of the display (such as a 4:3 ratio, which is 4 units wide and 3 units tall, or a 16:9 ratio, which is 16 units wide and 9 units tall). Stated differently, the longer dimension of the display is oriented substantially horizontal in landscape mode while the shorter dimension of the display is oriented substantially vertical. In the portrait mode, by contrast, the display is oriented such that the width of the display is less than the height of the display. Stated differently, the shorter dimension of the display is oriented substantially horizontal in the portrait mode while the longer dimension of the display is oriented substantially vertical.

The term "module," as used herein, refers to any known or later developed hardware, software, firmware, artificial intelligence, fuzzy logic, or combination of hardware and software that is capable of performing the functionality associated with that element.

The terms "determine," "calculate" and "compute," and variations thereof, as used herein, are used interchangeably and include any type of methodology, process, mathematical operation or technique.

The term "touch screen" or "touchscreen" refer to screen that can receive user contact or other tactile input, such as a stylus. The touch screen may sense user contact in a number of different ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen, and the acoustic wave is disturbed by user contact. A receiving transducer detects the user contact instance and determines the contacted location coordinates.

The term "web television" is original television content produced for broadcast via the World Wide Web. Some major distributors of web television are YouTube, Myspace, Newgrounds, Blip.tv, and Crackle.

The terms "instant message" and "instant messaging" refer to a form of real-time text communication between two or more people, typically based on typed text.

The term "internet search engine" refers to a web search engine designed to search for information on the World Wide Web and FTP servers. The search results are generally presented in a list of results often referred to as SERPS, or "search engine results pages". The information may consist of web pages, images, information and other types of files. Some search engines also mine data available in databases or open directories. Web search engines work by storing information about many web pages, which they retrieve from the html itself. These pages are retrieved by a Web crawler (sometimes also known as a spider)—an automated Web browser which follows every link on the site. The contents of each page are then analyzed to determine how it should be indexed (for example, words are extracted from the titles, headings, or special fields called meta tags). Data about web pages are stored in an index database for use in later queries. Some search engines, such as Google™, store all or part of the source page (referred to as a cache) as well as information about the web pages, whereas others, such as AltaVista™, store every word of every page they find.

The terms "online community", "e-community", or "virtual community" mean a group of people that primarily interact via a computer network, rather than face to face, for social, professional, educational or other purposes. The interaction can use a variety of media formats, including wikis, blogs, chat rooms, Internet forums, instant messaging, email, and other forms of electronic media. Many media formats are used in social software separately or in combination, including text-based chatrooms and forums that use voice, video text or avatars.

The term "remote control" refers to a component of an electronics device, most commonly a television set, DVD player and/or home theater system for operating the device wirelessly, typically from a short line-of-sight distance. Remote control normally uses infrared and/or radio frequency (RF) signaling and can include WiFi, wireless USB, Bluetooth™ connectivity, motion sensor enabled capabilities and/or voice control. A touchscreen remote control is a handheld remote control device which uses a touchscreen user interface to replace most of the hard, built-in physical buttons used in normal remote control devices.

The term "satellite TV" refers to television programming delivered by the means of communications satellites and received by an outdoor antenna, usually a parabolic reflector generally referred to as a satellite dish, and as far as household usage is concerned, a satellite receiver either in the form of an external set-top box or a satellite tuner module built into a TV set.

The term "social network service" is a service provider that builds online communities of people, who share interests and/or activities, or who are interested in exploring the interests and activities of others. Most social network services are web-based and provide a variety of ways for users to interact, such as e-mail and instant messaging services.

The term "social network" refers to a web-based social network.

The term "gesture" refers to a user action that expresses an intended idea, action, meaning, result, and/or outcome. The user action can include manipulating a device (e.g., opening or closing a device, changing a device orientation, moving a trackball or wheel, etc.), movement of a body part in relation to the device, movement of an implement or tool in relation to the device, audio inputs, etc. A gesture may be made on a device (such as on the screen) or with the device to interact with the device.

The term "gesture capture" refers to a sense or otherwise a detection of an instance and/or type of user gesture. The gesture capture can occur in one or more areas of the screen. A gesture region can be on the display, where it may be referred to as a touch sensitive display or off the display where it may be referred to as a gesture capture area.

The term "electronic address" refers to any contactable address, including a telephone number, instant message handle, e-mail address, Universal Resource Locator (URL), Universal Resource Identifier (URI), Address of Record (AOR), electronic alias in a database, like addresses, and combinations thereof.

It shall be understood that the term "means," as used herein, shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

FIG. 8 is a side view of an embodiment of a remote control;

FIG. 9A is a bottom view of an embodiment of a remote control with a joystick in a neutral position;

FIG. 11A is a front view of an embodiment of an Intelligent TV screen;

FIG. 11B is a front view of an embodiment of an Intelligent TV screen;

FIG. 11C is a front view of an embodiment of an Intelligent TV screen;

FIG. 17 is a visual representation of an embodiment of a user interface presented when an edit application is starting;

FIG. 18 is a visual representation of an embodiment of a user interface presented when a content application is starting;

FIG. 20A is a visual representation of an embodiment of a user interface that is presented when a silo is in an error state;

FIG. 20C is a visual representation of another embodiment of a user interface that is presented when a silo is in an error state;

FIG. 20D is a visual representation of another embodiment of a user interface that is presented when a silo is in an error state.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Presented herein are embodiments of a device. The device can be a network-enabled telecommunications device, such as a television, an electronic visual display device, or other smart device. The device can include one or more screens, or sections of a screen, that are configured to receive and present information from a number of sources. Further, the device can receive user input in unique ways. The overall design and functionality of the device provides for an enhanced user experience making the device more useful and more efficient.

Figure 1A:
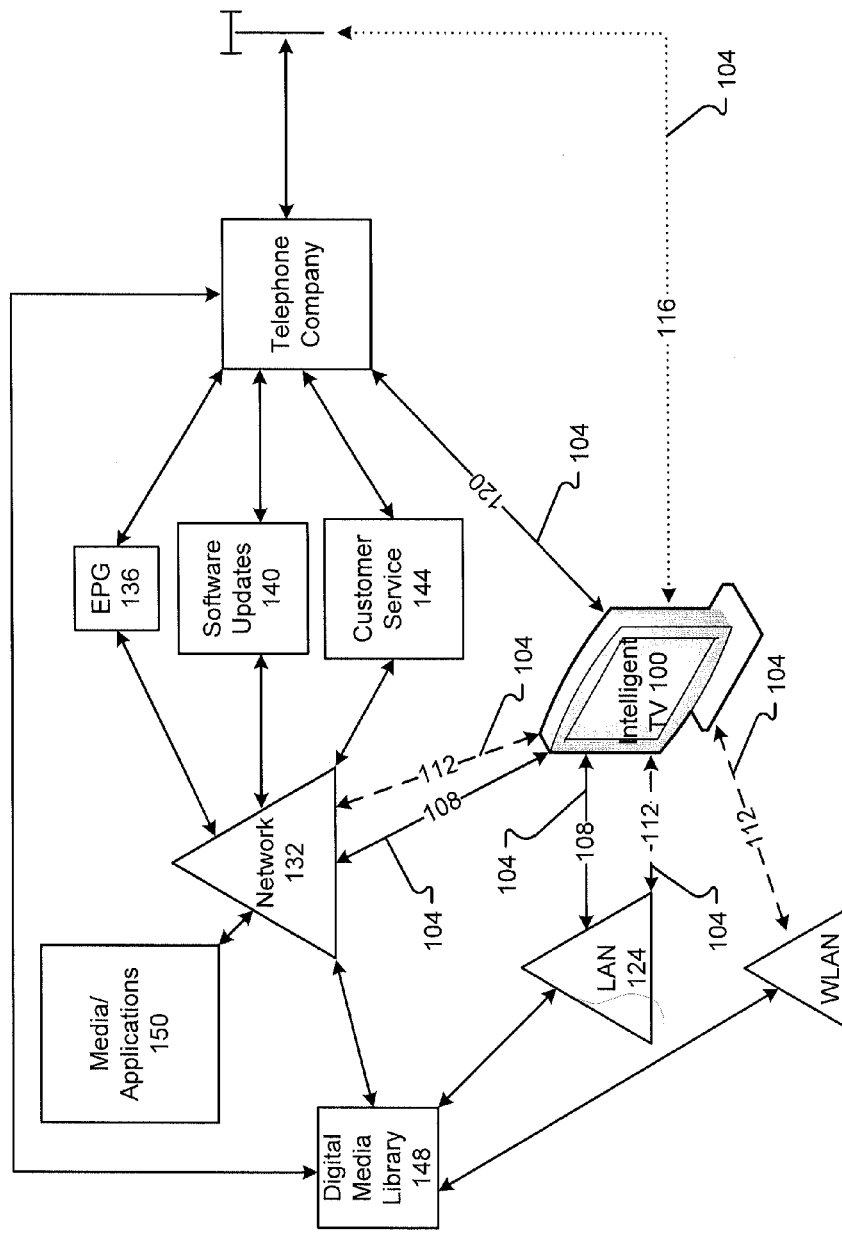
FIG. 1A includes a first view of an embodiment of an environment of an intelligent television.
Figure 1B:
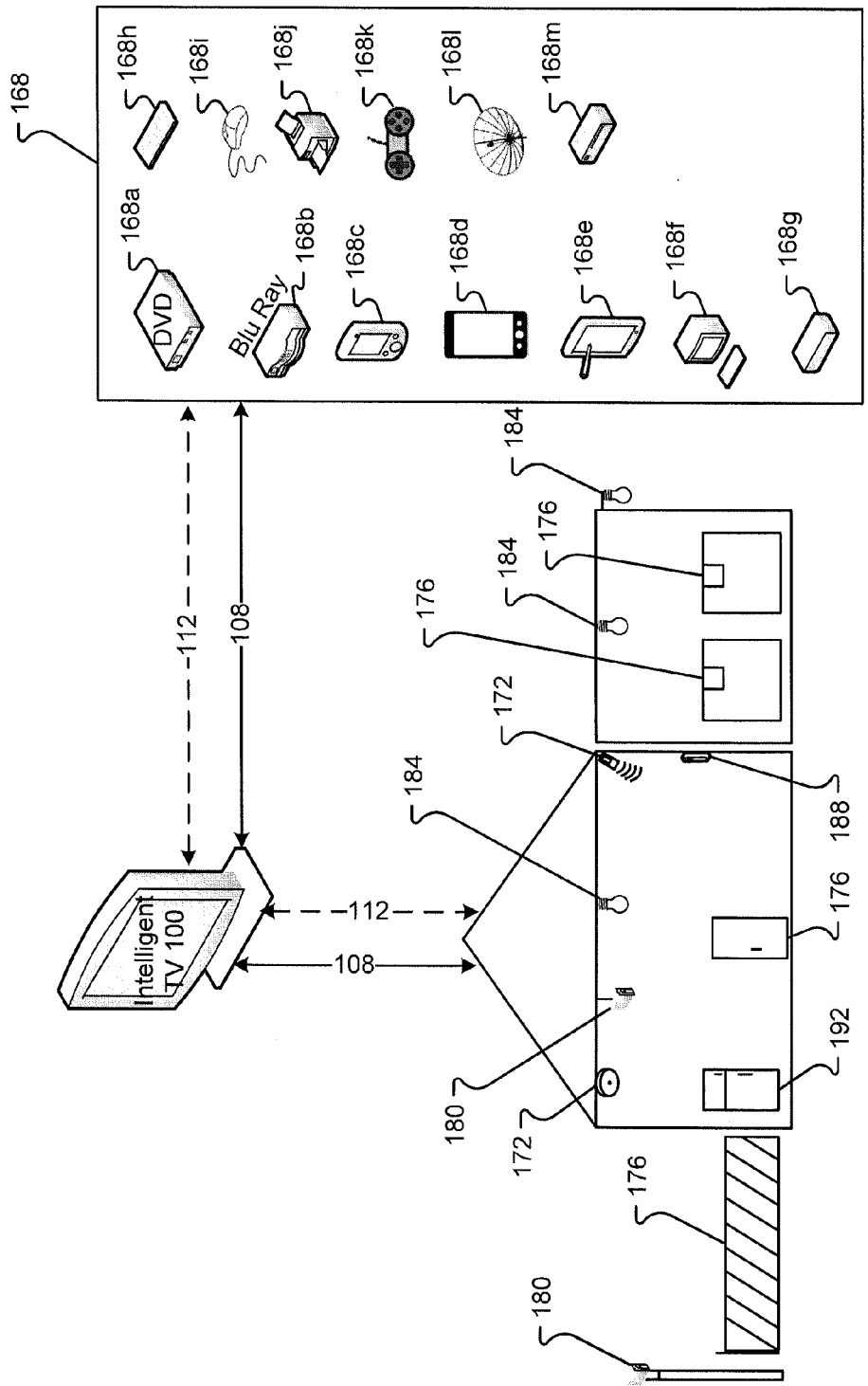
FIG. 1B includes a second view of an embodiment of an environment of an intelligent television.

Intelligent Television (TV) Environment:

Referring to FIGS. 1A and 1B, an Intelligent TV, or device, 100 is shown. It is anticipated that the Intelligent TV 100 may be used for entertainment, business applications, social interaction, content creation and/or consumption, and to organize and control one or more other devices that are in communication with the Intelligent TV 100. As can be appreciated, the Intelligent TV 100 can be used to enhance the user interactive experience whether at home or at work.

In some embodiments, the Intelligent TV 100 may be configured to receive and understand a variety of user and/or device inputs. For example, a user may interface with the Intelligent TV 100 via one or more physical or electrical controls, such as buttons, switches, touch sensitive screens/regions (e.g., capacitive touch, resistive touch, etc.), and/or other controls associated with the Intelligent TV 100. In some cases, the Intelligent TV 100 may include the one or more interactive controls. Additionally or alternatively, the one or more controls may be associated with a remote control. The remote control may communicate with the Intelligent TV 100 via wired and/or wireless signals. As can be appreciated, the remote control may operate via radio frequency (RF), infrared (IR), and/or a specific wireless communications protocol (e.g., Bluetooth™, Wi-Fi, etc.). In some cases, the controls, whether physical or electrical, may be configured (e.g., programmed) to suit a user's preferences.

Additionally or alternatively, smart phones, tablets, computers, laptops, netbooks, and other smart devices may be used to control the Intelligent TV 100. For example, control of the Intelligent TV 100 may be achieved via an application running on a smart device. The application may be configured to present a user with various Intelligent TV 100 controls in an intuitive user interface (UI) on a screen associated with the device 100. The screen may be a touch sensitive, or touch screen, display. Selections input by a user via the UI may be configured to control the Intelligent TV 100 by the application accessing one or more communication features associated with the smart device.

It is anticipated that the Intelligent TV 100 can receive input via various input devices including, but in no way limited to, video, audio, radio, light, tactile, and combinations thereof. Among other things, these input devices may be configured to allow the Intelligent TV 100 to see, recognize, and react to user gestures. For instance, a user may talk to the Intelligent TV 100 in a conversational manner. The Intelligent TV 100 may hear and understand voice commands in a manner similar to a smart device's intelligent personal assistant and voice-controlled navigator application (e.g., Apple's Siri, Android's Skyvi, Robin, Iris, and other applications).

The Intelligent TV 100 may also be a communications device which can establish network connections 104 through many alternate means, including wired 108 or wireless 112 means, over cellular networks 116 to connect via cellular base antenna 142 to telephone networks operated by telephone company 146, and by using a telephone line 120 to connect to telephone networks operated by telephone company 146. These connections 104 enable the Intelligent TV 100 to access one or more communication networks 132. The communication networks may comprise any type of known communication medium or collection of communication media and may use any type of protocols to transport messages or signals between endpoints. The communication networks may include wired and/or wireless communication technologies. The Internet is an example of a communication network 132 that constitutes an Internet Protocol (IP) network consisting of many computers, computing networks, and other communication devices located all over the world, which are connected through many telephone systems and other means.

Other examples of the communication network 132 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 132 need not be limited to any one network type, and instead may be comprised of a number of different networks and/or network types.

In some embodiments, the Intelligent TV 100 may be equipped with multiple communication means. The multiple communication means may allow the Intelligent TV 100 to communicate across Local Area Networks (LANs) 124, wireless local area networks (WLANs) 128, and other networks 132. The networks 132 may be connected in a redundant manner to ensure network access. In other words, if one connection is interrupted, the intelligent TV 100 can use an alternate communications path to reestablish and/or maintain the network connection 104. Among other things, the Intelligent TV 100 may use these network connections 104 to send and receive information, interact with an electronic program guide (EPG) 136, receive software updates 140, contact customer service 144 (e.g., to receive help or service, etc.), and/or access remotely stored digital media libraries 148. In addition, these connections can allow the Intelligent TV 100 to make phone calls, send and/or receive email messages, send and/or receive text messages (such as email and instant messages), surf the Internet using an internet search engine, post blogs by a blogging service, and connect/interact with social media sites and/or an online community (e.g., Facebook™, Twitter™, LinkedIn™, Pinterest™, Google+™ MySpace™, and the like) maintained by a social network service. In combination with other components of the Intelligent TV 100 described in more detail below, these network connections 104 also enable the Intelligent TV 100 to conduct video teleconferences, electronic meetings, and other communications. The Intelligent TV 100 may capture and store images and sound, using associated cameras, microphones, and other sensors. Additionally or alternatively, the Intelligent TV 100 may create and save screen shots of media, images, and data displayed on a screen associated with the Intelligent TV 100.

Further, as shown in FIG. 1B, the intelligent TV 100 can interact with other electronic devices 168 by either by the wired 108 and/or wireless 112 connections. As described herein, components of the Intelligent TV 100 allow the device 100 to be connected to devices 168 including, but not limited to, DVD players 168a, BluRay players 168b, portable digital media devices 168c, smart phones 168d, tablet devices 168e, personal computers 168f, external cable boxes 168g, keyboards 168h, pointing devices 168i, printers 168j, game controllers and/or game pads 168k, satellite dishes 168l, external display devices 168m, and other universal serial bus (USB), local area network (LAN), Bluetooth™, or high-definition multimedia interface (HDMI) compliant devices, and/or wireless devices. When connected to an external cable box 168g or satellite dish 168l, the Intelligent TV 100 can access additional media content. Also, as further described below, the Intelligent TV 100 is capable of receiving digital and/or analog signals broadcast by TV stations. The Intelligent TV 100 can be configured as one or more of a standard-definition television, enhanced television, and high-definition television. It may operate as one or more of cable, Internet, Internet Protocol, satellite, web, and/or smart television. The Intelligent TV 100 may also be used to control the operation of, and may interface with, other smart components such as security systems 172, door/gate controllers 176, remote video cameras 180, lighting systems 184, thermostats 188, refrigerators 192, and other appliances.

Figure 2A:
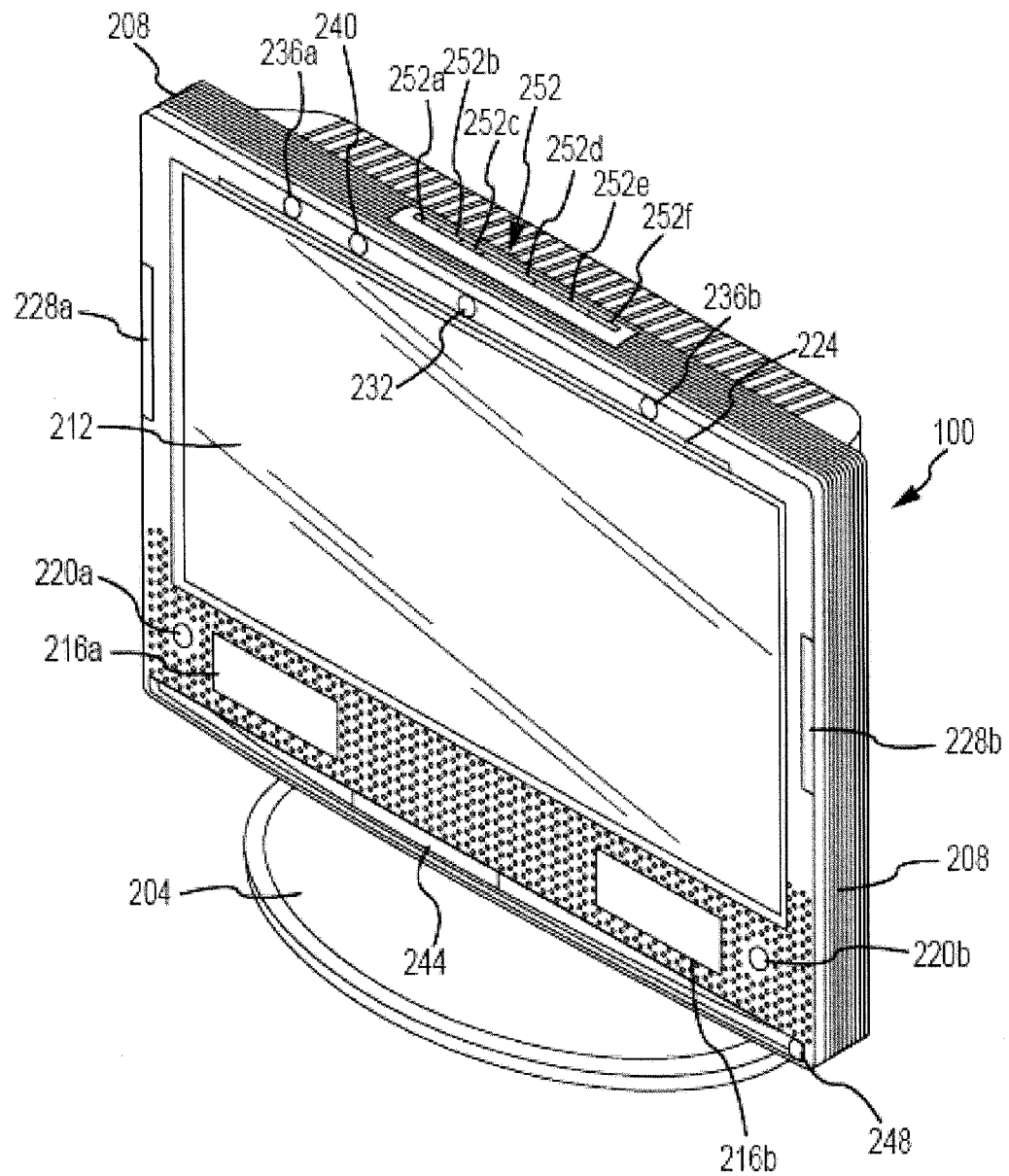
FIG. 2A includes a first view of an embodiment of an intelligent television.

Intelligent TV:

FIGS. 2A-2D illustrate components of the Intelligent TV 100. In general, as shown by FIG. 2A, the Intelligent TV 100 can be supported by a removable base or stand 204 that is attached to a frame 208. The frame 208 surrounds edges of a display screen 212, leaving a front surface of the display screen 212 uncovered. The display screen 212 may comprise a Liquid Crystal Display (LCD) screen, a plasma screen, Light Emitting Diode (LED) screen, or other screen types. In embodiments, the entire front surface of the screen 212 may be touch sensitive and capable of receiving input by the user touching the front surface of the screen 212.

The Intelligent TV 100 may include integrated speakers 216 and at least one microphone 220. A first area of the frame 208 may comprise a horizontal gesture capture region 224 and second areas comprise vertical gesture capture regions 228. The gesture capture regions 224, 228 may comprise areas or regions that are capable of receiving input by recognizing gestures made by the user, and in some examples, without the need for the user to actually touch the screen 212 surface of the Intelligent TV 100. However, the gesture capture regions 224, 228 may not include pixels that can perform a display function or capability.

One or more image capture devices 232, such as a camera, can be included for capturing still and/or video images. The image capture device 232 can include or be associated with additional elements, such as a flash or other light source 236 and a range finding device 240 to assist focusing of the image capture device. In addition, the microphone 220, gesture capture regions 224, 228, image capture devices 232, and the range finding device 240 may be used by the Intelligent TV 100 to recognize individual users. Additionally or alternatively, the Intelligent TV 100 may learn and remember preferences associated with the individual users.

In some embodiments, the learning and remembering (i.e., identifying and recalling stored information) may be associated with the recognition of a user.

An IR transmitter and receiver 244 may also be provided to connect the Intelligent TV 100 with a remote control device (not shown) or other IR devices. Additionally or alternatively, the remote control device may transmit wireless signals via RF, light, and/or a means other than IR. Also shown in FIG. 2A is an audio jack 248, which may be hidden behind a panel that is hinged or removable. The audio jack 248 accommodates a tip, ring, sleeve (TRS) connector, for example, to allow the user to utilize headphones, a headset, or other external audio equipment.

The Intelligent TV 100 can also include a number of buttons 252. For example, FIG. 2A illustrates the buttons 252 on the top of the Intelligent TV 100, although the buttons could be placed at other locations. As shown, the Intelligent TV 100 includes six buttons 252a-f, which can be configured for specific inputs. For example, the first button 252a may be configured as an on/off button used to control overall system power to the Intelligent TV 100. The buttons 252 may be configured to, in combination or alone, control a number of aspects of the Intelligent TV 100. Some non-limiting examples include, but are not limited to, overall system volume, brightness, the image capture device, the microphone, and initiation/termination of a video conference. Instead of separate buttons, two of the buttons may be combined into a rocker button. This rocker button arrangement may be useful in situations where the buttons are configured to control features such as volume or brightness. In some embodiments, one or more of the buttons 252 are capable of supporting different user commands. By way of example, a normal press has a duration commonly of less than about 1 second and resembles a quick input. A medium press has a duration commonly of 1 second or more but less than about 12 seconds. A long press has a duration commonly of about 12 seconds or more. The function of the buttons is normally specific to the application that is active on the Intelligent TV 100. In the video conference application for instance and depending on the particular button, a normal, medium, or long press can mean end the video conference, increase or decrease the volume, increase a rate speed associated with a response to an input, and toggle microphone mute. Depending on the particular button, a normal, medium, or long press can also control the image capture device 232 to increase zoom, decrease zoom, take a photograph, or record video.

Figure 2B:
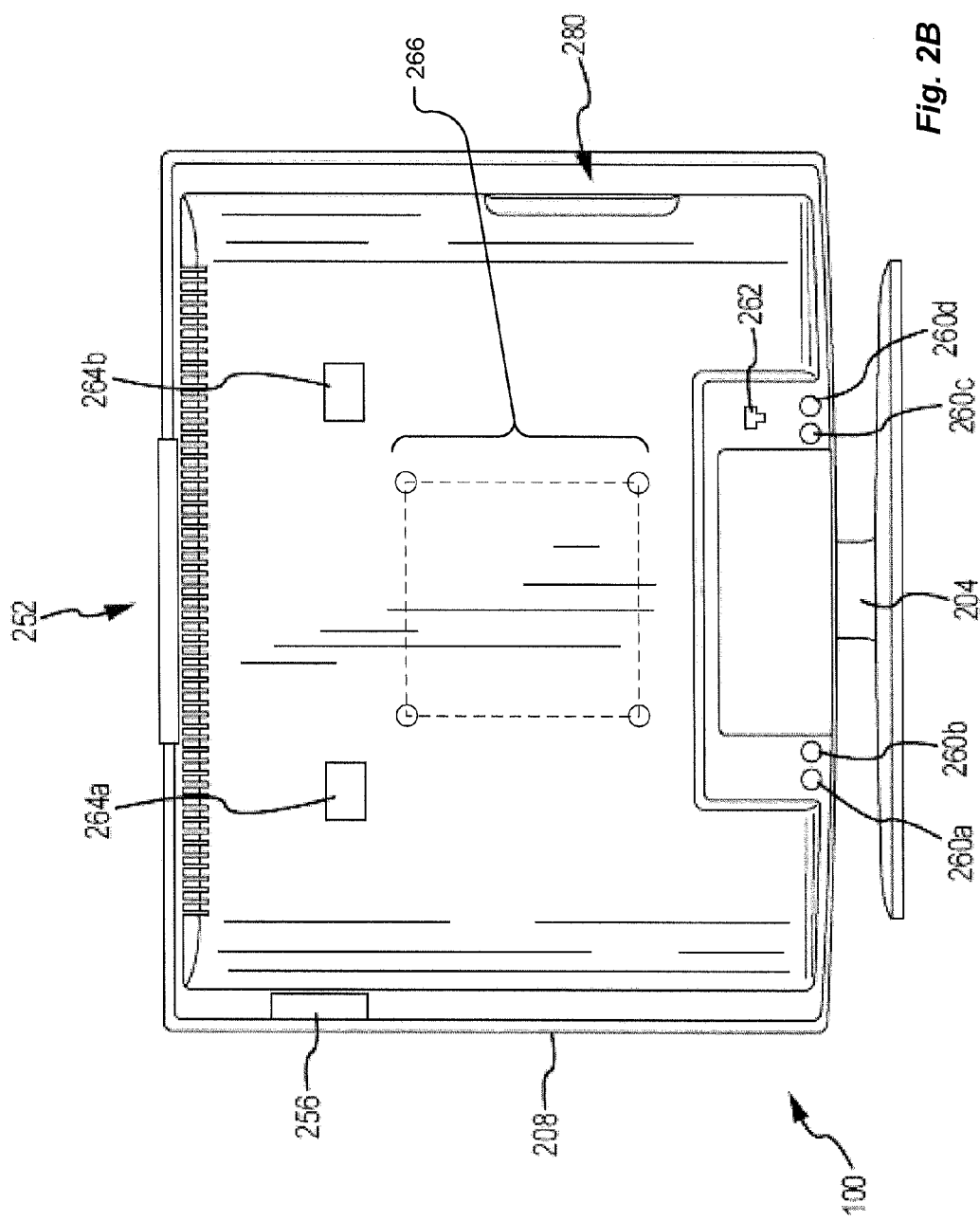
FIG. 2B includes a second view of an embodiment of an intelligent television.

In support of communications functions or capabilities, the Intelligent TV 100 can include one or more shared or dedicated antennae 256 and wired broadband connections 260 as shown in FIG. 2B. The antennae 256 also enable the Intelligent TV 100 to receive digital and/or analog broadcast TV channels. The wired broadband connections 260 are, for example, a Digital Subscriber Line (DSL), an optical line, an Ethernet port, an IEEE 1394 interface, or other interfaces. The Intelligent TV 100 also has a telephone line jack 262 to further provide communications capability.

In addition to the removable base 204, the Intelligent TV 100 may include hardware and mounting points 264 on a rear surface to facilitate mounting the Intelligent TV 100 to a surface, such as a wall. In one example, the Intelligent TV 100 may incorporate at least one Video Equipment Standards Association (VESA) mounting interface for attaching the device 100 to the surface.

Figure 2C:
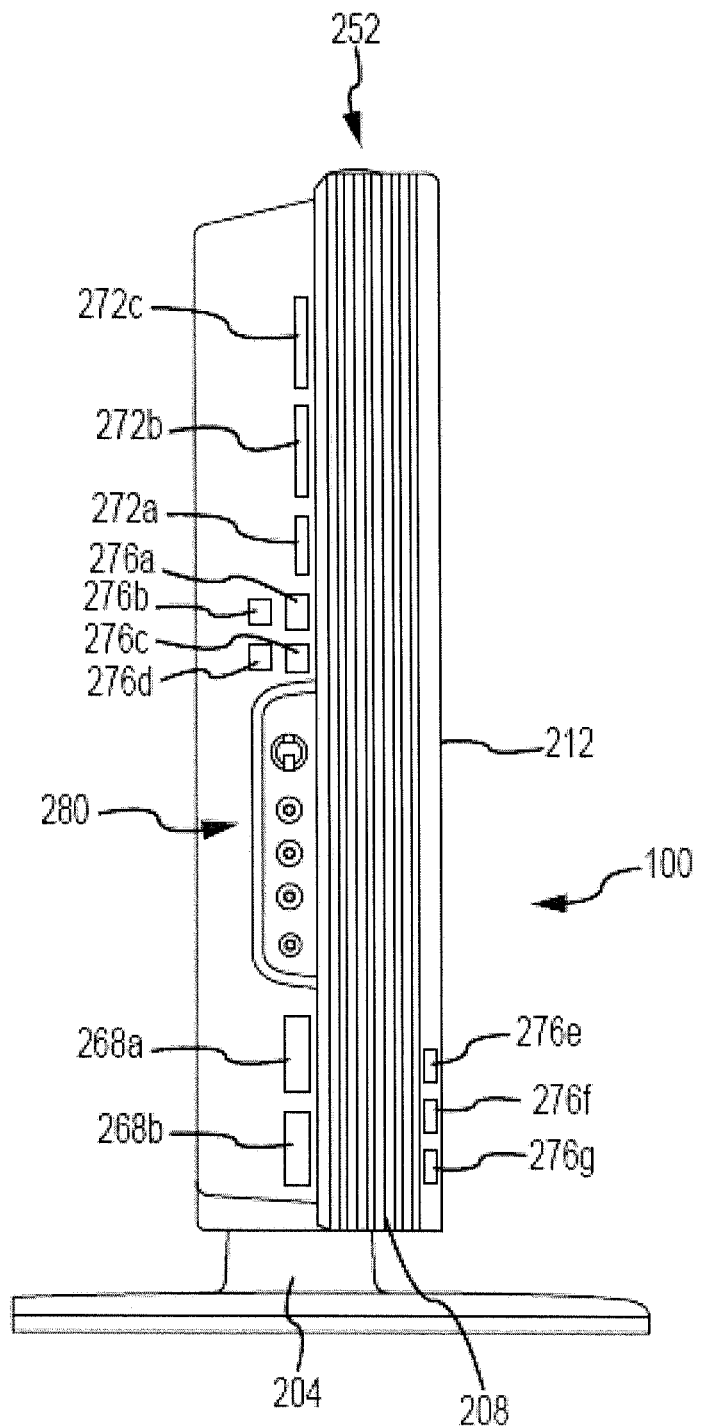
FIG. 2C includes a third view of an embodiment of an intelligent television.
Figure 2D:
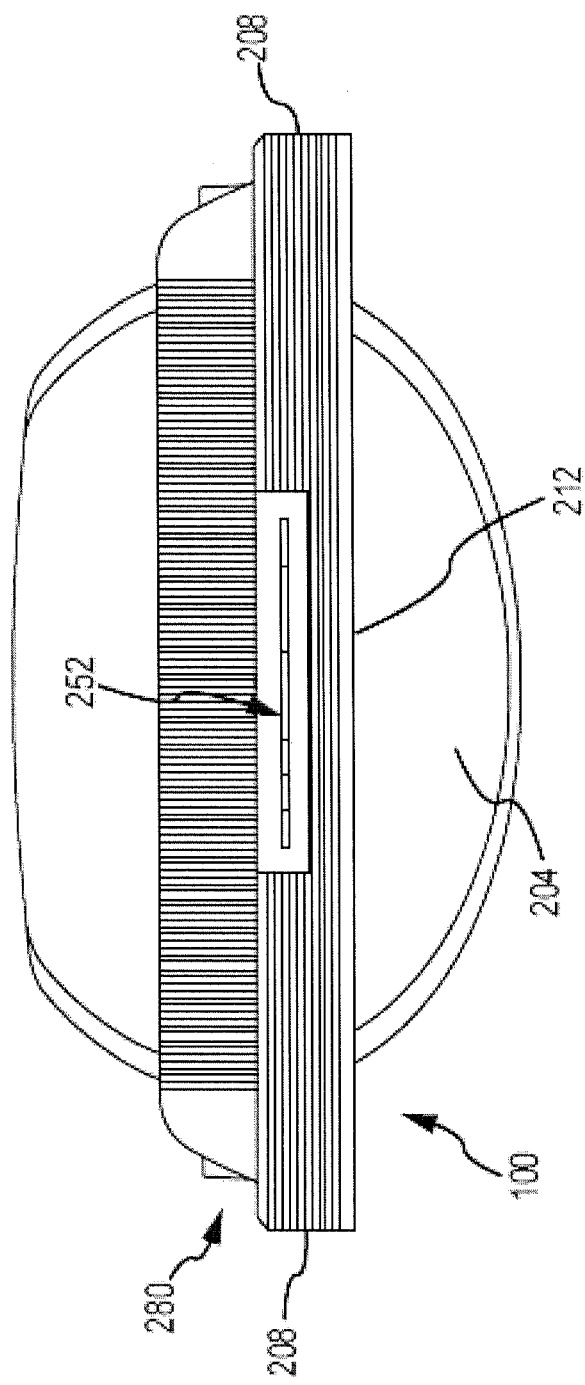
FIG. 2D includes a fourth view of an embodiment of an intelligent television.

As shown in FIG. 2C, the Intelligent TV 100 may include docking interfaces or ports 268. The docking ports 268 may include proprietary or universal ports to support the interconnection of the Intelligent TV 100 to other devices or components, which may or may not include additional or different capabilities from those integral to the Intelligent TV 100. In addition to supporting an exchange of communication signals between the Intelligent TV 100 and a connected device or component, the docking ports 268 can support the supply of power to the connected device or component. The docking ports 268 can also comprise an intelligent element that comprises a docking module for controlling communications or other interactions between the Intelligent TV 100 and the connected device or component.

The Intelligent TV 100 also includes a number of card slots 272 and network or peripheral interface ports 276. The card slots 272 may accommodate different types of cards including subscriber identity modules (SIM), secure digital (SD) cards, MiniSD cards, flash memory cards, and other cards. Ports 276 in embodiments may include input/output (I/O) ports, such as universal serial bus (USB) ports, parallel ports, game ports, and high-definition multimedia interface (HDMI) connectors.

An audio/video (A/V) I/O module 280 can be included to provide audio to an interconnected speaker or other device, and to receive audio input from a connected microphone or other device. As an example, the audio input/output interface 280 may comprise an associated amplifier and analog-to-digital converter.

Figure 3:
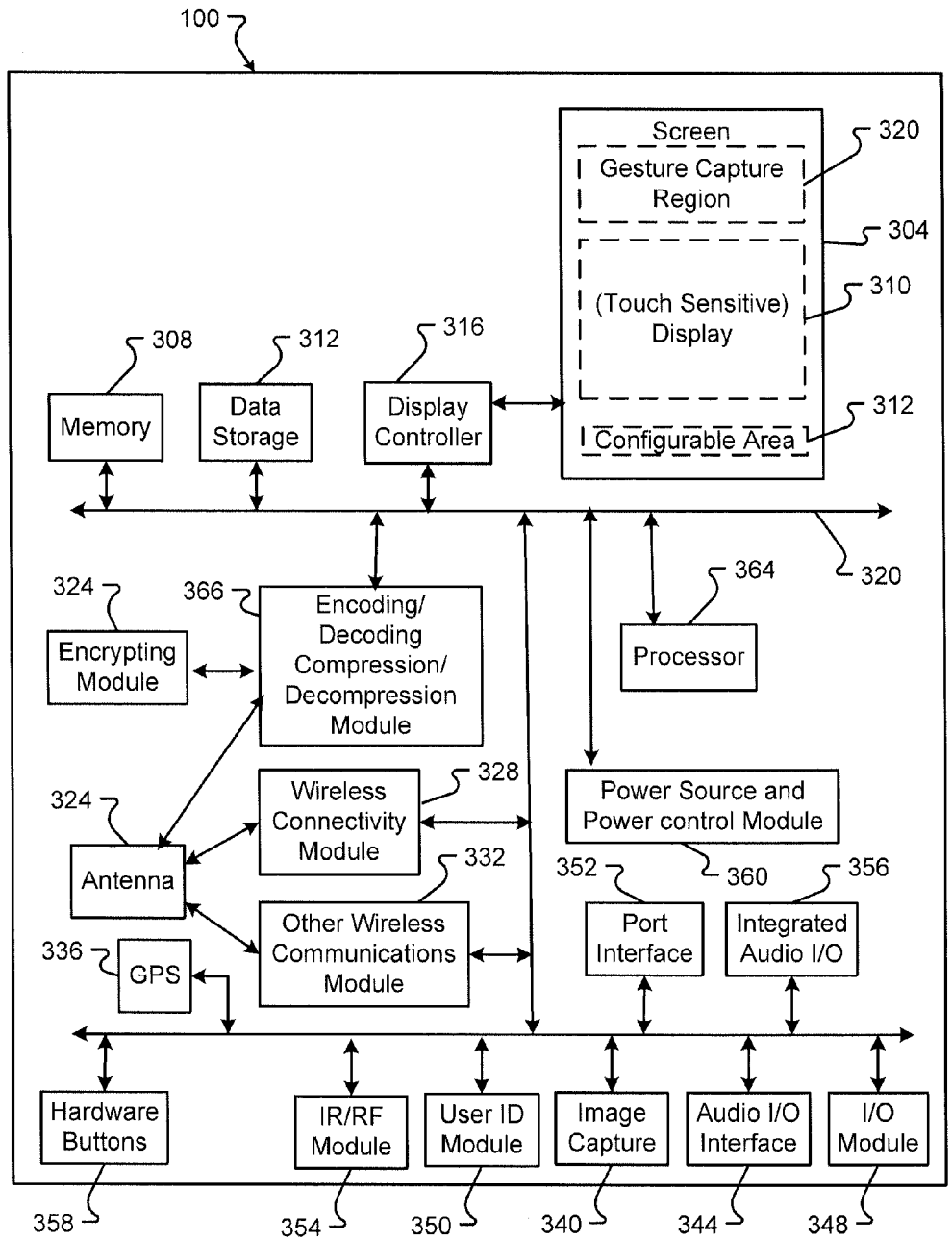
FIG. 3 is a block diagram of an embodiment of the hardware of an intelligent television.

Hardware Features:

FIG. 3 illustrates components of a Intelligent TV 100 in accordance with embodiments of the present disclosure. In general, the Intelligent TV 100 includes a primary screen 304. Screen 304 can be a touch sensitive screen and can include different operative areas.

For example, a first operative area, within the screen 304, may comprise a display 310. In some embodiments, the display 310 may be touch sensitive. In general, the display 310 may comprise a full color, display.

A second area within the screen 304 may comprise a gesture capture region 320. The gesture capture region 320 may comprise an area or region that is outside of the display 310 area, and that is capable of receiving input, for example in the form of gestures provided by a user. However, the gesture capture region 320 does not include pixels that can perform a display function or capability.

A third region of the screen 304 may comprise a configurable area 312. The configurable area 312 is capable of receiving input and has display or limited display capabilities. In embodiments, the configurable area 312 may present different input options to the user. For example, the configurable area 312 may display buttons or other relatable items. Moreover, the identity of displayed buttons, or whether any buttons are displayed at all within the configurable area 312 of a screen 304, may be determined from the context in which the Intelligent TV 100 is used and/or operated.

In an exemplary touch sensitive screen 304 embodiment, the touch sensitive screen 304 comprises a liquid crystal display extending across at least those regions of the touch sensitive screen 304 that are capable of providing visual output to a user, and a capacitive input matrix over those regions of the touch sensitive screen 304 that are capable of receiving input from the user.

One or more display controllers 316 may be provided for controlling the operation of the screen 304. The display controller 316 may control the operation of the touch sensitive screen 304, including input (touch sensing) and output (display) functions. The display controller 316 may also control the operation of the screen 304 and may interface with other inputs, such as infrared and/or radio input signals (e.g., door/gate controllers, alarm system components, etc.). In accordance with still other embodiments, the functions of a display controller 316 may be incorporated into other components, such as a processor 364.

The processor 364 may comprise a general purpose programmable processor or controller for executing application programming or instructions. In accordance with at least some embodiments, the processor 364 may include multiple processor cores, and/or implement multiple virtual processors. In accordance with still other embodiments, the processor 364 may include multiple physical processors. As a particular example, the processor 364 may comprise a specially configured application specific integrated circuit (ASIC) or other integrated circuit, a digital signal processor, a controller, a hardwired electronic or logic circuit, a programmable logic device or gate array, a special purpose computer, or the like. The processor 364 generally functions to run programming code or instructions implementing various functions of the Intelligent TV 100.

In support of connectivity functions or capabilities, the Intelligent TV 100 can include a module for encoding/decoding and/or compression/decompression 366 for receiving and managing digital television information. Encoding/decoding compression/decompression module 366 enables decompression and/or decoding of analog and/or digital information dispatched by a public television chain or in a private television network and received across antenna 324, I/O module 348, wireless connectivity module 328, and/or other wireless communications module 332. The television information may be sent to screen 304 and/or attached speakers receiving analog or digital reception signals. Any encoding/decoding and compression/decompression is performable on the basis of various formats (e.g., audio, video, and data). Encrypting module 368 is in communication with encoding/decoding compression/decompression module 366 and enables the confidentiality of all the data received or transmitted by the user or supplier.

In support of communications functions or capabilities, the Intelligent TV 100 can include a wireless connectivity module 328. As examples, the wireless connectivity module 328 can comprise a GSM, CDMA, FDMA and/or analog cellular telephony transceiver capable of supporting voice, multimedia and/or data transfers over a cellular network. Alternatively or in addition, the Intelligent TV 100 can include an additional or other wireless communications module 332. As examples, the other wireless communications module 332 can comprise a Wi-Fi, Bluetooth™, WiMax, infrared, or other wireless communications link. The wireless connectivity module 328 and the other wireless communications module 332 can each be associated with a shared or a dedicated antenna 324 and a shared or dedicated I/O module 348.

An input/output module 348 and associated ports may be included to support communications over wired networks or links, for example with other communication devices, server devices, and/or peripheral devices. Examples of an input/output module 348 include an Ethernet port, a Universal Serial Bus (USB) port, Thunderbolt™ or Light Peak interface, Institute of Electrical and Electronics Engineers (IEEE) 1394 port, or other interface.

An audio input/output interface/device(s) 344 can be included to provide analog audio to an interconnected speaker or other device, and to receive analog audio input from a connected microphone or other device. As an example, the audio input/output interface/device(s) 344 may comprise an associated amplifier and analog-to-digital converter. Alternatively or in addition, the Intelligent TV 100 can include an integrated audio input/output device 356 and/or an audio jack for interconnecting an external speaker or microphone. For example, an integrated speaker and an integrated microphone can be provided, to support near talk or speaker phone operations.

A port interface 352 may be included. The port interface 352 may include proprietary or universal ports to support the interconnection of the device 100 to other devices or components, such as a dock, which may or may not include additional or different capabilities from those integral to the device 100. In addition to supporting an exchange of communication signals between the device 100 and another device or component, the docking port 136 and/or port interface 352 can support the supply of power to or from the device 100. The port interface 352 also comprises an intelligent element that comprises a docking module for controlling communications or other interactions between the Intelligent TV 100 and a connected device or component. The docking module may interface with software applications that allow for the remote control of other devices or components (e.g., media centers, media players, and computer systems).

An Intelligent TV 100 may also include memory 308 for use in connection with the execution of application programming or instructions by the processor 364, and for the temporary or long term storage of program instructions and/or data. As examples, the memory 308 may comprise RAM, DRAM, SDRAM, or other solid state memory. Alternatively or in addition, data storage 314 may be provided. Like the memory 308, the data storage 314 may comprise a solid state memory device or devices. Alternatively or in addition, the data storage 314 may comprise a hard disk drive or other random access memory.

Hardware buttons 358 can be included for example for use in connection with certain control operations. One or more image capture interfaces/devices 340, such as a camera, can be included for capturing still and/or video images. Alternatively or in addition, an image capture interface/device 340 can include a scanner, code reader, or motion sensor. An image capture interface/device 340 can include or be associated with additional elements, such as a flash or other light source. The image capture interfaces/devices 340 may interface with a user ID module 350 that assists in identifying users of the Intelligent TV 100.

The Intelligent TV 100 can also include a global positioning system (GPS) receiver 336. In accordance with embodiments of the present invention, the GPS receiver 336 may further comprise a GPS module that is capable of providing absolute location information to other components of the Intelligent TV 100. As will be appreciated, other satellite-positioning system receivers can be used in lieu of or in addition to GPS.

Power can be supplied to the components of the Intelligent TV 100 from a power source and/or power control module 360. The power control module 360 can, for example, include a battery, an AC-to-DC converter, power control logic, and/or ports for interconnecting the Intelligent TV 100 to an external source of power.

Communication between components of the Intelligent TV 100 is provided by bus 322. Bus 322 may comprise one or more physical buses for control, addressing, and/or data transmission. Bus 322 may be parallel, serial, a hybrid thereof, or other technology.

Figure 4:
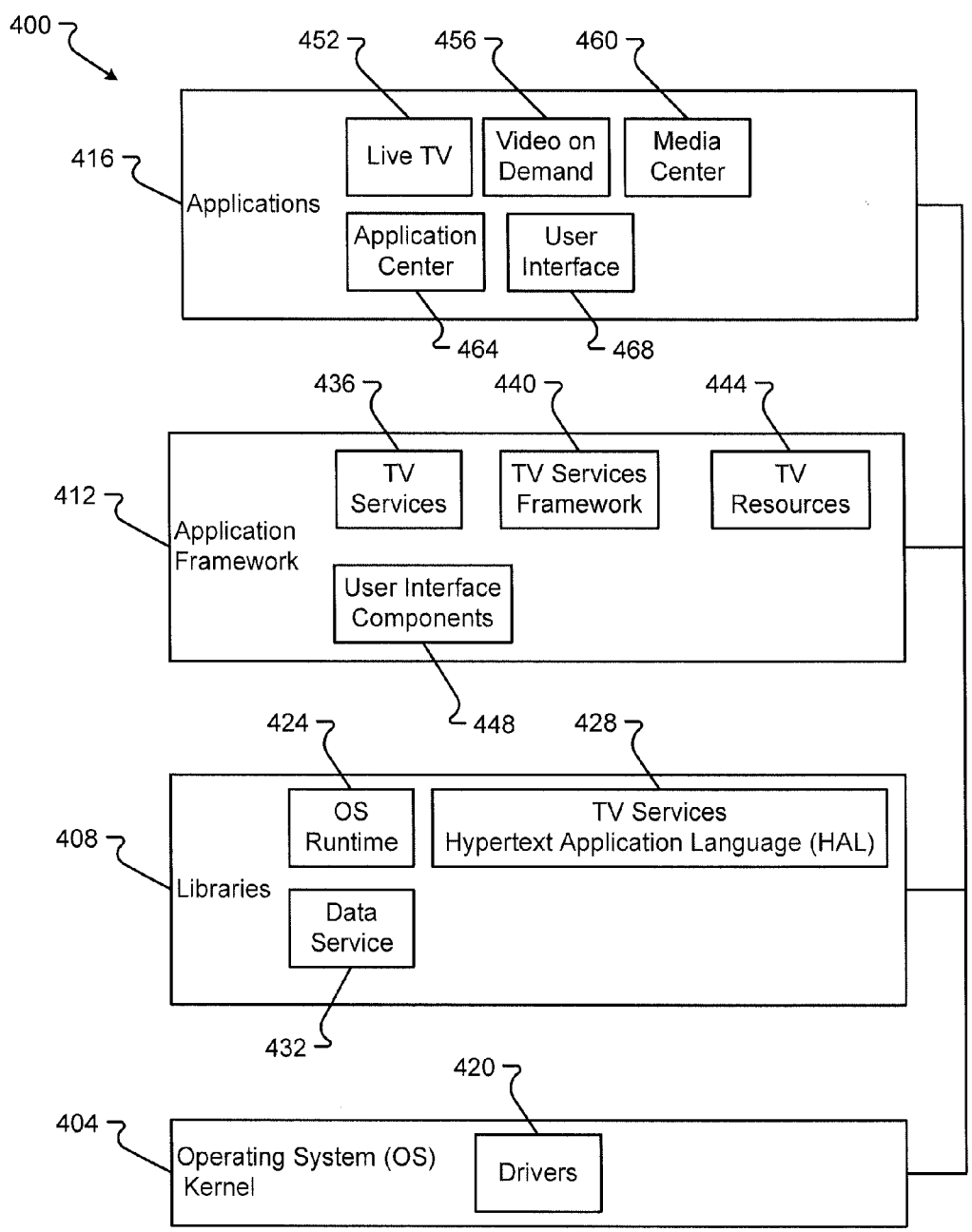
FIG. 4 is a block diagram of an embodiment of the intelligent television software and/or firmware.

Firmware and Software:

An embodiment of the software system components and modules 400 is shown in FIG. 4. The software system 400 may comprise one or more layers including, but not limited to, an operating system kernel 404, one or more libraries 408, an application framework 412, and one or more applications 416. The one or more layers 404-416 can communicate with each other to perform functions for the Intelligent TV 100.

An operating system (OS) kernel 404 contains the primary functions that allow the software to interact with hardware associated with the Intelligent TV 100. Kernel 404 can include a collection of software that manages the computer hardware resources and provides services for other computer programs or software code. The operating system kernel 404 is the main component of the operating system and acts as an intermediary between the applications and data processing done with the hardware components. Part of the operating system kernel 404 can include one or more device drivers 420. A device driver 420 can be any code within the operating system that helps operate or control a device or hardware attached to or associated with the Intelligent TV. The driver 420 can include code for operating video, audio, and/or other multimedia components of the Intelligent TV 100. Examples of drivers include display, camera, flash, binder (IPC), keypad, WiFi, and audio drivers.

Library 408 can contain code or other components that may be accessed and implemented during the operation of the software system 400. The library 408 may contain one or more of, but is not limited to, an operating system runtime library 424, a TV services hardware abstraction layer (HAL) library 428, and/or a data service library 432. The OS runtime library 424 may contain the code required by the operating system kernel 404 or other operating system functions to be executed during the runtime of the software system 400. The library can include the code that is initiated during the running of the software system 400.

The TV services hardware abstraction layer library 428 can include code required by TV services either executed in the application framework 412 or an application 416. The TV services HAL library 428 is specific to the Intelligent TV 100 operations that control different functions of the Intelligent TV. The TV service HAL library 428 can also be formed from other types of application languages or embodiments of different types of code or formats for code beyond the hardware abstraction layer.

Figure 6:
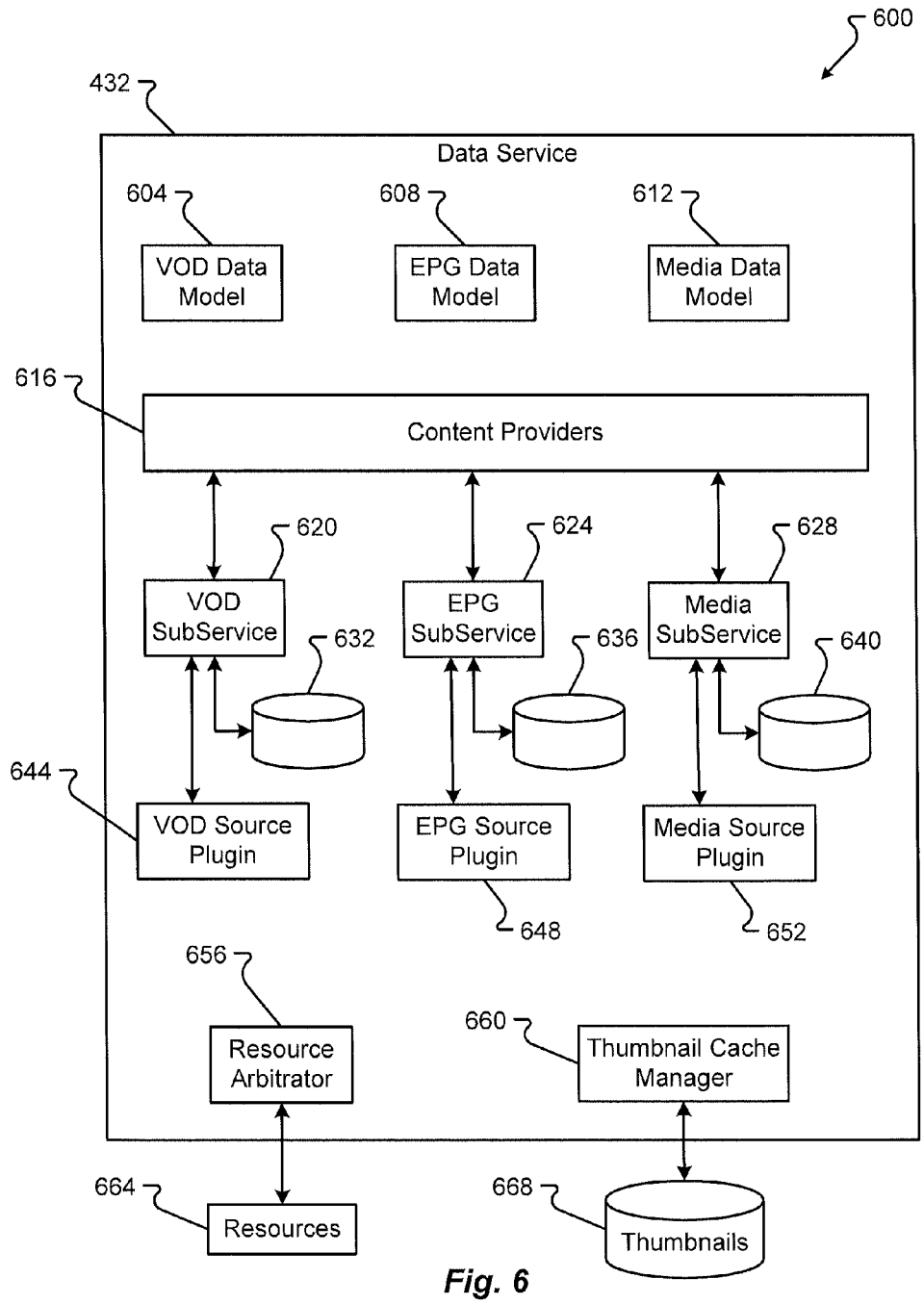
FIG. 6 is a third block diagram of an embodiment of the intelligent television software and/or firmware.

The data services library 432 can include the one or more components or codes to implement components for the data services function. The data services function can be implemented in the application framework 412 and/or applications layer 416. An embodiment of a function of the data services and the type of components that may be included is shown in FIG. 6.

The application framework 412 can include a general abstraction for providing functionality that can be selected by one or more applications 416 to provide specific application functions or software for those applications. Thus, the framework 412 can include one or more different services, or other applications, that can be accessed by the applications 416 to provide general functions across two or more applications. Such functions include, for example, management of one or more windows or panels, surfaces, activities, content, and resources, The application framework 412 can include one or more, but is not limited to, TV services 434, TV services framework 440, TV resources 444, and user interface components 448.

The TV services framework 440 can provide an additional abstraction for different TV services. TV services framework 440 allows for the general access and function of services that are associated with the TV functionality. The TV services 436 are general services provided within the TV services framework 440 that can be accessed by applications in the applications layer 416. The TV resources 444 provide code for accessing TV resources 444 including any types of storage, video, audio, or other functionality provided with the Intelligent TV 100. The TV resources 444, TV services 436, and TV services framework 440 provide for the different implementations of TV functionality that may occur with the Intelligent TV 100.

One or more user interface components 448 can provide general components for display of the Intelligent TV 100. The user interface components 448 might be general components that may be accessed by different applications provided in the application framework 412. The user interface components 448 may be accessed to provide for panels and silos as described in conjunction with FIG. 5.

The applications layer 416 can both contain and execute applications associated with the Intelligent TV 100. Applications layer 416 may include one or more of, but is not limited to, a live TV application 452, a video on demand application 456, a media center application 460, an application center application 464, and a user interface application 468. The live TV application 452 can provide live TV over different signal sources. For example, the live TV application 452 can provide TV from input from cable television, over air broadcasts, from satellite services, or other types of live TV services. Live TV application 452 may then present the multimedia presentation or video and audio presentation of the live television signal over the display of the Intelligent TV 100.

The video on demand application 456 can provide for video from different storage sources. Unlike Live TV application 452, video on demand 456 provides for display of videos that are accessed from some memory source. The sources of the video on demand can be associated with users or with the Intelligent TV or some other type of service. For example, the video on demand 456 may be provided from an iTunes library stored in a cloud, from a local disc storage that contains stored video programs, or from some other source.

The media center application 460 can provide applications for different types of media presentation. For example, the media center 460 can provide for displaying pictures or audio that is different from, but still accessible by the user and different from live TV or video on demand. The media center 460 allows for the access of different sources to obtain the media in the display of such media on the Intelligent TV 100.

The application center 464 allows for the provision, storage and use of applications. An application can be a game, a productivity application, or some other application generally associated with computer systems or other devices, but may be operated within the Intelligent TV. An application center 464 may obtain these applications from different sources, store them locally and then execute those types of applications for the user on the Intelligent TV 100.

Figure 5:
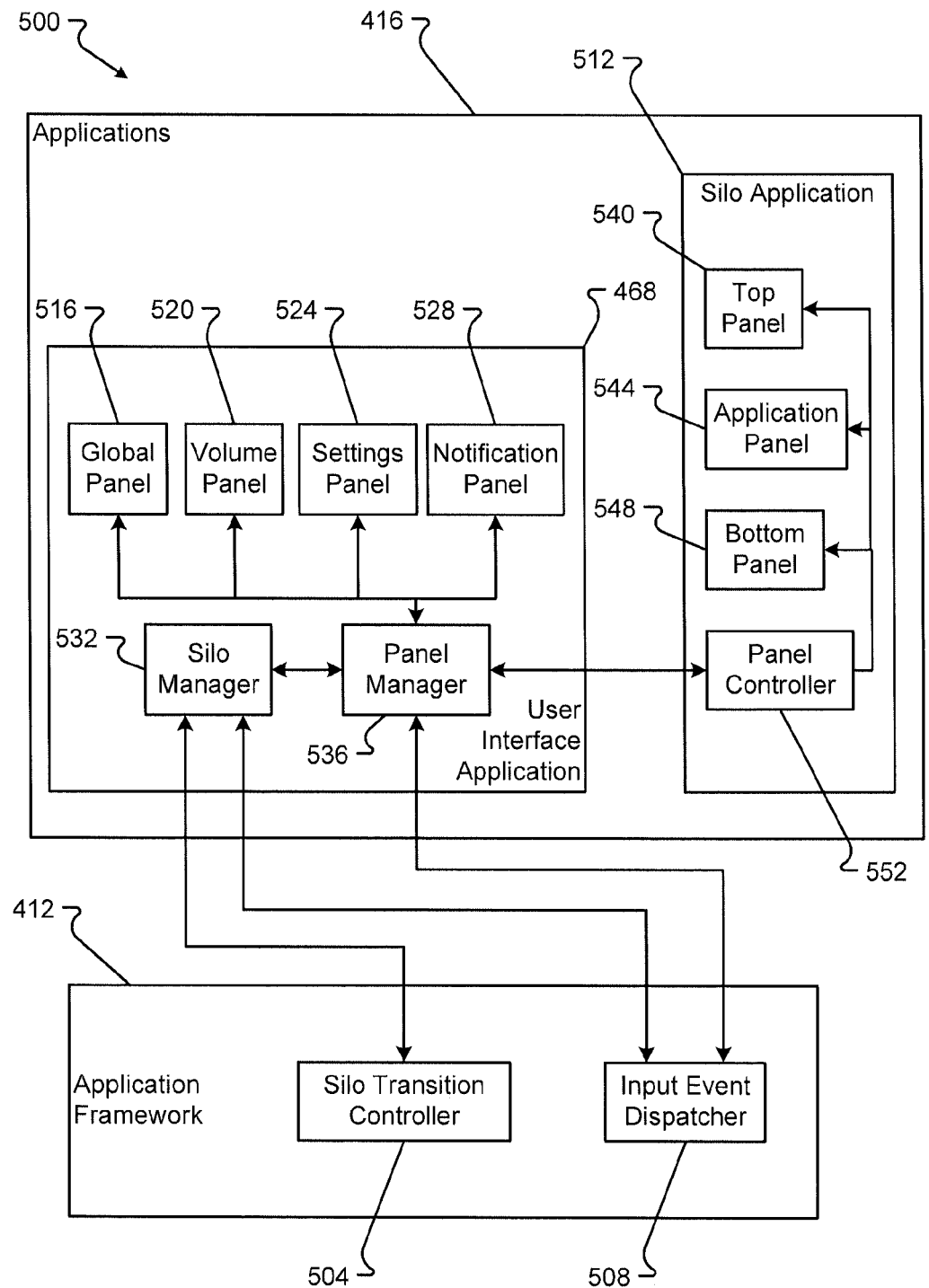
FIG. 5 is a second block diagram of an embodiment of the intelligent television software and/or firmware.

User interface application 468 provides for the specific user interfaces associated with the Intelligent TV 100. These user interfaces can include the silos and panels that are described in FIG. 5. An embodiment of the user interface software 500 is shown in FIG. 5. Here the application framework 412 contains one or more code components which help control the user interface events while one or more applications in the applications layer 416 affects the user interface use for the Intelligent TV 100. The application framework 412 can include a silo transition controller 504 and/or an input event dispatcher 508. There may be more or fewer code components in the application framework 412 than those shown in FIG. 5. The silo transition controller 504 contains the code and language that manages the transitions between one or more silos. A silo can be a vertical user interface feature on the Intelligent TV that contains information for user. The transition controller 504 can manage the changes between two silos when an event occurs in the user interface. The input event dispatcher 508 can receive user interface events that may be received from the operating system and provided to the input event dispatcher 508. These events can include selections of buttons on a remote control or on the TV or other types of user interface inputs. The input event dispatcher 508 may then send these events to a silo manager 532 or panel manager 536 depending on the type of the event. The silo transition controller 504 can interface with the silo manager 532 to affect changes in the silos.

The applications layer 416 can include a user interface application 468 and/or a silo application 512. The applications layer 416 can include more or fewer user interface applications as necessary to control the user interface of the Intelligent TV 100 than those shown in FIG. 5. The user interface application 468 can include a silo manager 532, a panel manager 536, and one or more types of panels 516-528. The silo manager 532 manages the display and/or features of silos. The silo manager 532 can receive or send information from the silo transition controller 504 or the input event dispatcher 508 to change the silos displayed and/or to determine types of input received in the silos.

A panel manager 536 is operable to display panels in the user interface to manage transitions between those panels or to affect user interface inputs received in the panel. The panel manager 536 may thus be in communication with different user interface panels such as a global panel 516, a volume panel 520, a settings panel 524, and/or a notification panel 528. The panel manager 536 can display these types of panels depending on the inputs received from the input event dispatcher 508. The global panel 516 may include information that is associated with the home screen or top level hierarchal information for the user. A volume panel 520 may display information about an audio volume control or other settings for volume. A settings panel 524 can include information displayed about the settings of the audio or video, or other settable characteristics of the Intelligent TV 100. A notification panel 528 can provide information about notifications to a user. These notifications can be associated with information, such as, video on demand displays, favorites, currently provided programs, or other information. Notifications can be associated with the media or with some type of setting, or operation or the Intelligent TV 100. The panel manager 536 may be in communication with the panel controller 552 of the silo application 512.

The panel controller 552 may operate to control portions of the panels of the types described previously. Thus, the panel controller 552 may be in communication with a top panel application 540, an application panel 544, and/or bottom panel 548. These types of panels may be differently displayed in the user interface of the Intelligent TV 100. The panel control thus may be based on the configuration of the system or the type of display being used currently, put the types of panels 516-528 into a certain display orientation governed by the top panel application 540, application panel 544, or bottom panel application 548.

An embodiment of the data service 432 and the operation of the data management is shown in FIG. 6. The data management 600 can include one or more code components that are associated with different types of data. For example, there may be code components within the data service 432 that execute and are associated with video on demand, the electronic program guide, or media data. There may be more or fewer types of data service 432 components than those shown in FIG. 6. Each of the different types of data may include a data model 604-612. The data models govern what information is to be stored and how that information will be stored by the data service. Thus, the data model can govern regardless of where the data comes from, how the data will be received or managed within the Intelligent TV system. Thus, the data model 604, 608, and/or 612, can provide a translation ability or affect the ability to translate data from one form to another to be used by the Intelligent TV 100.

The different types of data services (video on demand, electronic programming guide, media) each have a data subservice 620, 624, and/or 628 that is in communication with one or more internal and/or external content providers 616. The data subservices 620, 624, and 628 that communicate with the content providers 616 to obtain data that may then be stored in databases 632, 636, and 640. The subservices 620, 624, and 628 may communicate with and initiate or enable one or more source plug-ins 644, 648, and 652 to communicate with the content provider. For each content provider 616, there may be a different source plug-in 644, 648, and 652. Thus, if there is more than one source of content for the data, each of the data subservices 620, 624, and 628 may determine and then enable or initiate a different source plug-in 644, 648, and/or 652. The content providers 616 may also provide information to a resource arbitrator 656 and/or thumbnail cache manager 660. The resource arbitrator 656 may operate to communicate with resources 664 that are external to the data service 432. Thus, the resource arbitrator 656 may communicate with cloud based storage, network based storage, or other types of external storage in the resources 664. This information may then be provided through the content provider module 616 to the data subservices 620, 624, 628. Likewise, a thumbnail cache manager 660 may obtain thumbnail information from one of the data subservices 620, 624, 628 and store that information in the thumbnails database 668. Further, the thumbnail cache manager 660 may extract or retrieve that information from the thumbnails database 668 to provide to one of the data subservices 620, 624, 628.

Figure 13:
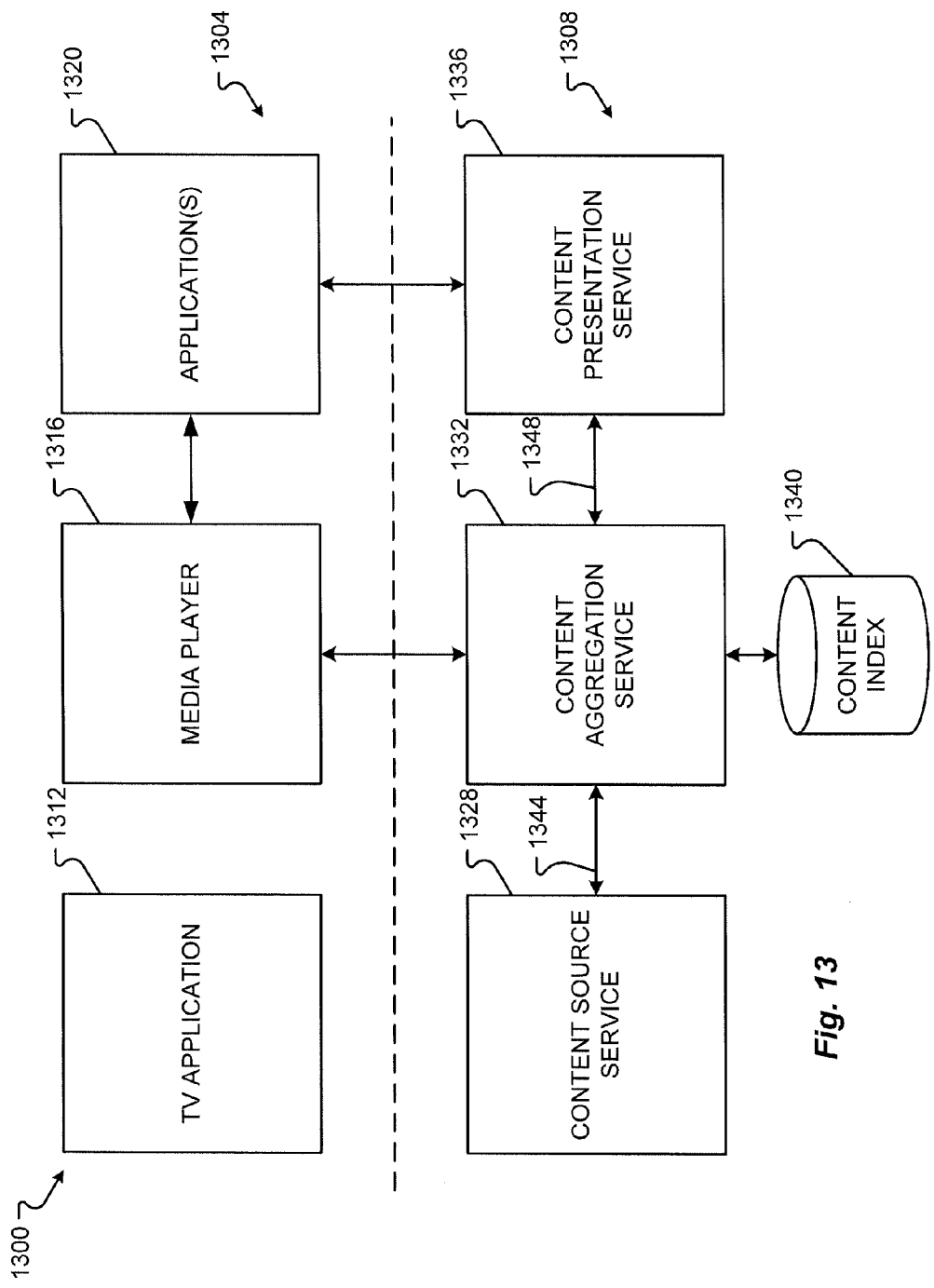
FIG. 13 is a block diagram of an embodiment of a content data service.

An exemplary content aggregation architecture 1300 is shown in FIG. 13. The architecture can include a user interface layer 1304 and a content aggregation layer 1308. The user interface layer 1304 may include a TV application 1312, media player 1316, and application(s) 1320. The TV application 1312 enables the viewer to view channels received via an appropriate transmission medium, such as cable, satellite, and/or the Internet. The media player 1316 views other types of media received via an appropriate transmission medium, such as the Internet. The application(s) 1320 include other TV-related (pre-installed) applications, such as content viewing, content searching, device viewing, and setup algorithms, and coordinates with the media player 1316 to provide information to the viewer.

The content source layer 1308 includes, as data services, a content source service 1328, a content aggregation service 1332 and a content presentation service 1336. The content source service 1328 can manage content source investigators, including local and/or network file system(s), digital network device manager (which discovers handheld and non-handheld devices (e.g., digital media servers, players, renderers, controllers, printers, uploaders, downloaders, network connectivity functions, and interoperability units) by known techniques, such as a multicast universal plug and play or UPnP discovery techniques, and, for each discovered device, retrieves, parses, and encodes device descriptors, notifies the content source service of the newly discovered device, and provides information, such as an index, on previously discovered devices), Internet Protocol Television or IPTV, digital television or DTV (including high definition and enhanced TV), third party services (such as those referenced above), and applications (such as Android applications).

Content source investigators can track content sources and are typically configured as binaries. The content source service 1328 starts content source investigators and maintains open and persistent channels for communications. The communications include query or command and response pairs. The content aggregation service 1332 can manage content metadata fetchers, such as for video, audio, and/or picture metadata. The content presentation service 1336 may provide interfaces to the content index 1340, such as an Android application interface and digital device interfaces.

The content source service 1328 can send and receive communications 1344 to and from the content aggregation service 1332. The communications can include notifications regarding new and removed digital devices and/or content and search queries and results. The content aggregation service 1332 can send and receive communications 1348 to and from the content presentation service 1336 including device and/or content lookup notifications, content-of-interest advisories and notifications, and search queries and results.

When a search is performed, particularly when the user is searching or browsing content, a user request may be received from the user interface layer 1300, by the content presentation service 1336, which responsively opens a socket and sends the request to the content aggregation service 1332. The content aggregation service 1332 first returns results from the local database 1340. The local database 1340 includes an index or data model and indexed metadata. The content source service 1328 further issues search and browse requests for all content source investigators and other data management systems. The results are forwarded to the content aggregation service 1332, which updates the database 1340 to reflect the further search results and provides the original content aggregation database search results and the data updates, reflecting the additional content source service search results, over the previously opened socket to the content presentation service 1336. The content presentation service 1336 then provides the results to one or more components in the user interface layer 1300 for presentation to the viewer. When the search session is over (e.g., the search session is terminated by the user or by an action associated with user), the user interface layer 1300 disconnects the socket. As shown, media can be provided directly by the content aggregation service 1332 to the media player 1316 for presentation to the user.

Figure 7:
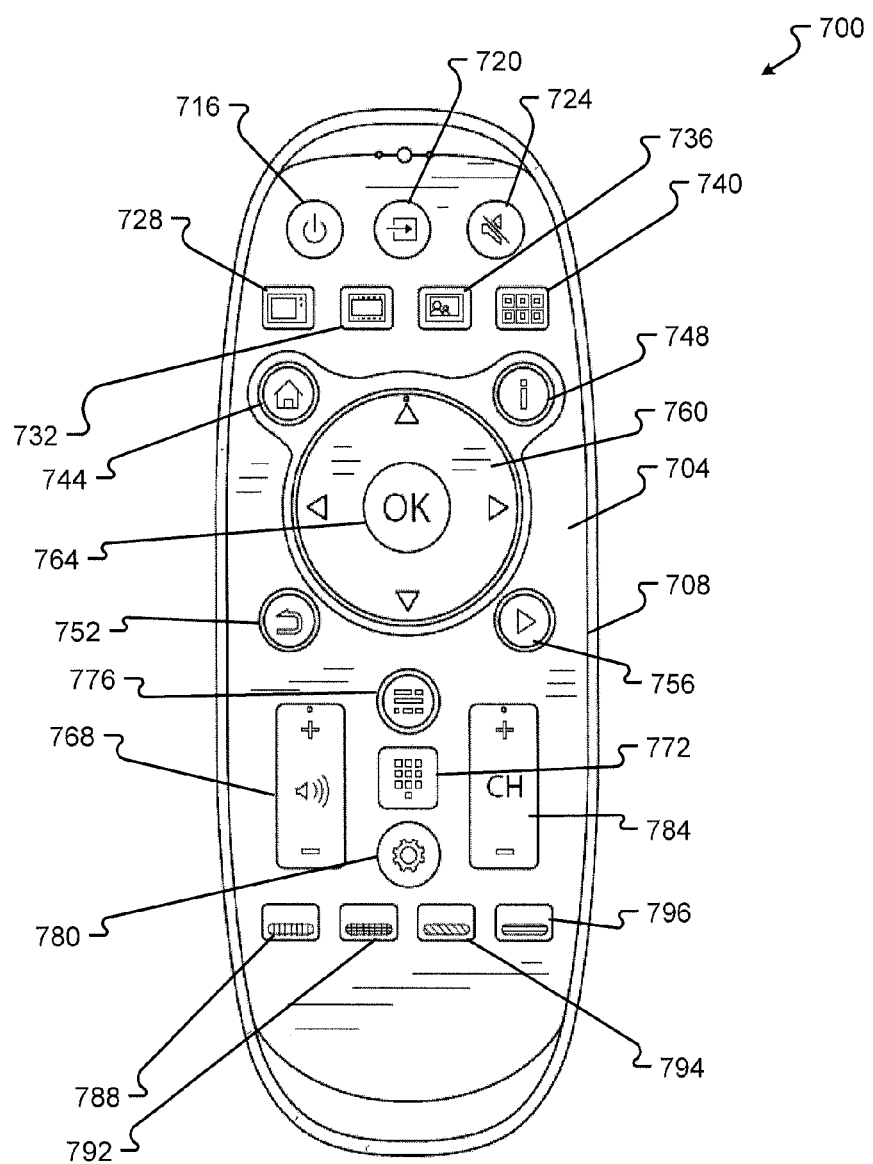
FIG. 7 is a plan view of an embodiment of a handheld remote control.

Remote Control:

A handheld remote control can be provided to enable user interaction with the Intelligent TV 100. An exemplary handheld remote control is shown in FIGS. 7-9. The remote control 700 can include one or more of, but is not limited to, top, side and bottom housings 704, 708, and 712, an (on/off) power button 716, an input source button 720 (to select input source such as Live TV, video on demand, media center, application center, high definition multimedia interface or HDMI, component or COMP, audio/Video or A/V, digital or analog television or DTV/ATV, and video graphics array (VGA)), a (volume) mute button 724, a Live TV button 728 (to activate or select the Live TV silo), a video on demand (VOD) button 732 (to activate or select the video on demand silo), a media center button 736 (to activate or select the media center application or silo, which access various types of media such as music, TV programming, videos, and the like), an application center button 740 (to activate or select the application center application or silo), a global panel button 744, an application panel button 748, a back button 752 (to select a prior user operation or Intelligent TV state and/or navigate up a hierarchy of any displayed image or object(s) (in which case the back button 752 does not navigate within application panels or across application silos), a play button 756 (to play or pause media), a D-pad 760 (which includes north, east, west, and south directional arrows to navigate among displayed images and/or move between levels of an application's or object's hierarchy such as application view navigation, panel navigation, and collection navigation), an OK (or select) button 764 (to select a highlighted displayed image (such as displayed speed control, rewind, forward, play, and pause objects and/or objects on menu bar or in a menu box) and/or navigate down a hierarchy of any displayed image or object(s)), a rocker-type volume-up and volume-down button 768 (to adjust the volume), a menu/guide button 772 (to select for display a menu or guide of programming), a 0-9 (number) button 776 (to display a number pad on the TV screen), a settings button 780 (which launches an application to access current and change TV settings (such as channel settings and settings used to adjust picture and sound effects (e.g., image mode (e.g., standard, playground, game, cinema, concert, and studio), brightness, contrast, saturation, color temperature, energy savings, 3D noise reduction, hue, sharpness, zoom mode (e.g., full screen, standard, smart zoom, and dot-to-dot), picture position, 3D mode, for picture, and sound retrieval system or SRS TruSurround, sound mode (e.g., standard, live 1, live 2, theatre, music, speech, user equalizer mode, Left/Right speaker balance, auto volume control, Sony/Philips Interconnect Format or S/PDIF (off, auto, pulse code modulation or PCM) for sound) and system settings (such as system (e.g., selected language for graphical user interface, user geographical and/or geopolitical location information, input method, area settings, and sleep time), network (e.g., WiFi, WiFi hotspot, WiFi direct, Point-to-Point Protocol over Ethernet or PPPoE (asymmetric digital subscriber line or ADSL), Ethernet) settings (e.g., enabled and disabled and selected and non-selected) and information (e.g., network information (e.g., electronic address such as Internet Protocol or IP address, subnet mask, gateway, domain name server information, domain name, Media Access Control or MAC address, service set identification or SSID, security information, and password information) and inline status), manage applications (e.g., currently installed applications, currently executing applications, and internal and external computer readable medium usage), and view user information regarding the Intelligent TV 100)), a rocker-type channel-up and channel-down button 784 (to increment or decrement the selected channel), and first, second, third and fourth hotkeys 788, 792, 794, and 796, and/or a moveable joystick 900 on a bottom of the remote control 700. The first, second, third, and fourth hotkeys are generally assigned different colors, which color indexing is depicted as visual indicia on a selected panel to show the currently assigned function, if any, for each hotkey. As can be seen, the actuator layout can provide a highly efficient, satisfactory, and easily usable experience to the end user.

Unlike the functional associations and functions of many of the actuators, those of some of the actuators are not readily apparent. A number of examples will now be discussed by way of illustration.

The media center button 736, when selected, can provide information regarding music, videos, photographs, collections or groupings of music, videos, and/or photographs, and internal and external computational devices (such as personal computers, laptops, tablet computers, wireless phones, removable computer readable media, and the like), which can be grouped in a selected manner (such as favorites, most recently viewed, most watched or viewed, and most recently added). The information can includes previews (which can include selected portions of the media content, duration, file size, date created, date last watched, times watched or viewed, and audio and/or video format information).

The application center button 740, when selected, may provide information regarding pre-installed and downloaded applications. Unlike downloaded applications, pre-installed applications cannot be removed by the user or manually updated. Exemplary pre-installed applications include web browser, settings control, and content search algorithms. By way of illustration, the application center button 740 can provide a scrollable graphical grid of icons (each icon being associated with an application) currently available in the application center.

The global panel button 744, when selected, can provide the user, via one or more panels or windows, with access to one or more of, but not limited to, silos, notifications, a web browser, system settings, and/or information associated therewith. For example, the global panel button 744 can enable the user to determine what external devices are currently connected to and/or disconnected from the Intelligent TV 100, determine what inputs (e.g., HDMI ports) are currently available for connecting to external devices, determine a connection and/or operational status of a selected external device and/or network (e.g., WiFi connected, Ethernet connected, and offline), assign a custom (or user selected) name to each input source, determine what content is currently being offered on Live TV, on demand, the media center, and/or the application center, access vendor messages and notifications to the user (e.g., system and/or application updates are available), activate the Internet browser, and/or access shortcuts on a displayed shortcut bar to more frequently used and desired applications. Common shortcuts are Internet browser (e.g., Internet search engine), system settings, and notifications. The common types of panels are for information (which is typically information related to a currently displayed image and/or content (e.g., title, date/time, audio/visual indicator, rating, and genre), browse requests, and/or search requests (such as search term field)). Each of the panel types may include a panel navigation bar, detailed information or relevant content to the panel function, operation and/or purpose, and a hotkey bar (defining currently enabled functional associations of hotkeys).

The application panel button 748, when selected, can display an application window or panel. One application panel may be an information panel regarding a selected (pre-installed or previously downloaded) application icon. The information panel can one or more of identify the selected application, provide a description of the functionality (including application developer and/or vendor, version, release, and/or last update date and a category or type of application based on the application's functionality) and user ratings and/or degree of other user downloading of the application (e.g., a star rating assigned based on one or more of the foregoing inputs), provide the option to launch, remove, update, and add to favorites the identified application, and provide a listing of selectable links of other (not yet downloaded) recommended applications that provide similar functionality to the identified application. The latter listing can, in turn, provide a description of the functionality (including application developer and/or vendor, version, release, and/or last update date and a category or type of application based on the application's functionality) and user ratings and/or degree of other user downloading of the application (e.g., a star rating assigned based on one or more of the foregoing inputs).

The functions of the first, second, third, and fourth hotkeys 788, 792, 794, and 796 can change depending on system state, context, and/or, within a selected screen and/or panel, based on a content or currently selected portion of (or relative cursor position on) the screen. Commonly, a currently assigned function of any of the first, second, third, and fourth hotkeys 788, 792, 794, and 796 depends on a currently accessed silo and/or panel (with which the user is currently interacting within the silo). In other words, a first function of one of the first, second, third, and fourth hotkeys 788, 792, 794, and 796 is activated by the respective hotkey in a first system state while a different second function is activated by the respective hotkey in a different second system state. In another example, a third function of one of the first, second, third, and fourth hotkeys 788, 792, 794, and 796 is activated by the respective hotkey when a user focus (or currently selected cursor position or screen portion) is at a first screen position while a different fourth function is activated by the respective hotkey when a user focus (or currently selected cursor position or screen portion) is at a different second screen position. The first screen position can, for instance, be within an icon while the second screen position is outside of the icon. Hotkey functionality that could be enabled when in the first screen position may be "configure" and "remove" and disabled is "add", and, when in the second position hotkey functionality enabled can be "add" and disabled is "configure" and "remove". Generally, the states of hotkeys can include normal (for enabled actions or functions), disabled (when an action or function is temporarily disabled), pressed (when selected by a user to command an action or function to be performed), and unavailable (when no association between the hotkey and an action or function is currently available). While examples of hotkey functions are discussed below, it is to be understood that these are not intended to be exhaustive or limiting examples.

The first hotkey 788, when selected in a first system state, can enable the user to assign, change, or edit a name of an input source. It is typically enabled only when the input source of HDMI, Comp/YPbPr (e.g., component video cables), video output, and VGA is in focus. When selected in a second system state, the first hotkey 788 can return the user to a top of a scrollable collection of objects, such as application icons.

The second hotkey 792 may show all or less. In other words, the hotkey 792 can allow the user to show all inputs, including the unconnected/undetected ones and to hide the unconnected/undetected inputs, e.g., to expand and collapse the silo/input list. Each input source can have one of two states, namely connected/detected and unconnected/undetected. Some input sources, including Live TV, video on demand, media center, and application center are always connected/detected.

Figure 9B:
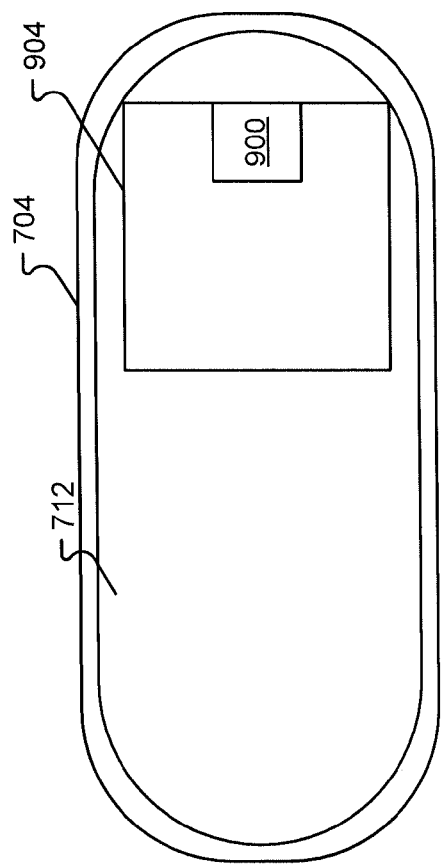
FIG. 9B is a bottom view of an embodiment of a remote control with the joystick in a lower position.
Figure 9C:
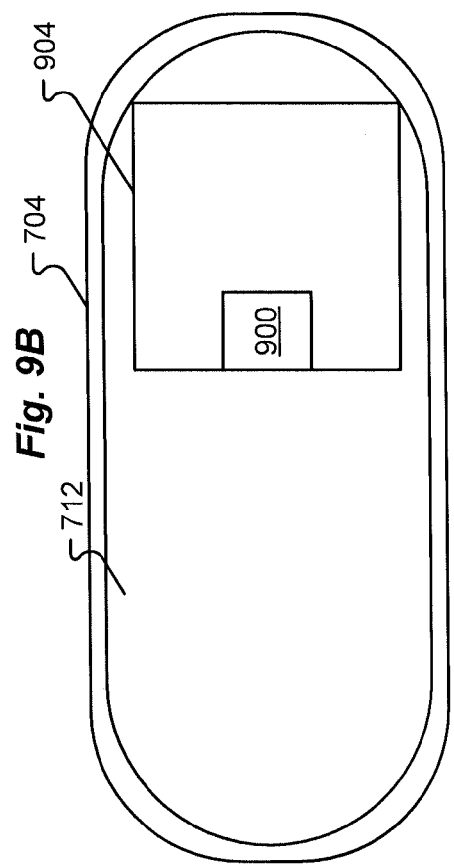
FIG. 9C is a bottom view of an embodiment of a remote control with the joystick in an upper position.

The moveable joystick 900 on the bottom of the remote control 700, when manipulated, can cause a displayed image on the Intelligent TV 100 screen to be displaced a proportional amount. In other words, the displayed image is displaced substantially simultaneously with displacement of the joystick 900 within the joystick aperture 904 in the bottom housing 712 of the remote control. As shown in FIGS. 9B-C, the joystick 900 moves or slides between forward and reverse positions. Releasing the joystick 900 causes the joystick 900 to return to the center position of FIG. 9A, and the window to move or slide upwardly (when the joystick is released from the joystick position of FIG. 9B) or downwardly (when the joystick is released from the joystick position of FIG. 9C) until it disappears from view as shown in FIG. 11A. The effect on the screen of the Intelligent TV 100 is shown in FIGS. 11A-C. In FIG. 11A, video content, such as TV programming, a video, movie, and the like, is being displayed by front surface of the screen 212. In FIG. 11B, the joystick 900 is moved or slid to the upper position of FIG. 9B, and a drop down window or panel 1100 moves or slides down (at the substantially the same rate of joystick 900 movement) at the top of the screen 212. In FIG. 11C, the joystick 900 is moved or slid to the lower position of FIG. 9C, and a drop up window or panel 1100 moves or slides up (at the substantially the same rate of joystick 900 movement) at the bottom of the screen 212. The window 1100 partially covers the video content appearing on the remainder of the screen 212 and/or causes a portion of the screen 212 displaying video content to move and/or compress up or down the height of the window 1100.

The window 1100 can include one or more of information (which is typically information related to a currently displayed image and/or content (e.g., panel navigation bar, detailed information (e.g., title, date/time, audio/visual indicator, rating, and genre), and hotkey bar (defining current functional associations of hotkeys)), browse requests, and/or search requests. Commonly, the window 1100 includes suitable information about the content (such as name, duration, and/or remaining viewing duration of content), settings information, TV or system control information, application (activation) icons (such as for pre-installed and/or downloaded applications such as application center, media center and Web browser), and/or information about input source(s), When the joystick 900 is in either the forward or reverse position, the user can select an actuator on the front of the remote control, such as the OK button 764, and be taken, by displayed images on the screen 212, to another location in the user interface, such as a desktop. This process can be done in an nonintrusive manner and without affecting the flow of content that is pushed up or down. The joystick 900 could be moved, additionally or differently, from side-to-side to cause the window to appear at the left or right edge of the screen 212.

Figure 10:
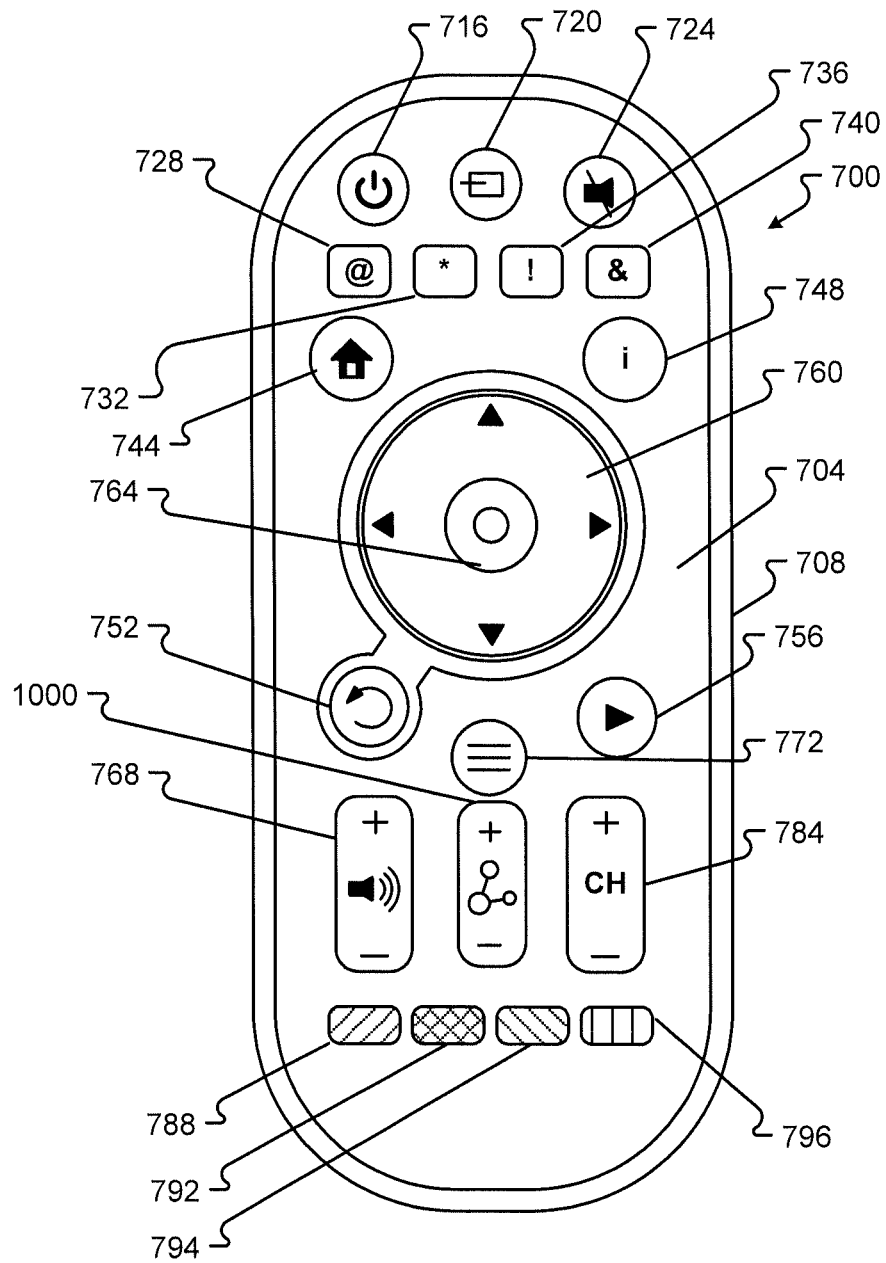
FIG. 10 is a plan view of another embodiment of a handheld remote control.

An alternative actuator configuration is shown in FIG. 10. The actuators are substantially the same as those of FIGS. 7-9 except that the social network button 1000, when selected, can automatically select content and publish, via a social network service or other social media, the content to a social network or online community. User or viewer comments and/or other messages can be included in the outbound message. For example, all or one or frames or portions of media content (such as a video, music, a photograph, a picture, or text) can be provided automatically to a predetermined or selected group of people via Linked-In™ Myspace™, Twitter™, YouTube™, DailyMotion™, Facebook™, Google+™ or Second Life™ The user, upon activating the button 1000 could, in response, select a social forum or media upon which the selected content (which is the content displayed to the user when the social network button 1000 is activated) is to be posted and/or a predetermined group within that social media to which the content is to be posted. Alternatively, these selections could be preconfigured or preselected by the user.

The social network button can also be used to "turn up" or "turn down" a social volume visualization. The Intelligent TV 100 can create dynamically a visualization of aggregated connections (and inbound and/or outbound messages) from a variety of social networks. The aggregation (and inbound and outbound messages) can be depicted graphically on the screen as a volume of connections to influence the viewer user. With a social volume visualization, selected contents of each linked social network profile of a social contact (and inbound and/or outbound messages from or to the linked social network contact and/or current activity of the social contact (such as watching the same programming or content the viewer is currently watching) can be presented in a separate tile (or visually displayed object). The size of the tile can be related to any number of criteria, including a relationship of the linked social contact (e.g., a relative degree of importance or type of relationship can determine the relative size of the tile, a degree of influence of the linked social contact to the current viewer, a geographic proximity of the linked social contact to the current viewer, a degree to which the currently provided media content is of interest to both the viewer and linked social contact (e.g., both parties enjoy war movies, murder mysteries, musicals, comedies, and the like), an assigned ranking of the linked viewer by the viewer, a type of social network type linking the viewer with the linked social contact, a current activity of the social network contact (e.g., currently watching the same content that the viewer is currently watching), a current online or offline status of the linked social contact, and a social network grouping type or category to which both the viewer and linked social contact belong (e.g., work contact, best friend, family member, etc.).

The viewer can designate a portion of the screen to depict the social network aggregation. By turning the social volume up (+) or down (−), the viewer can increase the size and/or numbers of linked contact tiles provided to the viewer. In other words, by increasing the social volume the viewer can view, access, and/or push more social content from those of his or her social networks associated with him or her in a memory of the Intelligent TV. By decreasing the social volume, the viewer can view, access, and/or push less social content from his or her associated social networks. By selecting the mute button 724, the viewer can stop or pause any interactivity with his or her associated social networks (e.g., inbound or outbound messages). Social volume and/or mute can be separated into two (or more) volume settings for outbound and inbound social network activity. By way of illustration, a first volume setting, control, and/or button can control the volume for outbound social network activity (e.g., outbound social messages) while a second (different) volume setting, control, and/or button can control the volume for inbound social network activity (e.g., inbound social messages). By way of further illustration, a first mute setting, control, and/or button can stop or pause outbound social network activity (e.g., outbound social messages) while a second (different) mute setting, control, and/or button can stop or pause inbound social network activity (e.g., inbound social messages).

Figure 12:
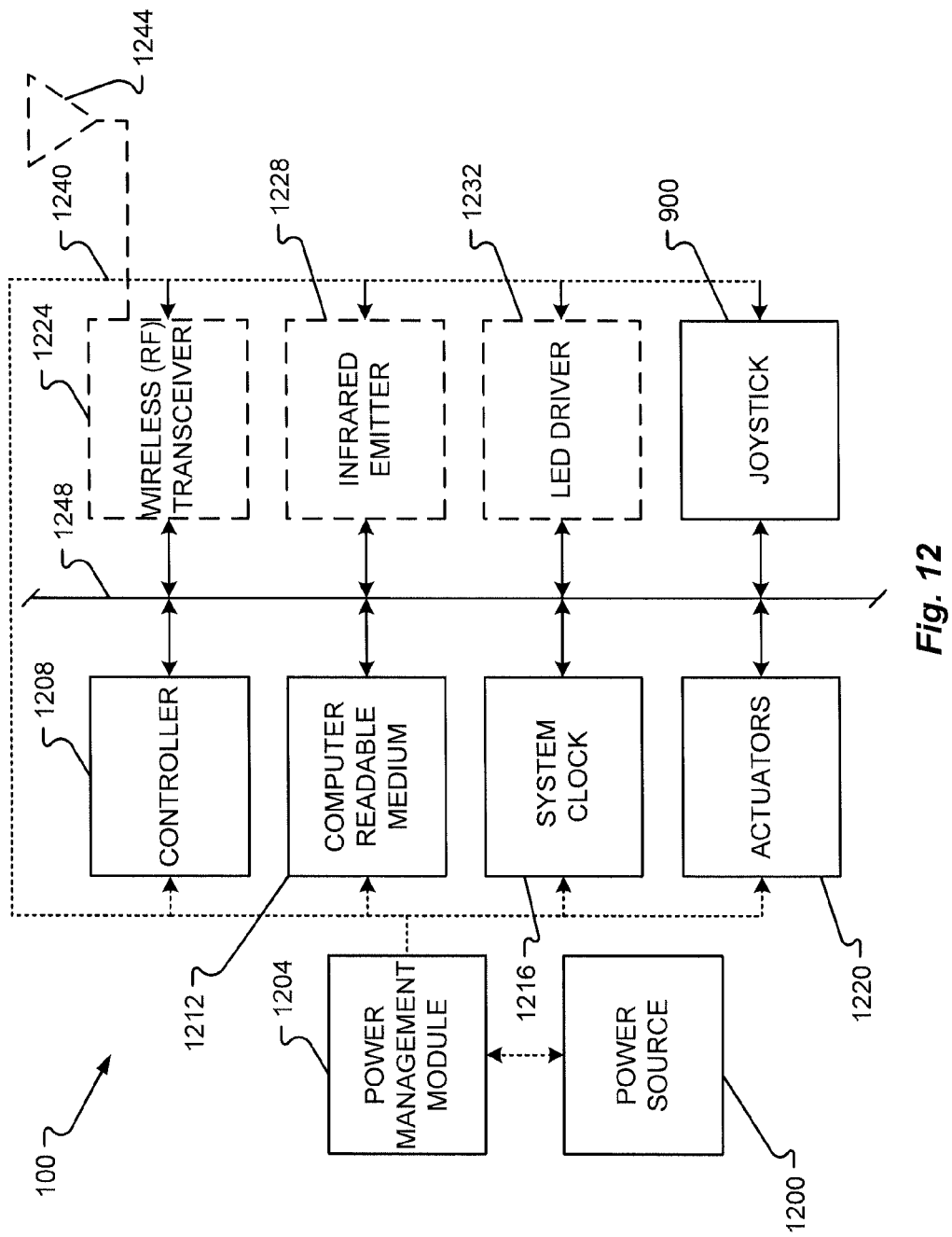
FIG. 12 is a block diagram of an embodiment of a handheld remote control of either FIG. 7 or 10.

A functional block diagram of the remote control is shown in FIG. 12. The remote control 700 includes a controller 1208 to control and supervise remote control operations, optional wireless (RF) transceiver 1224 and antenna 1244 to send and receive wireless signals to and from the Intelligent TV 100 and other external components, optional infrared emitter 1228 to emit infrared signals to the Intelligent TV 100, optional light emitting diode or LED driver 1232 to control LED operation to provide video-enabled feedback to the user, actuators 1220 (including the various buttons and other actuators discussed above in connection with FIGS. 7 and 10), and joystick 900, all interconnected via a bus 1248. An on board power source 1200 and power management module 1204 provide power to each of these components via power circuitry 1240. The infrared emitter 1228 and receiver (not shown) on the Intelligent TV system 100 can be used to determine a displayed object illuminated by the infrared signal and therefore adjust the displayed image, for example to indicate a focus of the user (e.g., illuminate a displayed object or show cursor position relative to displayed objects on the screen) and to determine and activate a desired command of the user. This can be done by tracking a position of the remote control in relation to infrared tracking reference points (e.g., a sensor bar or infrared LED's) positioned on or adjacent to the screen of the Intelligent TV 100. Motion tracking can further be augmented using position information received from a multi-axis gyroscope and/or accelerometer on board the remote control (not shown).

Figure 14:
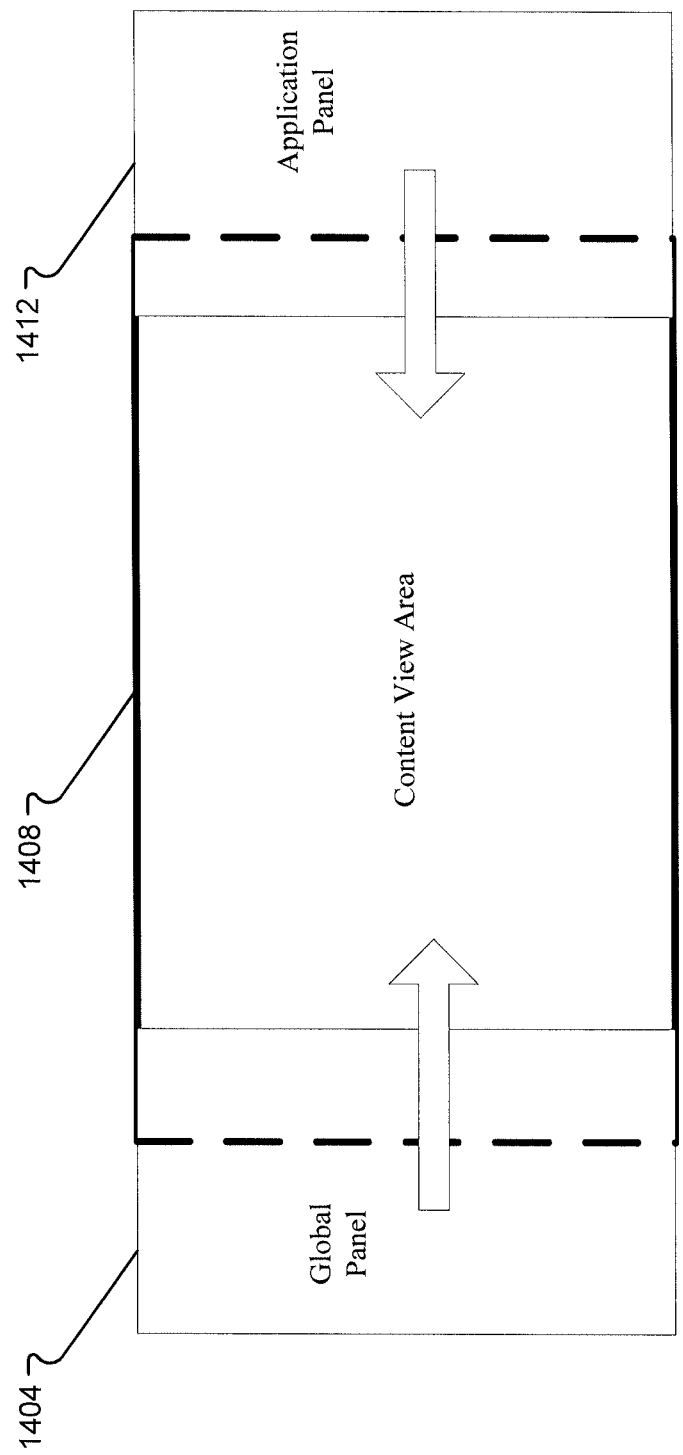
FIG. 14 is a first panel view of an embodiment of an intelligent television.

Referring now to FIG. 14, a panel configuration in accordance with embodiments of the present disclosure is illustrated. As previously discussed, the panel manager 536 is operable to display panels in the user interface to manage transitions between those panels or to affect user interface inputs received in the panel. The panel manager 536 may thus be in communication with different user interface panels such as a global panel 516, a volume panel 520, a settings panel 524, an applicant panel 544 and/or a notification panel 528. The panel manager 536 can display these types of panels depending on the inputs received from the input event dispatcher 508. The panel system is designed to provide a quick access to extended functionality while still maintaining visibility into the main content view.

As illustrated in FIG. 14, an intelligent TV 100 may display a global panel 1404, active content view 1408, and the application panel 1412. The global panel 1404 may be the same or similar to global panel 516. The global panel 1404 may include information that is associated with the home screen or top level hierarchal information for the user. For instance, global panel 1404 may be used to contain and access functionality that exists at a system level; this functionality may be completely independent of the currently viewed content. The global panel 1404 may be displayed in such a manner as to not disrupt the content view area 1404; that is, the global panel 1404 may be displayed in such a manner as to provide a user the ability to view content displayed in the content view area 1408. For example, the global panel 1404 may be translucent in nature such that the content displayed in the content view area 1408 is displayed (i.e. still viewable to a user), behind the global panel 1404. The global panel 1404 may provide a consistent access to high level actions across all applications, an anchor for all views, a unified experience, and further may follow the same pattern as the application panel 1412. Moreover, and as previously discussed, global panel 1404 may be displayed by the intelligent TV 100 such that the active content in the content view area 1408 is always in view. In some embodiments, the global panel 1404 and the contents of the global panel 1404 may depend on the user; that is, the global panel 1404 may be specific to one or more users. Therefore, the global panel 1404 may also be thought of as a home panel.

Figure 15A:
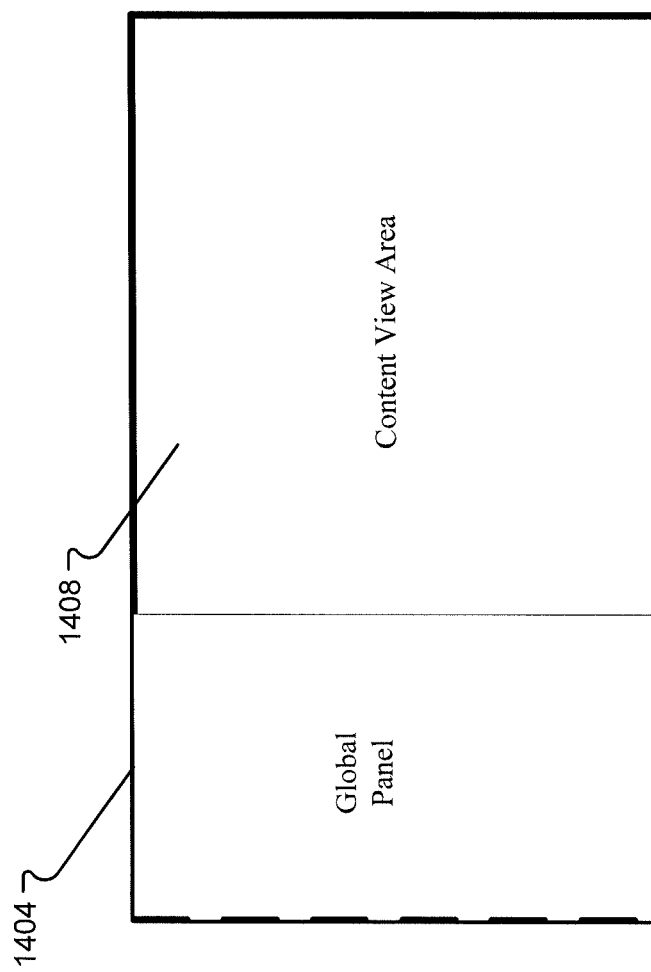
FIG. 15A-FIG. 15C illustrate layouts consistent with at least one embodiment of the present disclosure.

Referring now to FIG. 15A, a global panel configuration in accordance with embodiments of the present disclosure is depicted. Specifically, intelligent TV 100 may display a global panel 1404 such that the global panel 1404 appears on the left side of the intelligent TV 100. However, intelligent TV 100 is not limited to displaying the global panel 1404 on the left; in some embodiments and consistent with the present disclosure, the global panel 1404 may be displayed on the right side of intelligent TV 100, near the top side of intelligent TV 100, near the bottom of intelligent TV 100, and also in the center of intelligent TV 100. Moreover, the intelligent TV 100 may display content in active content area 1408.

Figure 15B:
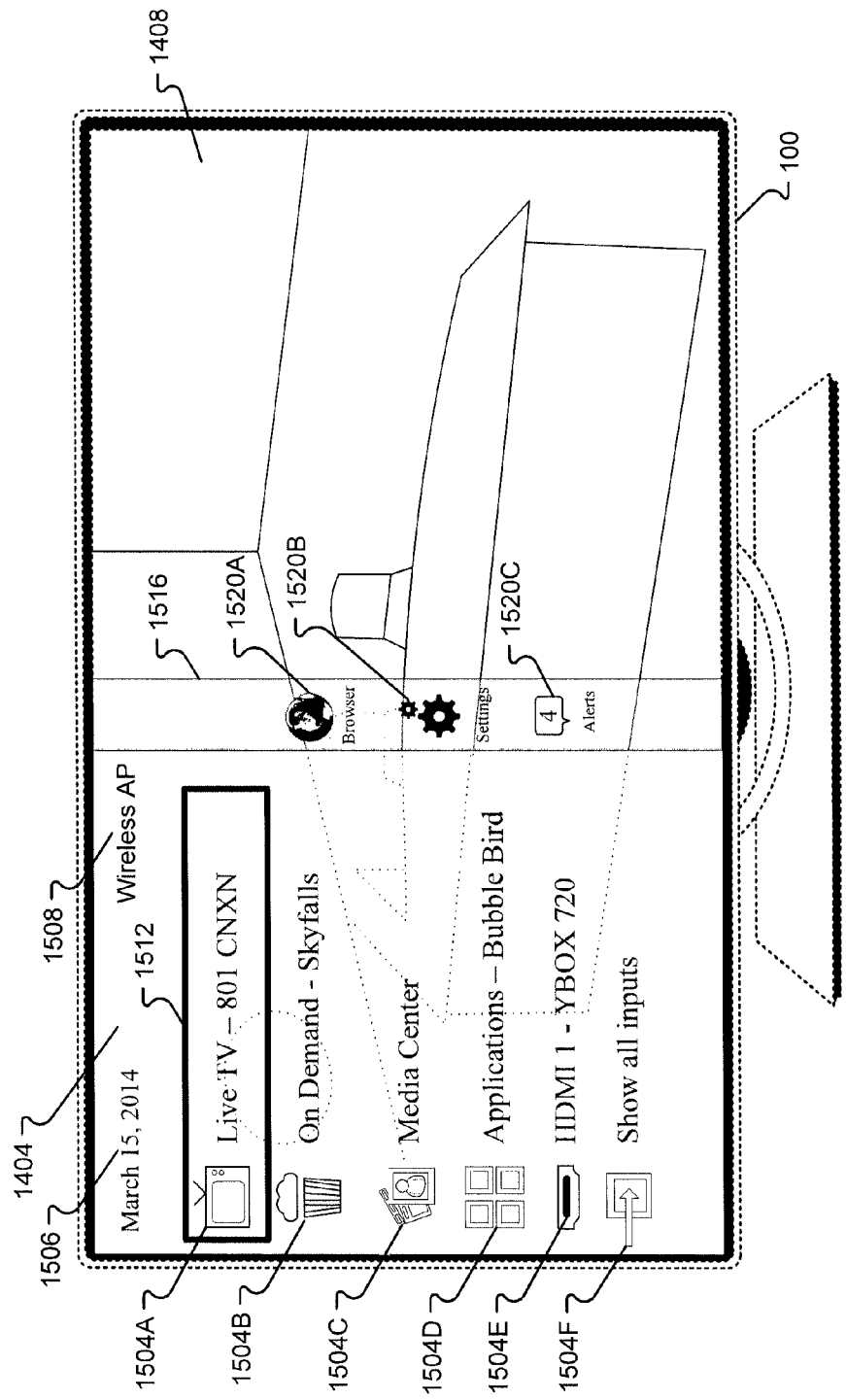

Referring now to FIG. 15B, a detailed global panel 1404 configuration of FIG. 15A is illustrated in accordance with embodiments of the present disclosure. The global panel 1404 may include time information 1506 and network information 1508. The time information 1506 may include, but is not limited to, the current time, the date in various formats including the day of the week, the year, the month, the day of the month, the time zone, and various times in different times zones, among others. The time information 1506 may be displayed in various formats, and may be customizable. The network information 1508 may indicate a network status and connection to a user. The network information 1508 can include other information, such as the name of the network or a strength of the network signal. The network status may include states of the network, including wifi connected, Ethernet connected, and offline, among others. The network status may use visual representations of the network information to convey the information to the user. In various embodiments, the time information 1506 and/or the network information 1508 cannot receive a user focus.

The global panel 1404 may include one or more sources represented by icons and text, or shortcuts, 1504A-E. Of course, more or less icons and text 1504A-E may be displayed. As previously discussed, each icon and text 1504A-E may be associated with one or more sources of content. For example, icon and text 1504A may be associated with Live TV application 452; icon and text 1504B may be associated with video on demand 456; icon and text 1504C may be associated with media center application 460; icon and text 1504D may be associated with application center application 464; and icon and text 1504E may be associated with one or more sources of content, either internal or external. Moreover, icon and text 1504F may provide the ability for all sources of content to be displayed within global panel 1404. Global panel 1404 may additionally indicate a source that is selected or highlight using indicator 1512; for example, indicator 1512 may comprise a box positioned around Live TV—801 CNXN. Although illustrated as a box, other methods or configurations which provide for icon selection and/or identification may be used. For example, instead of a box, indicator 1512 may comprise adjusting the background of an icon and text, such as 1504A for example, such that the color, shade, or hue is different. Alternatively, or in addition, indicator 1512 may comprise enlarging or magnifying the icon and text.

The text portion of icon and text 1504A-1504F may additional include the current application, source, or channel that is currently maintained, on hold, active, and/or associated with another content that is not currently displayed in content display area 1408. Thus, in various configurations, for Live TV a program name and/or current program playing may be displayed; for on demand a name of the media and/or media that is currently on VOD may be displayed; for media center, a name of the media and/or media that is currently on, and/or names of videos or albums may be displayed; for application center, a name of the application and/or the application that is currently playing may be displayed; and for inputs, custom names may be displayed.

For example, active content area 1408, in reference to FIG. 15B, is currently displaying a Live TV view (specifically 801 CNXN). The other icons and text, 1504B-1504E, may display the previously active content, or content that was previously displayed in active area 1408, at one time, but is now currently in a hold, inactive, or paused stated. For example, icon and text 1504B displays "On Demand—Skyfalls"; that is on demand application 456 may have previously been displaying some form of content—video, image, TV shows, etc.; the text of icon 1504B includes a title of the content that was previously displayed—"Skyfalls". Similarly, the text portion of icon and text 1504D displays a previously displayed, or active, application—for example, "Bubble Bird". The application "Bubble Bird" may still reside in some form of application memory associated with application center application 464. As another example, the text portion of icon and text 1504E includes HDMI1—YBOX 720; source content on the HDMI 1 port from a YBOX 720 was previously displayed in content area 1408.

Additionally, global panel 1404 may include a shortcut area 1516. The shortcut area 1516 may provide access to frequently used applications, sources, or areas of intelligent TV 100. Moreover, shortcut area 1516 may be user configurable; that is a user may be able to decide what applications or sources are displayed. As illustrated in FIG. 15B, shortcut area 1516 displays an icon for browser 1520A, an icon for a settings menu 1520B, and an icon for alerts 1520C. The settings 1520B may provide a user access to one or more intelligent TV 100 configurations. Additionally, the Alerts icon 1520C, may indicate a number of alerts, or messages, a user has. The alert messages may be messages involving the operation and configuration of intelligent TV 100, messages received from one or more users, indications that new content has arrived, emergency messages, notifications, or the like.

In some configurations, when a user focuses on and selects an icon in the shortcut area 1516, the global panel may dismiss and the application or silo corresponding to the selected icon may launch. For example, when browser 1520A in the shortcuts area 1516 is selected, the global panel may dismiss and the Intelligent TV system 100 may switch the silo to a browser application (e.g., via application layer 416) and the browser launches. Likewise, when settings menu 1520B in the shortcuts area 1516 is selected, the global panel may dismiss and the Intelligent TV system 100 may launch a settings application (e.g., via application layer 416) and, for example, a system settings menu (e.g., settings panel 524) may launch on top of the current view without the occurrence of any silo switching. Also, for example, a notifications icon may be displayed in the shortcuts area 1516, and when it is selected, the global panel may dismiss and the Intelligent TV system 100 may launch a notifications application (e.g., via application layer 416) and, for example, a notifications menu (e.g., notification panel 528) may launch on top of the current view. In various embodiments, the notifications icon displayed in the shortcuts area 1516 may indicate a number of notifications. For example, the number of the notifications can be from 0 to 9 when there are between 0 and 9 notifications respectively, and when there are more than 9 notifications, it may display "9+". The number of notifications may remain unchanged until the user takes an action, e.g., by selecting on a notification or by removing all the notifications.

When the focus is shifted to the shortcut area 1516, or an icon in the shortcut area 1516, stickiness may apply; e.g., any item or area that was in focus previously may remain in focus upon any relaunching. Also, when the shortcut area 1516 receives focus for an initial time, the first item (e.g., browser 1520A) may receive the focus.

In addition, the global panel 1404 may be displayed such that the actively displayed content is displayed in active content area 1408 and is further visible behind global panel 1404. For example, the content currently displayed on the intelligent TV 100 is of a desk; the global panel 1404 may be translucent such that the content is displayed below or behind the global panel 1404, as represented by the dotted lines in FIG. 15B.

Figure 15C:
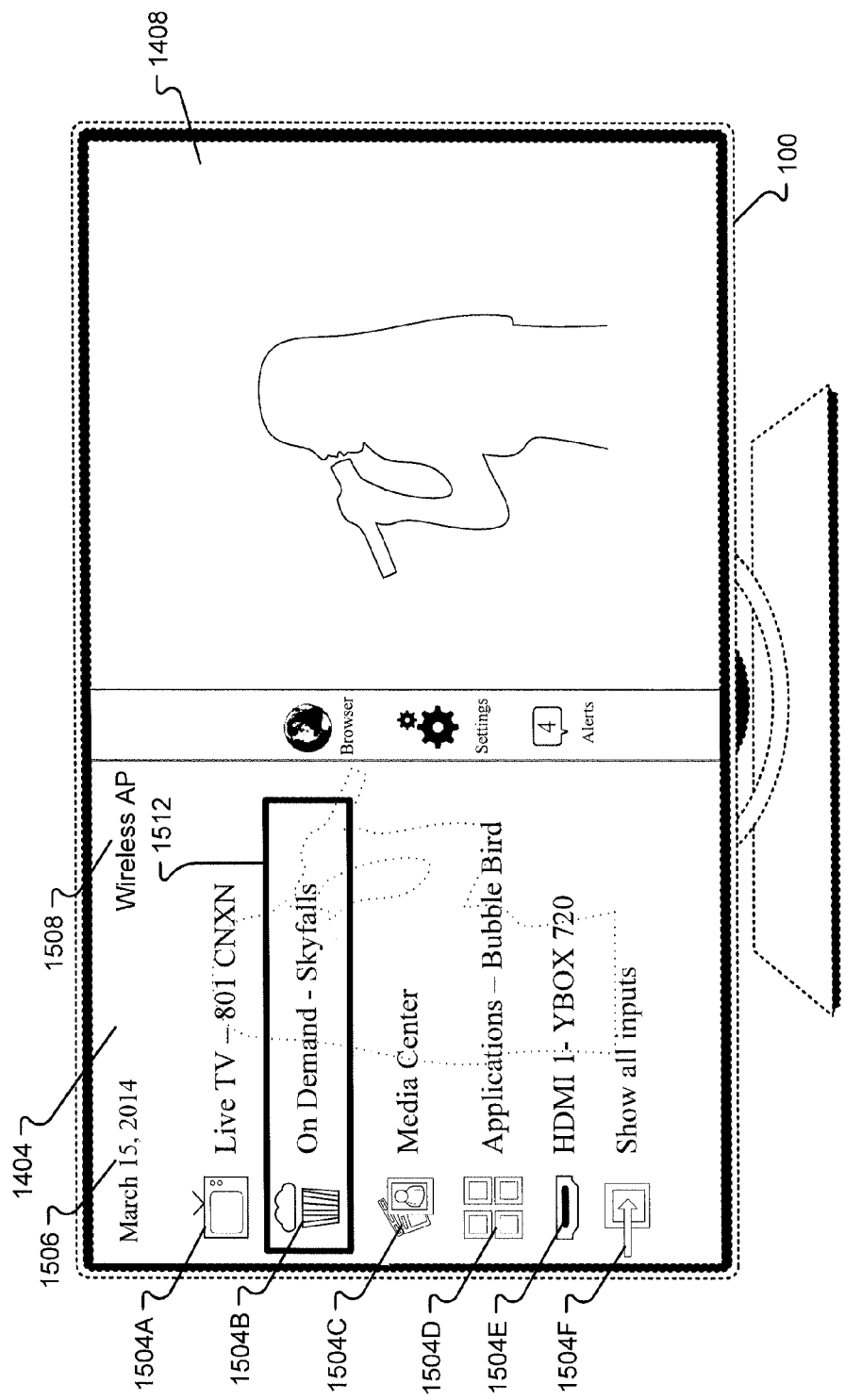

As illustrated in FIG. 15C, and in accordance with embodiments of the present disclosure, as the indicator 1512 is moved to a different source, the content or a preview of the content may be displayed in active content area 1408. For example, FIG. 15C illustrates an image or video associated with Skyfalls being displayed in content area 1408. Similar to FIG. 15B, the content is displayed such that a user can view content even though global panel 1404 may reside over the actively displayed content.

Figure 16:
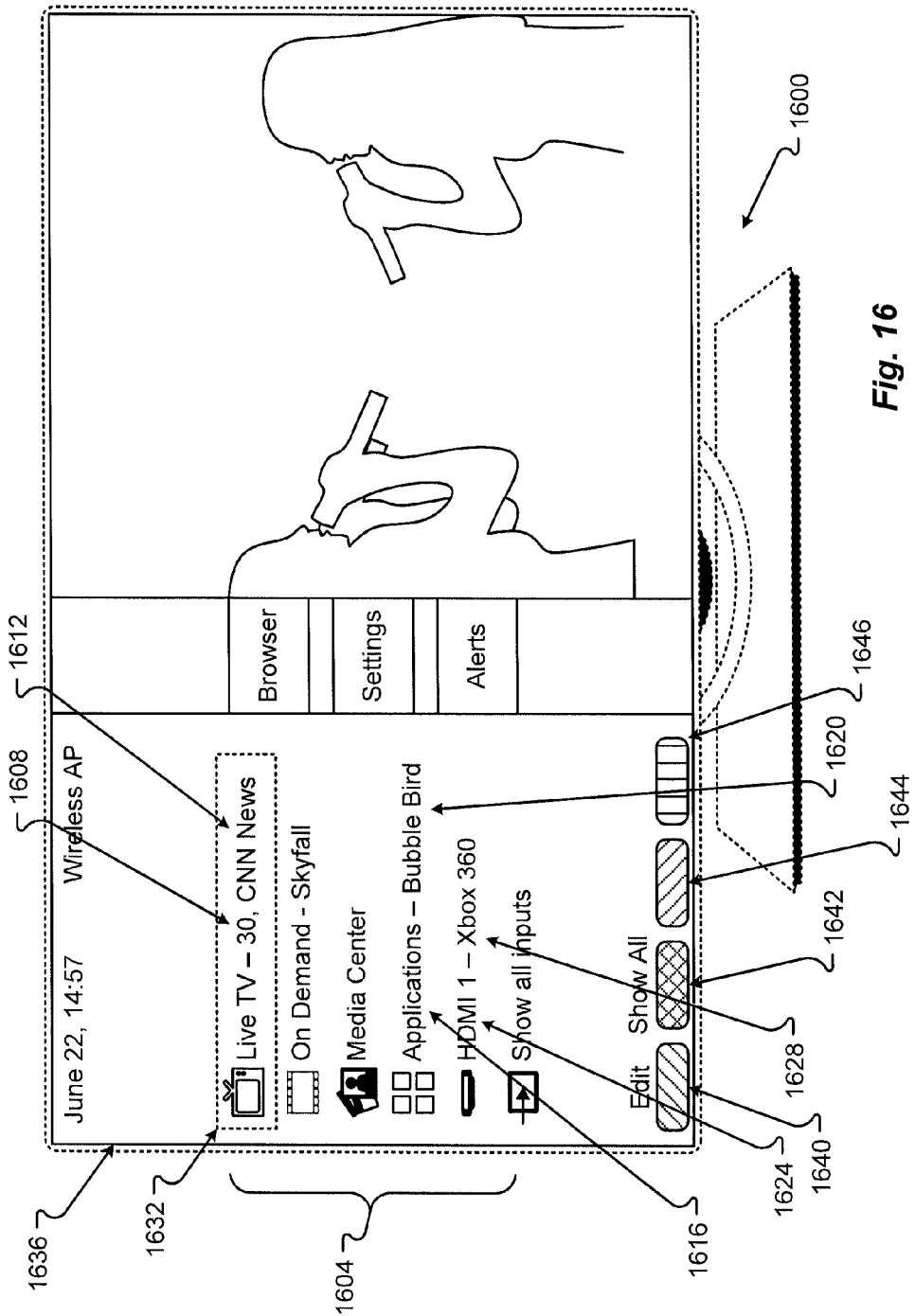
FIG. 16 is a visual representation of an embodiment of a global panel providing access to the silos.

An additional illustrative configuration of the global panel is shown in a television interface 1600 in FIG. 16. In this example, a global panel 1636 provides for a representation of silos 1604. For example, the Live TV application is represented by the Live TV display information 1608 at the top of the list of silos 1604. Similarly, an information display 1612 for the on demand silo is presented after, or below in this case, the Live TV information line 1608. The other content application silos for media center 1616 and applications 1624 are shown below the first two content application silos.

A representation of an input source 1624 is shown on a line associated with the HDMI input. In this case, the silos are oriented from top to bottom. The silo information may also present other information, such as the current state of the silo, in the information line. For example, the information line 1608 shows that the Live TV application is currently displaying channel 30, CNN news. Further, a selection line 1628 can provide for other inputs, which may include the other input sources not currently shown in the global panel display 1636. The user may move the focus box 1632 onto one of the lines 1608 through 1628. Upon moving the focus and either selecting another button or user interface selection device or loitering the focus box 1632 for a predetermined amount of time over the silo information line, the user can select that silo from the global panel 1636. Unused or undetected inputs may be displayed along with inputs that are in use and all inputs, including unused or undetected inputs may receive focus and be selected. Different visual indicators may show that an input is in focus, selected, and undetected, among others. If an unconnected or undetected input is selected, the screen may show the input source and a "no signal" message, for example. In embodiments, each input source may have one of two states: either connected/detected or unconnected/undetected, and silos may be considered always to be connected. Other inputs may be only considered connected if they are in an "on" state; for example, a VGA input. Various inputs may also be hidden, for example, a user may be able to hide undetected inputs. Hiding inputs may cause the list to collapse. Also, icons and/or text associated with inputs may change based on changes to the inputs.

If there is too much information (e.g., too many silos or applications) to display at one time in the global panel, the global panel may have a scrollbar or other means for the user to view the overflow information (e.g., information that will not fit on the screen). The scrollbar may appear as necessary, and be hidden when not necessary. Also, if a user selects (e.g., switches to) a different input source, the selected unconnected/undetected input may be removed from the list if the list is collapsed when the global panel launches again. When an unconnected/undetected input source is listed on a collapsed silo/input list, it may follow a specified order. Various types of information in the global panel may be collapsible and expandable. Also, areas in the global panel may be used for other purposes (e.g., branding and advertising), and may not be selectable by the user.

Further, when an unconnected/undetected input is selected, and the global panel is launched with a collapsed list, the selected input may be shown on the list in the unconnected/undetected state. The selected input should also be in focus and selected. For example, if HDMI 3 with no device connected is selected from a source changer, and the global panel is launched with the collapsed silo/input list, the HDMI 3 should still be shown on the list, but with an unconnected/undetected state to indicate there is no device connected. In addition, if the global panel is launched with an expanded list, and HDMI 3 with no device connected is selected and then the user collapses the silo/input list, the HDMI 3 should still be shown on the list, but with the unconnected/undetected state to indicate there is no device connected.

Thus, as discussed herein, the silo/input list can become scrollable when the number of items on the list exceeds the space that allows, e.g., when the list is expanded, and when there is no message, the message area may be left blank. In certain configurations, the size of the scrollable zone does not change based on the present of the message. Also, when there is a message displayed, the scrollable area automatically moves up to just above the message area and the message area does not float on top of the list.

In various configurations, a collapsed list is in a default state when the global panel launches for a first time. After an initial launch, the list may follow a 'stickiness' rule, e.g., if the silo/input source list is collapsed when it is dismissed, when the global panel relaunches, the list may remain collapsed; likewise, if the list is expanded when it is dismissed, when the global panel relaunches, the list may remain expanded.

In addition global panel 1636 may include various buttons (e.g., hot keys). For example, global panel 1636 shows hot keys 1640, 1642, 1644, and 1646, which may take any form, including displaying various shapes, colors, and text, and have various functions. In addition, they may be user configurable. In FIG. 16, hot key 1640 may be a red color and have the text "Edit" associated with the key, and it may be enabled only when an input source of HDMI, Comp/YPbPr, Video output, and VGA is in focus. Hot key 1640 may allow a user to give a customized name to an input source. Hot key 1642 may be a yellow color and have the text "Show All" associated with the key. Hot key 1642 may have a toggle function that allows the user to show all inputs, including unconnected/undetected ones, and to hide the unconnected/undetected inputs (e.g., to expand and collapse the silo/input list). Hot keys 1644 and 1646 in FIG. 16 do not have any function assigned to them.

Further, a D-pad (e.g., D-pad 760) may be used to navigate among elements (e.g., icons, silos, applications, etc.) in the global panel. For example, the silo/input list and the shortcuts bar may be two vertical zones and a user can use the 'left' and 'right' keys on a D-pad to navigate between the two zones. In various configurations, stickiness can apply, e.g., when the user shifts the focus between the two vertical zones, the item that is in focus previously within the zone receives the focus upon relaunch. Thus, if browser is the last item the user used on the shortcuts bar, when the user presses the right key (to shift the focus from the silo/input list to the shortcuts bar), the browser should receive the focus. The 'up' and 'down' keys on a D-pad may be used to navigate between items within each vertical zone.

In some configurations, when the global panel is first launched, only the silos and connected input sources may be shown, and when the global panel relaunches, there are several rules that can apply. For example, if the silo/input list previously only showed the connected/detected inputs, it may remain the same way. If the silo/input list previously was expanded to include the unconnected/undetected inputs, it may remain the same way as well. Also, because the silo/input list is scrollable, when the global panel relaunches, it may automatically scroll to the position so the silo/input that was selected as a current source is visible. In embodiments, the current selected silo/input can be in focus as well.

The global panel can be dismissed by various methods, including but not limited to: pressing a back button; pressing a global panel button on the remote while the panel is launched; selecting one of the input sources; launching an application from the shortcuts bar; and pressing a hot key (e.g., 1640 to edit so that the global panel dismisses and an edit window launches); and launching other panels. In various embodiments, there may be a time when no user interaction is possible after dismissing the global panel (e.g., no user interaction for any number of seconds).

An illustrative edit window is shown in a television interface 1700 in FIG. 17. In FIG. 17 an edit window 1704 is displayed, showing the selected input to edit (e.g., HDMI1) and an input area 1708 (e.g., a text field), together with a Cancel button 1712 and an OK button 1714. In embodiments, when a user interacts with the edit window 1704, additional information and input features may appear on the television interface 1700, for example, a list of choices or a keyboard. The text field may be in focus with the edit window is launched, and may allow a maximum number of characters. If there is no custom name given to the selected input source, the text field may be blank as shown. If there is a custom name given to the selected input, the custom name may be displayed. The Cancel button 1712 may dismiss the edit window 1704 and other information associated with the window, without changing the name associated with the input. The OK button 1714 can confirm the current entered name and upon being selected, the edit window 1704 and other information may dismiss and the entered name will be shown as the custom name for the input in the global panel 1636 when it is launched next time. In embodiments, a back button (e.g., back button 752) may behave the same as the Cancel button 1712. As previously discussed, global panel 1636 provides the user with universal access to the main features/functions and shortcuts to the most frequently used or desired applications. As such, it may be considered a "home" location for users. The global panel 1404 allows a user to configure its layout and display, such as determining which silos (including applications and sources, for example) are displayed and choosing custom names for items. By accessing the global panel, a user may thus be able to quickly access a silo or an input source and any related additional information. Related additional information may include content on a silo, custom names of an input source, and connection status of devices, among others.

As discussed above, a global panel 1636 provides for a representation of silos 1604. A content application silo can include representations for a first time experience (FTE). The FTE representations present the application in a first start up and include a series of user interfaces for the user to begin using the content application silo. For example, if a user begins an application and the application was not currently running or is restarted, a user interface 1800 may be presented to the user, as shown in FIG. 18. The user interface 1800 can include an icon 1804 that represents the application being executed. In this case, the icon for the media center 1804 is shown in user interface 1800. Further, an indication to the user that the content application silo is starting or is being executed is represented by a user interface device 1808, which demonstrates that the content is loading by rotating a revolving wheel.

Figure 19A:
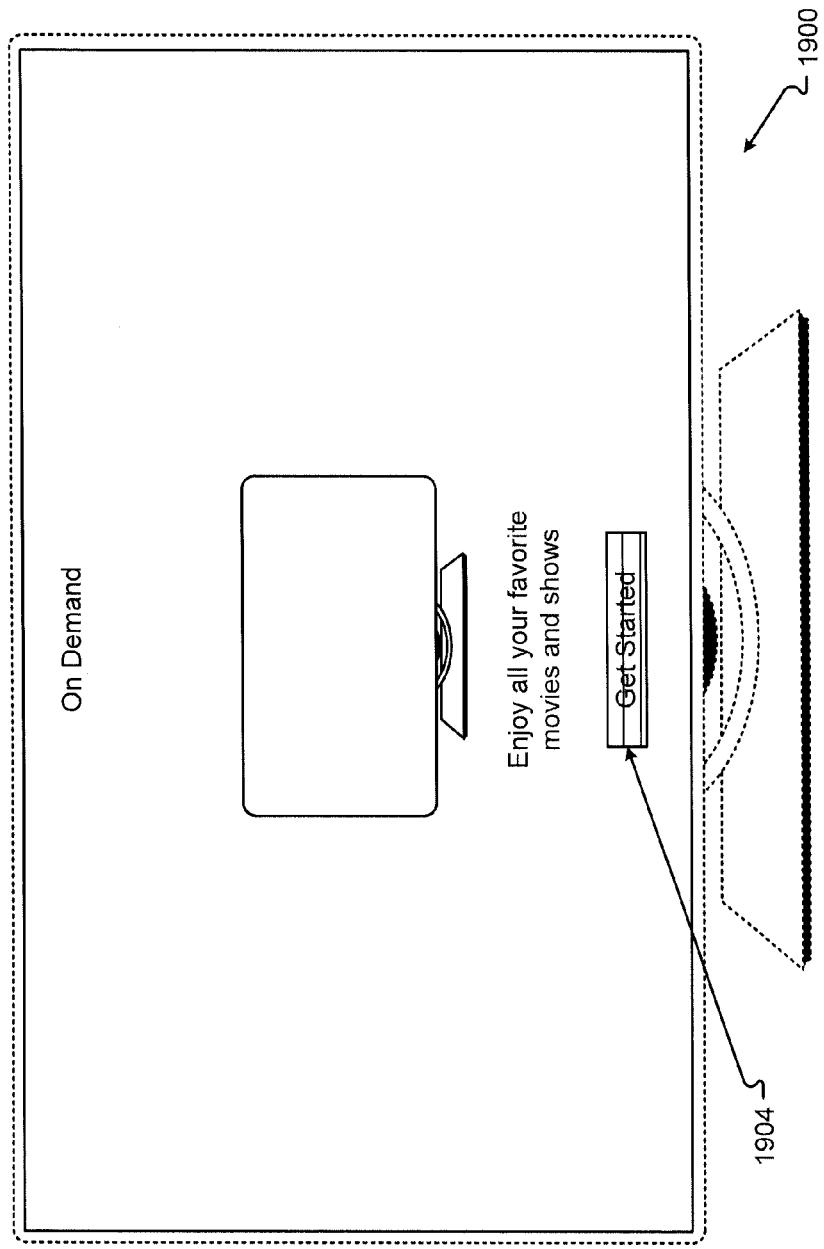
FIG. 19A is a visual representation of an embodiment of a user interface that is presented when a silo is in a first time experience state.

Upon starting the content application silo, the user may be presented with one or more different user interfaces associated with the type of silo. The user interfaces indicate that the silo is conducting or needs to conduct some initial operation to begin providing content. For example, a first user interface 1900 is shown in FIG. 19A. The user interface 1900 for the VOD application silo requires that the user select a "Get Started" icon or button 1904 to initiate the VOD application. Upon using the remote control 700 to move the focus to the "Get Started" icon or button 1904, the user can select the "Get Started" icon or button 1904 to have the television 100 locate and present the VOD sources and/or content to the user.

Figure 19B:
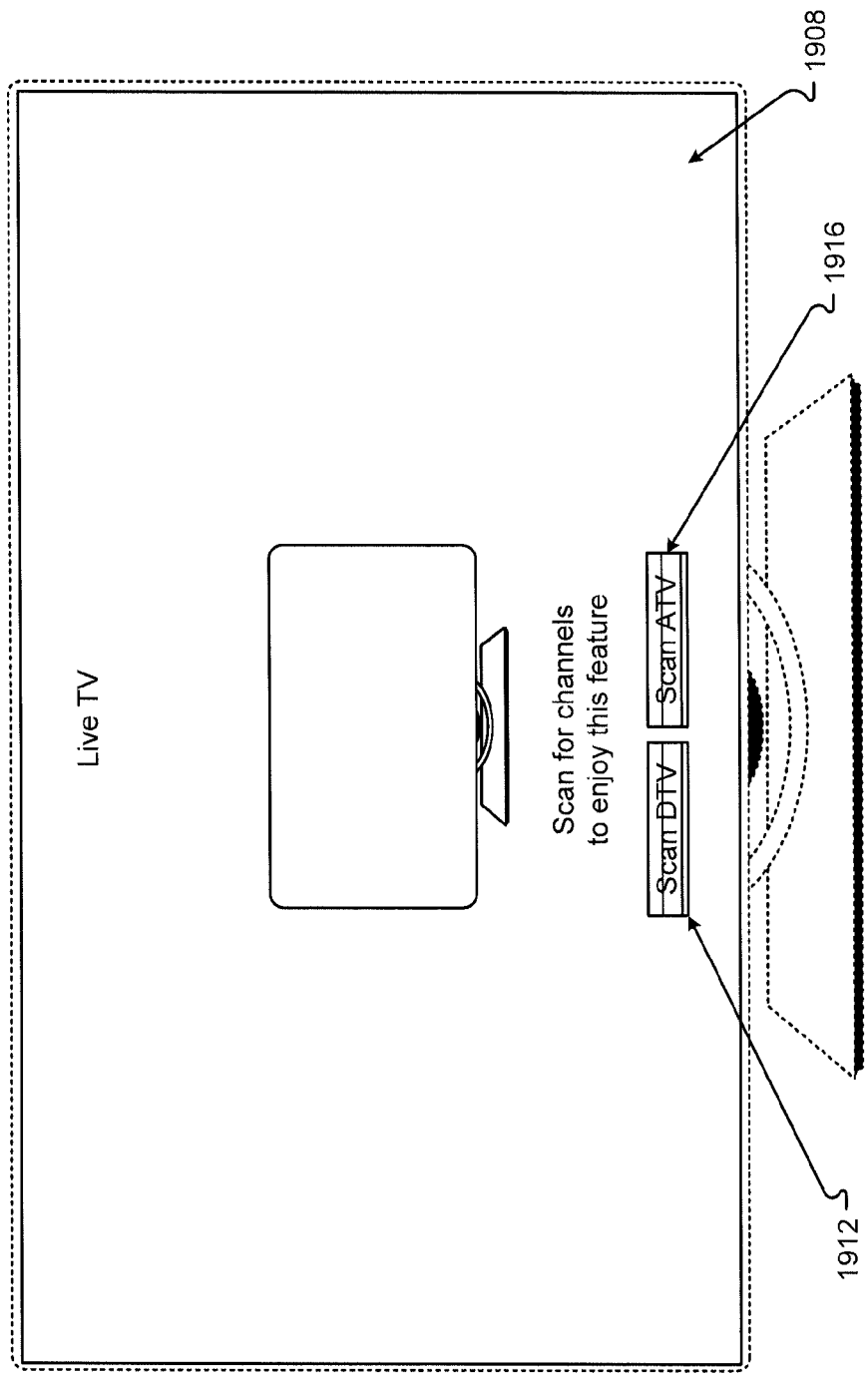
FIG. 19B is a visual representation of another embodiment of a user interface that is presented when a silo is in a first time experience state.

Similarly, a first time experience user interface 1908 for the Live TV application is shown in FIG. 19B. In this example, two buttons 1912 and 1916 are presented to the user. The button 1912, when selected by the user, requires the TV 100 to scan digital TV signals to determine which channels or content sources are available for the Live TV application. Similarly, if the user selects button 1916, the television 100 scans analog TV signals to determine the channels that may be available for the Live TV application.

Figure 19C:
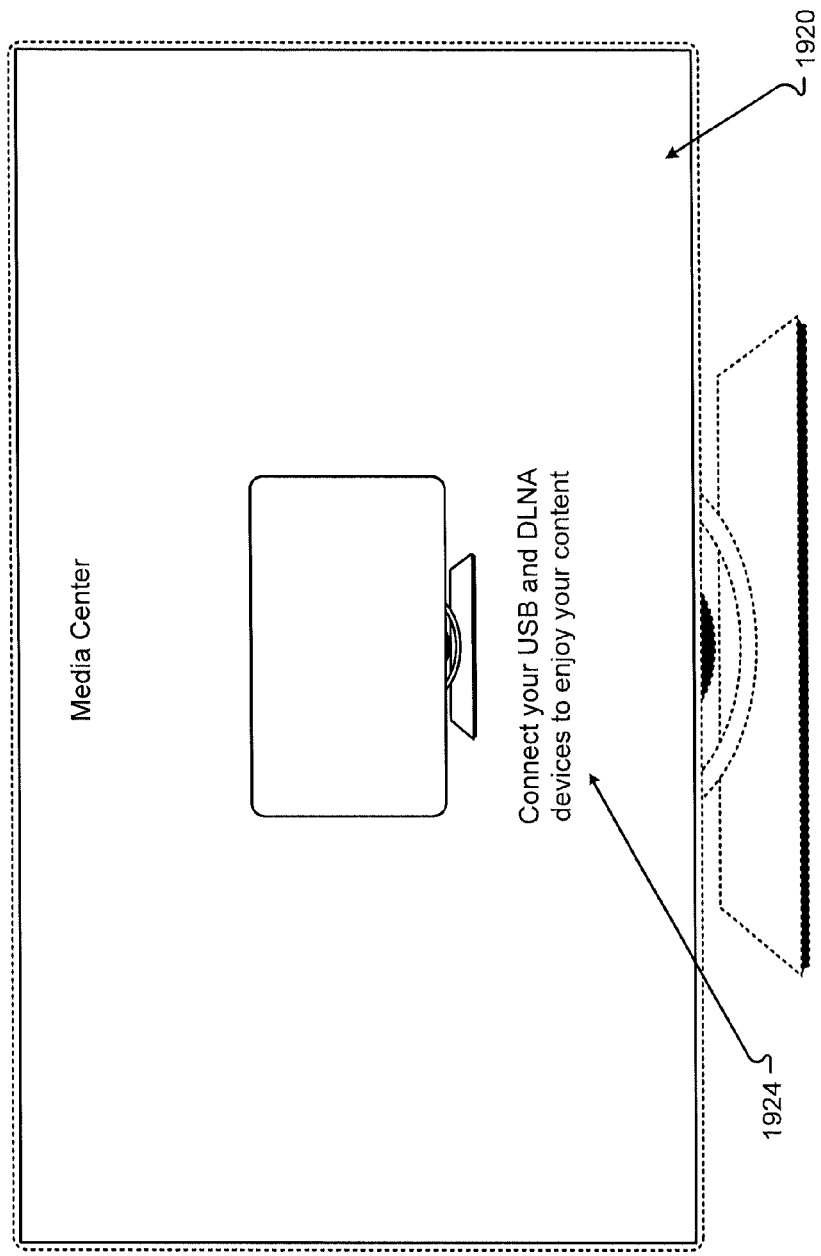
FIG. 19C is a visual representation of another embodiment of a user interface that is presented when a silo is in a first time experience state.

A first time experience user interface 1920 for the media center is presented in FIG. 19C. In this example, there is no icon or other button to select but rather a presentation of information 1924 in the user interface 1920. The presentation of information 1924 requests that the user connect any type of devices to the television 100 or a network that may be associated with the television 100 for the television 100 to extract media, such as pictures and videos, either stored by or created by the user. Once the devices are scanned, the media center may store or create a logical database for the content that may be presented through the media center silo.

Figure 20B:
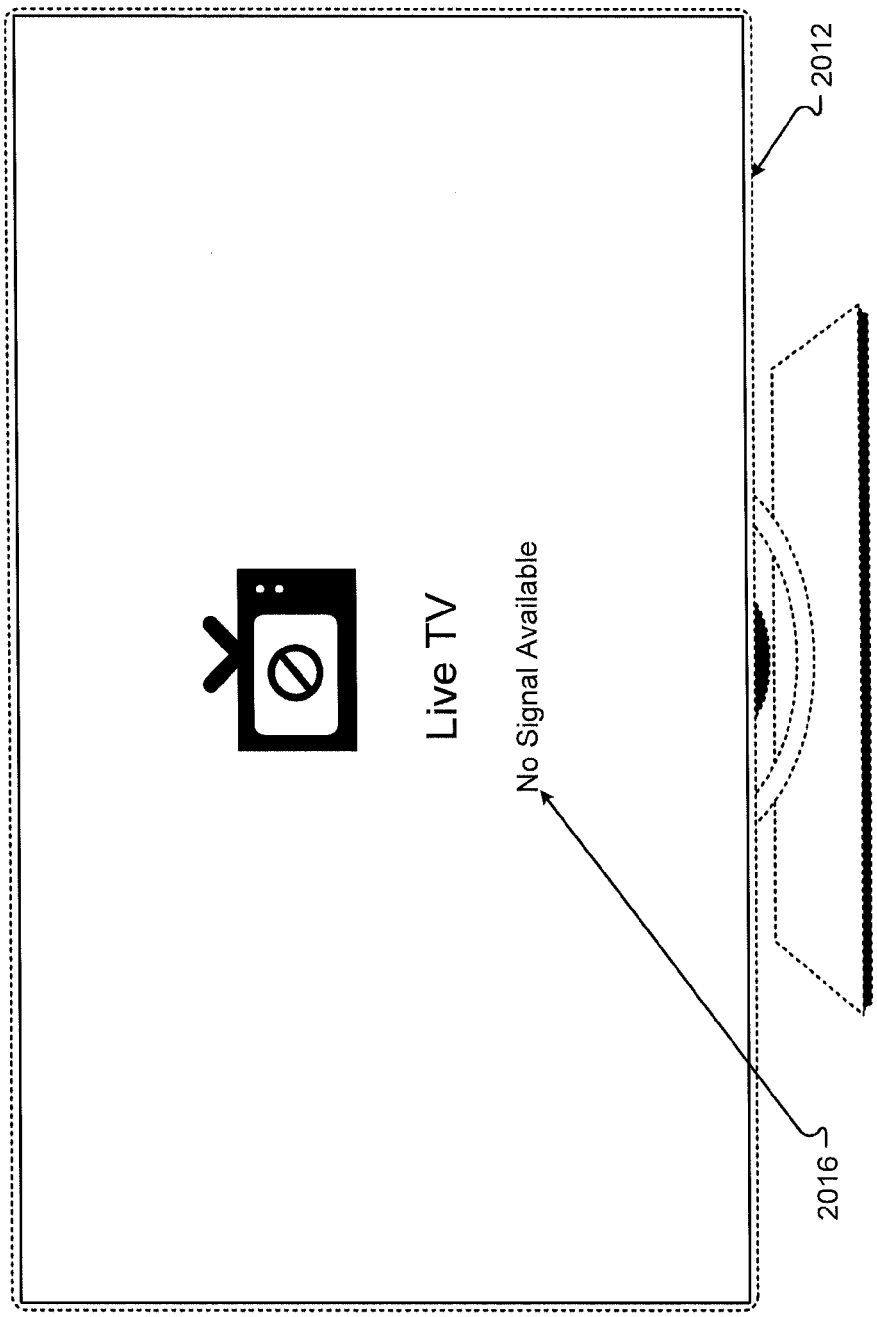
FIG. 20B is a visual representation of another embodiment of a user interface that is presented when a silo is in an error state.

During the live cycle of the silo, the silo may include one or more different states that may be different from the normal operating state of the silo. If the silo enters a state not indicative of a normal operating state, the user interface may present information to the user to indicate the different state. For example, one or more different states for different silos are shown in FIGS. 20A through 20D. For example, a user interface display 2000 is shown in FIG. 20A. The user interface 2000 presents an icon 2004 associated with the silo, in this case, a VOD icon, and provides information that indicates a different state than the normal operating conditions exists. This information 2008 indicates that there is a connection error and the VOD sources cannot be accessed. As such, the user is presented with information about how the silo is operating during the silo's life cycle if that silo is not in a normal operating condition.

User interface 2012 is presented in FIG. 20B and provides an icon and information 2016 for the Live TV application. In this example, the Live TV application has no signal and is shown with information 2016 on a television screen 304 to indicate this abnormal operation for the Live TV application silo. A "no signal" condition may occur if the content broadcast signal from a satellite, cable box, or antenna is not being received by the television 100. This information 2016 allows the user to understand that the Live TV application is not operating within normal parameters.

The user interface 2020 is presented to the user with information 2024 for the Live TV application, as shown in FIG. 20C. In this example, the Live TV application has been changed to a channel that provides scrambled content. A scrambled television signal can be a signal that is not provided to this particular user based on their access to content in the Live TV application. For example, a pay for view service, such as HBO or Showtime, may not be provided if the user has not paid for access to those channels or content providers. As such, the Live TV application receives a scrambled channel or scrambled signal for those content sources and the information 2024 may be presented to the user, with the user interface 2020, indicating that content has been scrambled.

Similar types of life cycle indications may also be presented for input sources. For example, user interface 2028 may be presented to a user, as shown in FIG. 20D. User interface 2028 indicates, with information 2032, that there is no signal coming from an HDMI 1 port. For example, if no device is connected to HDMI 1, the TV 100 can indicate that there is no signal being received at the HDMI 1 port. As such, the user can determine that the operation of any device that should be connected to the HDMI 1 port is not operating correctly.

Figure 21:
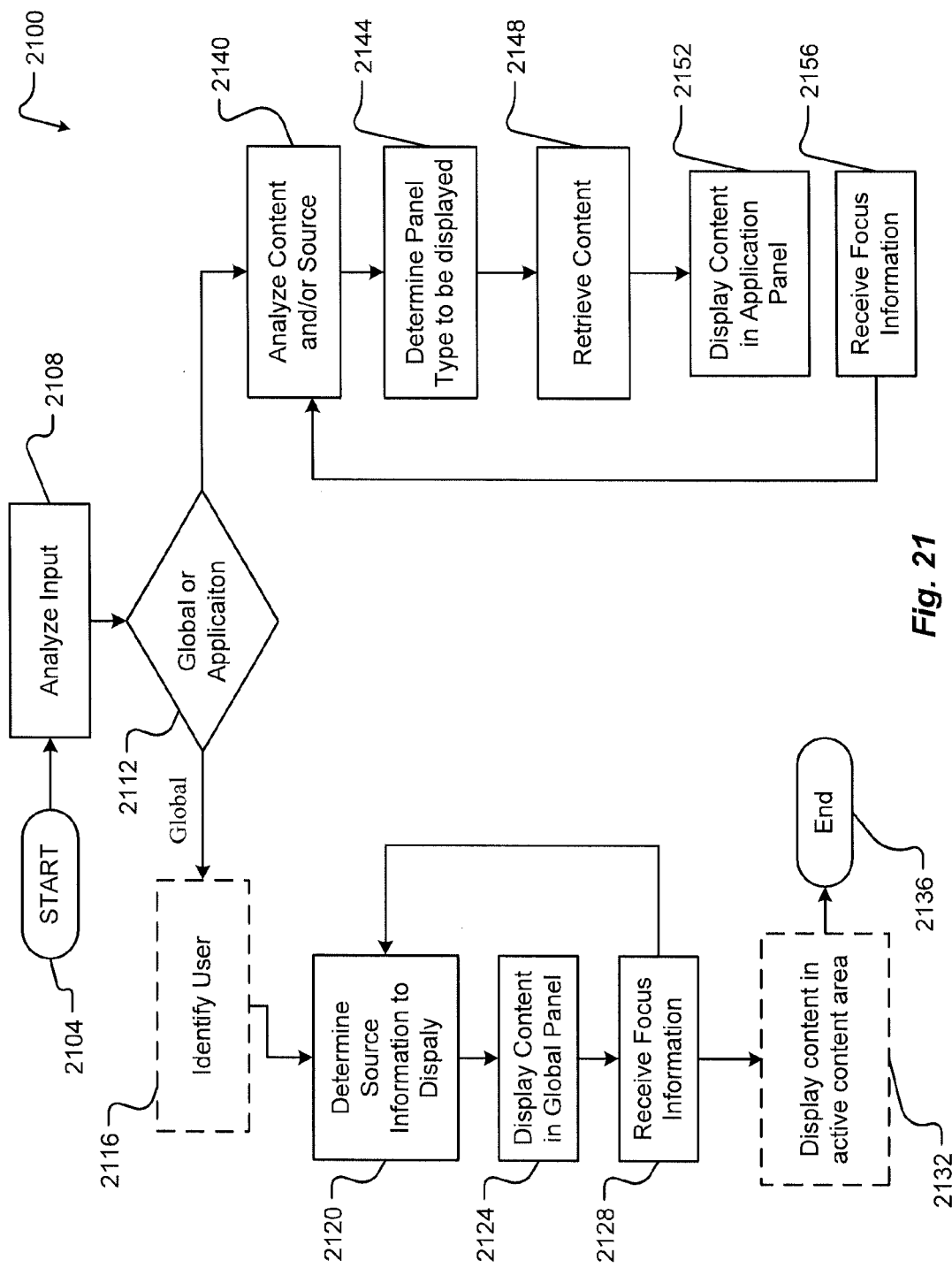
FIG. 21 is a flow diagram depicting a global panel and panel type selection process in accordance with embodiments of the present disclosure.

FIG. 21 is a flow diagram of an embodiment of a method 2100 for selecting and displaying one or more panels for viewing by a user. Method 2100 is in embodiments performed by a device, such as device 100. More specifically, one or more hardware and software components may be involved in performing method 2100. In one embodiment, one or more of the previously described modules perform one or more of the steps of method 2100. The method 2100 may be executed as a set of computer-executable instructions executed by a computer system and encoded or stored on a computer-readable medium. Hereinafter, the method 2100 shall be explained with reference to the systems, components, modules, software, etc. described in conjunction with FIGS. 1-23F.

Method 2100 may continuously flow in a loop, flow according to a timed event, or flow according to a change in an operating or status parameter. Method 2100 is initiated at step 2104. Step 2104 may start with an intelligent television 100 receiving input from a remote or channel changer associated with a user. Based on the remote or channel changer input, the step 2104 may flow to step 2108, where the input received is analyzed. At step 2312, if it is determined that the analyzed communication is associated with displaying a global panel, such as panel 1404, then method 2100 proceeds to step 2116 where the user, or a user profile associated with the user is identified. Because the content information is not specific to the content displayed in the active content area 1408, once the user or user profile associated with a user has been identified, the method then proceeds to step 2120 to retrieve content information to display in the global panel 1404. At step 2124 the retrieved content is then displayed in the global pane 1404.

At step 2128 additional focus information indicating a specific icon and text, or shortcuts, corresponding to icon and text 1504A-F may be received from a user. The specific icon and/or text with focus information may then be used to identify a specific application to select such that content is displayed in the active content area 1404 at step 2132. The method 2100 may then end at step 2136 or repeat step 2104.

If, at step 2112, it is determined that the analyzed input corresponds to the display of an application panel, such as application panel 1412, then, at step 2140, the content displayed in the active content area 1408 and/or the source is analyzed. At step 2144, a panel type is selected; the panel type may correspond to one or more panel types as described with reference to FIGS. 17A-17B. At step 2148, content information to populate the panel type is retrieved, and the content is then displayed at step 2152 in the application panel. After step 2152, additional focus information may be received at step 2156. Upon receiving additional focus information, the method 2100 may repeat at step 2140, where the content in the active content area and/or the source is analyzed. Alternatively, or in addition, the method 2100 may end at 2136.

The exemplary systems and methods of this disclosure have been described in relation to one or more embodiments of a global panel. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a cable box or other set top box used to provide content to a television, a smart device used to watch streamed shows, and or other smart devices used to watch content, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

For example in one alternative embodiment, the panel displayed to a user may comprise one or more combinations of silos and input sources, shortcuts to applications and functions, messages and notifications and alerts, and time and network information. In another alternative embodiment, only one of silos, input sources, shortcuts to applications and functions, messages and notifications and alerts, and time and network information is displayed.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A tangible, non-transitory computer readable medium having instructions stored thereon that, when executed by a processor, perform the method comprising:
   presenting, via a display of an intelligent television (TV), live TV broadcast content, wherein the live TV broadcast content is presented to a first portion of the display;
   receiving an application panel input at the intelligent TV, wherein the application panel input corresponds to a selection of a selectable tab of a plurality of selectable tabs in an application panel navigation bar of an application panel interface displaying three or more selectable tabs of the plurality of selectable tabs, wherein at least one selectable tab of the plurality of selectable tabs corresponds to a categories input, wherein at least one selectable tab of the plurality of selectable tabs corresponds to a favorites input, and wherein at least one selectable tab of the plurality of selectable tabs corresponds to a search input;
   determining which of the categories input, the favorites input, or the search input is received;
   determining, by a processor associated with the intelligent TV and in response to receiving the application panel input, application panel interface content that corresponds to the application panel input received;
   retrieving, from at least one source, the application panel interface content;
   presenting, via the display, the application panel interface content to the application panel interface displayed in a second portion of the display, wherein the second portion of the display is associated with the application panel interface, wherein the application panel interface overlaps at least a portion of the presented live TV broadcast content, wherein at least three selectable tabs of the plurality of selectable tabs of the application panel navigation bar change a presentation of information within the application panel interface when selected, wherein the at least three selectable tabs of the plurality of selectable tabs of the application panel navigation bar remain displayed when at least one selectable tab of the at least three selectable tabs is selected and when the application panel interface content that corresponds to the application panel input received is displayed, and wherein:
   if the categories input is received, displaying a categories application panel interface;
   if the favorites input is received, displaying a favorites application panel interface; and
   if the search input is received, displaying a search application panel interface; and
   presenting, via the display, context sensitive content to the application panel interface, wherein the context sensitive content varies based on at least one of the application panel interface content or the content presented to the first portion of the display.

2. The tangible, non-transitory computer readable medium of claim 1, wherein determining the application panel interface content of the method further comprises:
   referring to rules stored in a memory, wherein the rules include one or more application panel content fields mapped to at least one application panel interface content type;
   comparing an application panel interface content type associated with the presented live TV broadcast content with the one or more mapped application panel content fields;

determining select application panel content fields from the one or more mapped application panel content fields; and including the select application panel content fields in the application panel interface content for retrieval.

3. The tangible, non-transitory computer readable medium of claim 1, wherein the application panel interface content is retrieved from two or more signal sources.

4. The tangible, non-transitory computer readable medium of claim 1, wherein the at least one source is at least one of a local memory, a remote memory, a broadcast signal, and a memory located across a network.

5. The tangible, non-transitory computer readable medium of claim 1, wherein at least one of the application panel interface content and the application panel interface is at least partially transparent, and wherein the presented live TV broadcast content is visible beneath the presented application panel interface content.

6. The tangible, non-transitory computer readable medium of claim 1, wherein a size of the first portion is maintained upon presenting the application panel interface content via the second portion of the display.

7. The tangible, non-transitory computer readable medium of claim 1, wherein the application panel input is provided via an input device associated with the intelligent TV.

8. The tangible, non-transitory computer readable medium of claim 1, wherein the presented live TV broadcast content includes at least one of a movie, a TV program, a sport event, a TV special, and a radio program.

9. The tangible, non-transitory computer readable medium of claim 8, wherein the presented application panel interface content includes at least one of a program description, a channel identifier, a thumbnail graphic, an electronic program guide (EPG), and preference information.

10. A system, comprising:
an intelligent television (TV) having a display and a tuner, wherein the tuner receives and converts broadcast content signals to be displayed by the display;
an input device associated with the intelligent TV;
a memory; and
a microprocessor that:
presents, via a display of an intelligent television (TV), live TV broadcast content, wherein the live TV broadcast content is presented to a first portion of the display;
receive an application panel input at the intelligent TV, wherein the application panel input corresponds to a selection of a selectable tab of a plurality of selectable tabs in an application panel navigation bar of an application panel interface displaying three or more selectable tabs of the plurality of selectable tabs, wherein at least one selectable tab of the plurality of selectable tabs corresponds to a categories input, wherein at least one selectable tab of the plurality of selectable tabs corresponds to a favorites input, and wherein at least one selectable tab of the plurality of selectable tabs corresponds to a search input;
determines which of the categories input, the favorites input, or the search input is received;
determines, by a processor associated with the intelligent TV and in response to receiving the application panel input, application panel interface content that corresponds to the application panel input received;
retrieves, from at least one source, the application panel interface content;

presents, via the display, the application panel interface content to the application panel interface displayed in a second portion of the display, wherein the second portion of the display is associated with the application panel interface, wherein the application panel interface overlaps at least a portion of the presented live TV broadcast content, wherein the at least three selectable tabs of the plurality of selectable tabs of the application panel navigation bar change a presentation of information within the application panel interface when selected, wherein the at least three selectable tabs of the plurality of selectable tabs of the application panel navigation bar remain displayed when at least one selectable tab of the at least three selectable tabs is selected and when the application panel interface content that corresponds to the application panel input received is displayed and wherein:
if the categories input is received, displays a categories application panel interface;
if the favorites input is received, displays a favorites application panel interface; and
if the search input is received, display a search application panel interface; and
presents, via the display, context sensitive content to the application panel interface, wherein the context sensitive content varies based on at least one of the application panel interface content or the content presented to the first portion of the display.

11. The system of claim 10, wherein the microprocessor further:
refers to rules stored in a memory, wherein the rules include one or more application panel content fields mapped to at least one application panel interface content type;
compares an application panel interface content type associated with the presented live TV broadcast content with the one or more mapped application panel content fields;
determines select application panel content fields from the one or more mapped application panel content fields; and
includes the select application panel content fields in the application panel interface content for retrieval.

12. The system of claim 10, wherein at least one of the application panel interface content and the application panel interface is at least partially transparent, and wherein the presented live TV broadcast content is visible beneath the presented application panel interface content.

13. A method, comprising:
presenting, via a display of an intelligent television (TV), live TV broadcast content, wherein the live TV broadcast content is presented to a first portion of the display;
receiving an application panel input at the intelligent TV, wherein the application panel input corresponds to a selection of a selectable tab of a plurality of selectable tabs in an application panel navigation bar of an application panel interface displaying three or more selectable tabs of the plurality of selectable tabs, wherein at least one selectable tab of the plurality of selectable tabs corresponds to a categories input, wherein at least one selectable tab of the plurality of selectable tabs corresponds to a favorites input, and wherein at least one selectable tab of the plurality of selectable tabs corresponds to a search input;
determining which of the categories input, the favorites input, or the search input is received;

determining, by a processor associated with the intelligent TV and in response to receiving the application panel input, application panel interface content that corresponds to the application panel input received;

retrieving, from at least one source, the application panel interface content;

presenting, via the display, the application panel interface content to the application panel interface displayed in a second portion of the display, wherein the second portion of the display is associated with the application panel interface, wherein the application panel interface overlaps at least a portion of the presented live TV broadcast content, wherein at least three selectable tabs of the plurality of selectable tabs of the application panel navigation bar change a presentation of information within the application panel interface when selected, wherein the at least three selectable tabs of the plurality of selectable tabs of the application panel navigation bar remain displayed when at least one selectable tab of the at least three selectable tabs is selected and when the application panel interface content that corresponds to the application panel input received is displayed, and wherein:

if the categories input is received, displaying a categories application panel interface;

if the favorites input is received, displaying a favorites application panel interface; and if the search input is received, displaying a search application panel interface; and presenting, via the display, context sensitive content to the application panel interface, wherein the context sensitive content varies based on at least one of the application panel interface content or the content presented to the first portion of the display.

14. The method of claim 13, wherein determining the application panel interface content further comprises:

referring to rules stored in a memory, wherein the rules include one or more application panel content fields mapped to at least one application panel interface content type;

comparing an application panel interface content type associated with the presented live TV broadcast content with the one or more mapped application panel content fields;

determining select application panel content fields from the one or more mapped application panel content fields; and including the select application panel content fields in the application panel interface content for retrieval.

15. The method of claim 13, wherein the application panel interface content is retrieved from two or more signal sources.

16. The method of claim 13, wherein the at least one source is at least one of a local memory, a remote memory, a broadcast signal, and a memory located across a network.

17. The method of claim 13, wherein at least one of the application panel interface content and the application panel interface is at least partially transparent, and wherein the presented live TV broadcast content is visible beneath the presented application panel interface content.

18. The method of claim 13, wherein a size of the first portion is maintained upon presenting the application panel interface content via the second portion of the display.

19. The method of claim 13, wherein the presented live TV broadcast content includes at least one of a movie, a TV program, a sport event, a TV special, and a radio program.

20. The method of claim 19, wherein the presented application panel interface content includes at least one of a category, a channel identifier, a thumbnail graphic, an electronic program guide (EPG), a favorite, and a search term.

* * * * *

UNITED STATES PATENT AND TRADEMARK OFFICE
CERTIFICATE OF CORRECTION

PATENT NO. : 9,927,879 B2  
APPLICATION NO. : 15/358788  
DATED : March 27, 2018  
INVENTOR(S) : Sanjiv Sirpal and Mohammed Selim Page 1 of 1

It is certified that error appears in the above-identified patent and that said Letters Patent is hereby corrected as shown below:

In the Claims

At Column 41, Line 47, delete "receive" and insert --receives-- therein.

At Column 42, Line 23, delete "display" and insert --displays-- therein.

Signed and Sealed this
First Day of October, 2019

Andrei Iancu
*Director of the United States Patent and Trademark Office*